(12) United States Patent
Yamazaki et al.

(10) Patent No.: US 10,142,547 B2
(45) Date of Patent: Nov. 27, 2018

(54) ELECTRONIC DEVICE AND DRIVING METHOD THEREOF

(71) Applicant: Semiconductor Energy Laboratory Co., Ltd., Atsugi-shi, Kanagawa-ken (JP)

(72) Inventors: Shunpei Yamazaki, Setagaya (JP); Hajime Kimura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 29 days.

(21) Appl. No.: 14/546,508

(22) Filed: Nov. 18, 2014

(65) Prior Publication Data
US 2015/0146069 A1 May 28, 2015

(30) Foreign Application Priority Data
Nov. 28, 2013 (JP) ................. 2013-245670

(51) Int. Cl.
*H04N 5/232* (2006.01)
*G06F 1/16* (2006.01)
*H04N 5/225* (2006.01)

(52) U.S. Cl.
CPC ....... *H04N 5/23293* (2013.01); *G06F 1/1616* (2013.01); *G06F 1/1626* (2013.01);
(Continued)

(58) Field of Classification Search
CPC .... G06F 1/1616; G06F 1/1618; G06F 1/1641; G06F 1/1643; G06F 1/1652;
(Continued)

(56) References Cited

U.S. PATENT DOCUMENTS

| 5,995,025 A | 11/1999 | Sternglass et al. |
| 7,184,086 B2 | 2/2007 | Tamura |

(Continued)

FOREIGN PATENT DOCUMENTS

| CN | 001645450 A | 7/2005 |
| CN | 103620516 A | 3/2014 |

(Continued)

OTHER PUBLICATIONS

International Search Report (Application No. PCT/IB2014/066089) dated Mar. 24, 2015.

(Continued)

*Primary Examiner* — Paul Berardesca
(74) *Attorney, Agent, or Firm* — Robinson Intellectual Property Law Office; Eric J. Robinson

(57) ABSTRACT

To provide an electronic device capable of a variety of display. To provide an electronic device capable of being operated in a variety of ways. An electronic device includes a display device and first to third surfaces. The first surface includes a region in contact with the second surface, the second surface includes a region in contact with the third surface, and the first surface includes a region opposite to the third surface. The display device includes first to third display regions. The first display region includes a region overlapping with the first surface, the second display region includes a region overlapping with the second surface, and the third display region includes a region overlapping with the third surface. The first display region has a larger area than the third display region.

19 Claims, 33 Drawing Sheets

(52) U.S. Cl.
CPC .......... *G06F 1/1641* (2013.01); *G06F 1/1643* (2013.01); *G06F 1/1647* (2013.01); *G06F 1/1652* (2013.01); *H04N 5/2252* (2013.01)

(58) Field of Classification Search
CPC ........ G06F 2203/04102; G06F 1/1605; H04N 5/23293; H04M 1/0266; H04M 1/0268; G09G 2300/0491; G09G 2380/02
See application file for complete search history.

(56) References Cited

U.S. PATENT DOCUMENTS

| | | | |
|---|---|---|---|
| 7,453,426 | B2 | 11/2008 | Yamazaki |
| 8,199,471 | B2 | 6/2012 | Bemelmans et al. |
| 8,531,411 | B2 | 9/2013 | Kuwajima et al. |
| 8,610,155 | B2 | 12/2013 | Hatano et al. |
| 8,723,824 | B2 | 5/2014 | Myers et al. |
| 8,736,162 | B2 | 5/2014 | Jin et al. |
| 8,907,868 | B2 | 12/2014 | Yamazaki |
| 8,976,141 | B2 | 3/2015 | Myers et al. |
| 9,104,262 | B2 | 8/2015 | Wang |
| 9,430,180 | B2 | 8/2016 | Hirakata et al. |
| 9,448,592 | B2 | 9/2016 | Jin et al. |
| 9,891,815 | B2 | 2/2018 | Mitsunaga |
| 10,054,988 | B2 | 8/2018 | Jin et al. |
| 2003/0160892 | A1* | 8/2003 | Tamura ................ H04N 5/2251 348/333.07 |
| 2004/0071285 | A1 | 4/2004 | Satoh et al. |
| 2005/0151830 | A1 | 7/2005 | Yamazaki |
| 2005/0156952 | A1 | 7/2005 | Orner et al. |
| 2009/0097691 | A1* | 4/2009 | Eaton .................... G06F 1/1601 381/388 |
| 2010/0065832 | A1 | 3/2010 | Sugimoto |
| 2010/0117975 | A1 | 5/2010 | Cho |
| 2010/0123160 | A1 | 5/2010 | Hatano et al. |
| 2010/0156887 | A1 | 6/2010 | Lindroos et al. |
| 2010/0253902 | A1 | 10/2010 | Yamazaki et al. |
| 2011/0001709 | A1 | 1/2011 | Wang |
| 2011/0050657 | A1 | 3/2011 | Yamada |
| 2011/0128241 | A1 | 6/2011 | Kang et al. |
| 2011/0134144 | A1 | 6/2011 | Moriwaki |
| 2012/0105400 | A1* | 5/2012 | Mathew ............... H04N 5/2251 345/207 |
| 2012/0307423 | A1* | 12/2012 | Bohn .................... G06F 1/1641 361/679.01 |
| 2013/0002133 | A1 | 1/2013 | Jin et al. |
| 2013/0002583 | A1 | 1/2013 | Jin et al. |
| 2013/0076649 | A1* | 3/2013 | Myers ................ H04M 1/0268 345/173 |
| 2013/0222208 | A1 | 8/2013 | Gorilovsky et al. |
| 2014/0029212 | A1 | 1/2014 | Hwang et al. |
| 2014/0063719 | A1 | 3/2014 | Yamazaki et al. |
| 2014/0099999 | A1 | 4/2014 | Hatano et al. |
| 2014/0111954 | A1 | 4/2014 | Lee et al. |
| 2014/0247405 | A1 | 9/2014 | Jin et al. |
| 2014/0306260 | A1 | 10/2014 | Yamazaki et al. |
| 2014/0375660 | A1 | 12/2014 | Tamaki |
| 2015/0009128 | A1 | 1/2015 | Matsumoto |
| 2015/0014681 | A1 | 1/2015 | Yamazaki |
| 2015/0022515 | A1 | 1/2015 | Ikeda et al. |
| 2015/0022561 | A1 | 1/2015 | Ikeda et al. |
| 2015/0023031 | A1 | 1/2015 | Endo |
| 2015/0048349 | A1 | 2/2015 | Kawata et al. |
| 2015/0077615 | A1 | 3/2015 | Yamazaki et al. |
| 2015/0084029 | A1 | 3/2015 | Yamazaki |
| 2015/0103023 | A1 | 4/2015 | Iwaki |
| 2015/0138041 | A1* | 5/2015 | Hirakata .............. G06F 3/1446 345/1.3 |
| 2016/0116941 | A1* | 4/2016 | Kuwabara ............ G06F 1/163 361/679.03 |
| 2016/0343777 | A1 | 11/2016 | Hirakata et al. |
| 2017/0206835 | A1* | 7/2017 | Hirakata ............. G09G 3/3225 |

FOREIGN PATENT DOCUMENTS

| | | |
|---|---|---|
| CN | 103828334 A | 5/2014 |
| EP | 1040579 A | 10/2000 |
| EP | 1716558 A | 11/2006 |
| EP | 1800280 A | 6/2007 |
| EP | 2187443 A | 5/2010 |
| EP | 2395497 A | 12/2011 |
| EP | 2960770 A | 12/2015 |
| JP | 2002-278515 | 9/2002 |
| JP | 2003-174153 | 6/2003 |
| JP | 2003-274250 A | 9/2003 |
| JP | 2003-345286 | 12/2003 |
| JP | 2004-104164 A | 4/2004 |
| JP | 2004-128910 A | 4/2004 |
| JP | 2005-227762 A | 8/2005 |
| JP | 2006-005712 | 1/2006 |
| JP | 2010-153813 A | 7/2010 |
| JP | 2013-015835 A | 1/2013 |
| JP | 2014-519626 | 8/2014 |
| JP | 2014-535086 | 12/2014 |
| KR | 2014-0026547 A | 3/2014 |
| KR | 2014-0066253 A | 5/2014 |
| TW | 201250645 | 12/2012 |
| TW | I412963 | 10/2013 |
| WO | WO-1999/031800 | 6/1999 |
| WO | WO-2005/072504 | 8/2005 |
| WO | WO-2006/038171 | 4/2006 |
| WO | WO-2012/167204 | 12/2012 |
| WO | WO-2013/048881 | 4/2013 |
| WO | WO-2014/129565 | 8/2014 |

OTHER PUBLICATIONS

Written Opinion (Application No. PCT/IB2014/066089) dated Mar. 24, 2015.
Taiwanese Office Action (Application No. 103139788) dated Apr. 11, 2018.
Chinese Office Action (Application No. 201480064843.6) dated Jul. 4, 2018.

* cited by examiner

FIG. 1A1
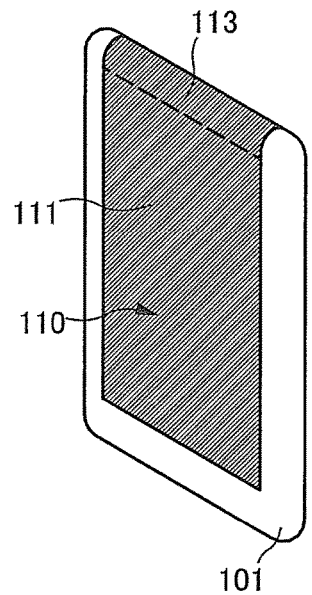
FIG. 1A2
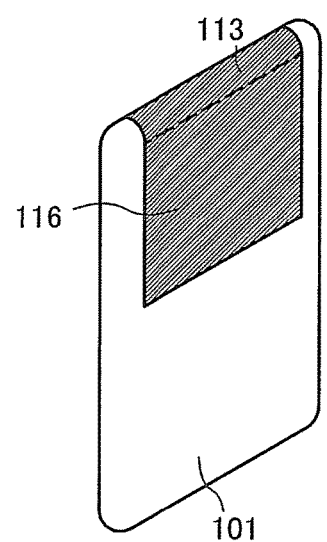
FIG. 1B1
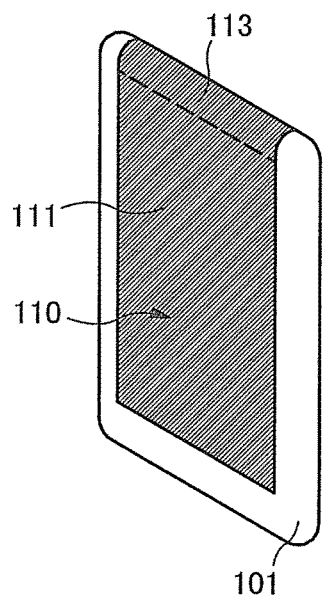
FIG. 1B2
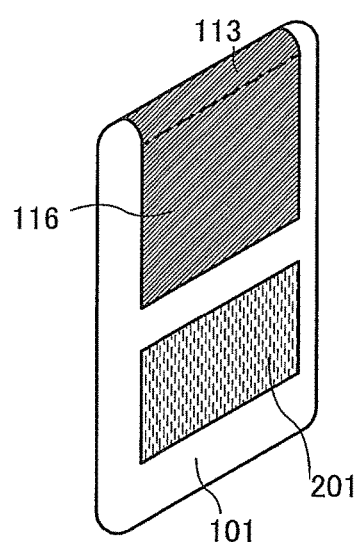

FIG. 2A1
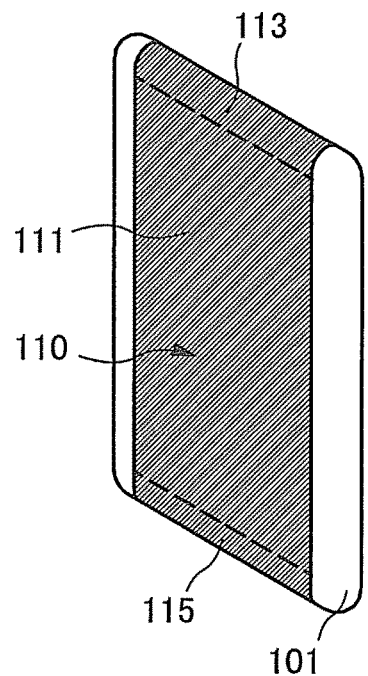
FIG. 2A2
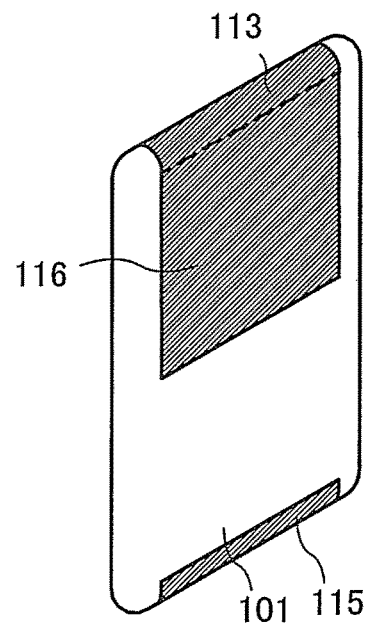
FIG. 2B1
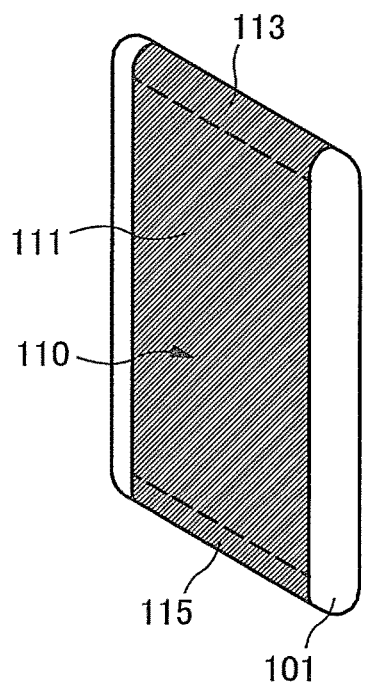
FIG. 2B2
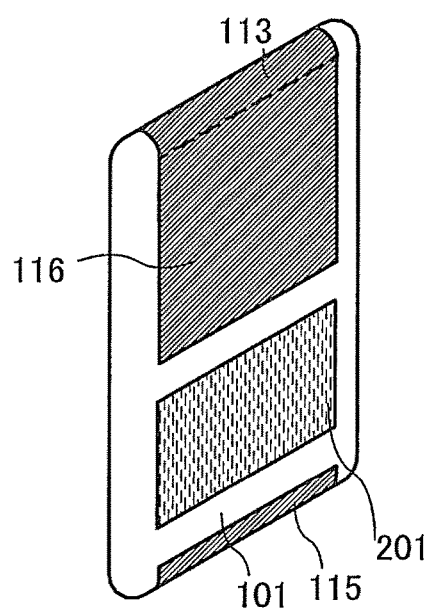

FIG. 3A1
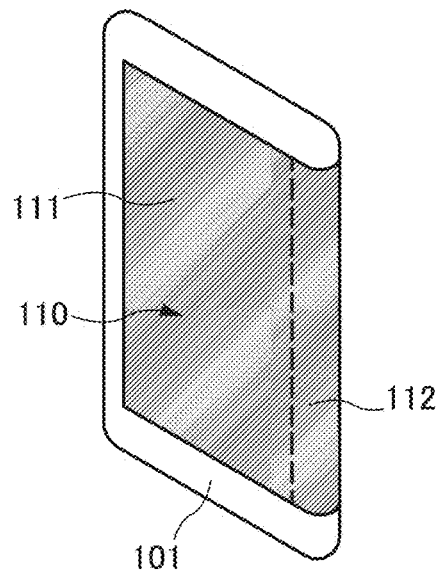
FIG. 3A2
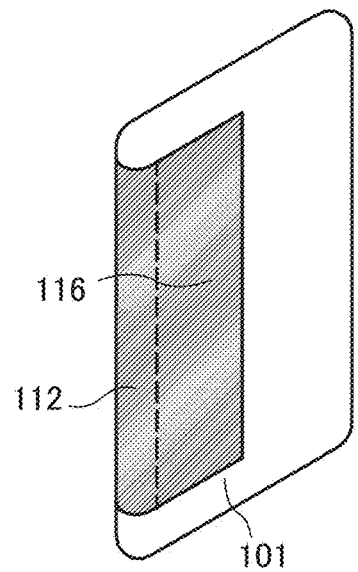
FIG. 3B1
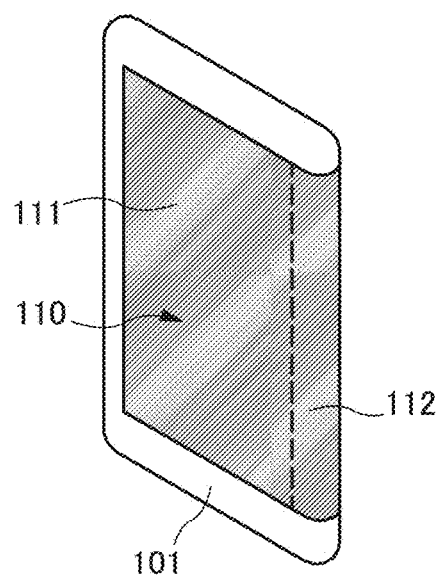
FIG. 3B2
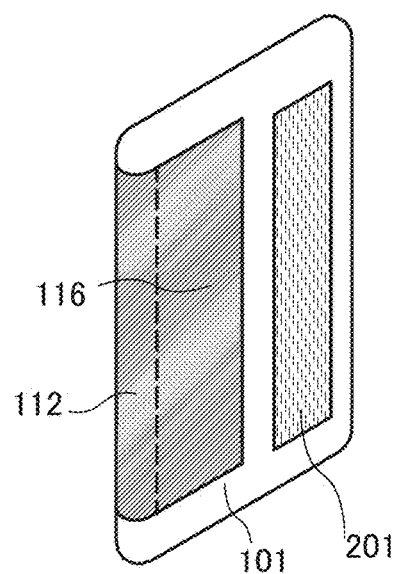

FIG. 4A1
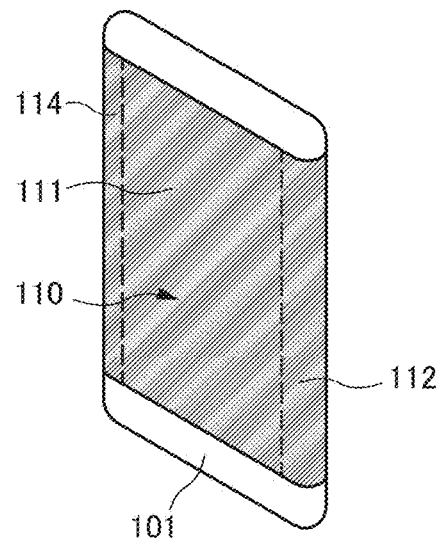
FIG. 4A2
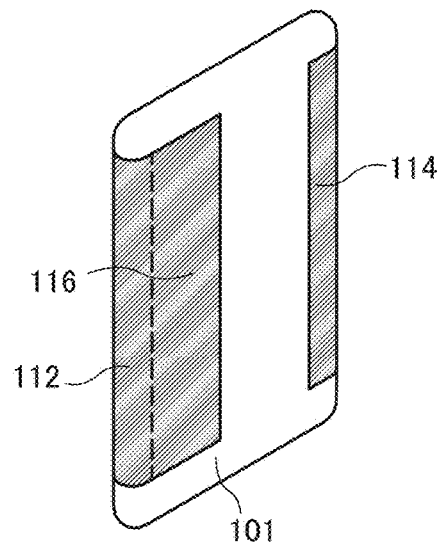
FIG. 4B1
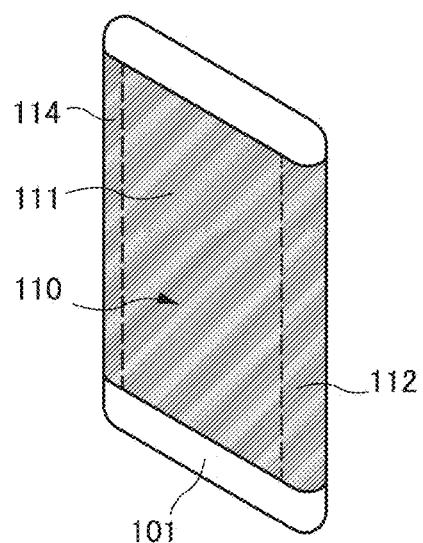
FIG. 4B2
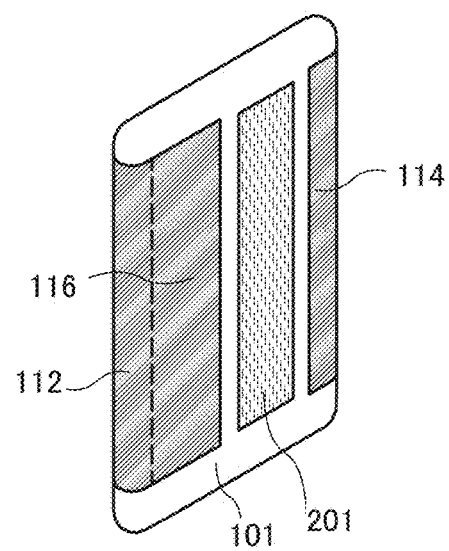

FIG. 8A1 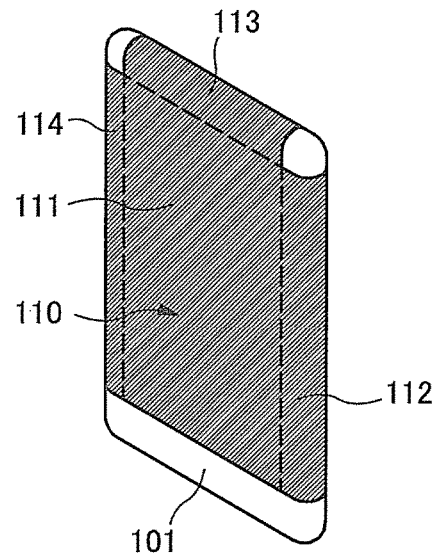
FIG. 8A2 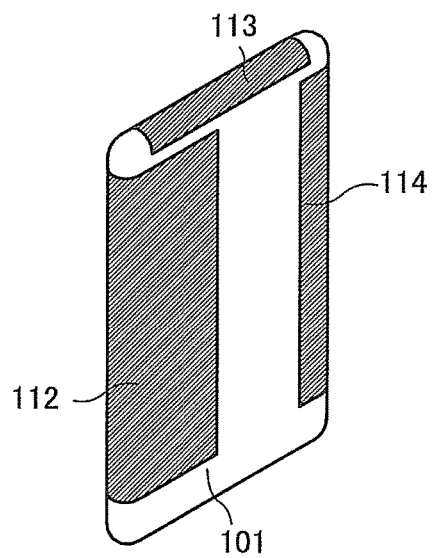
FIG. 8B1 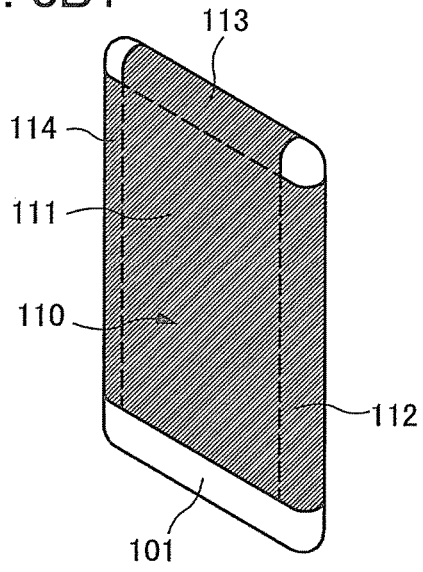
FIG. 8B2 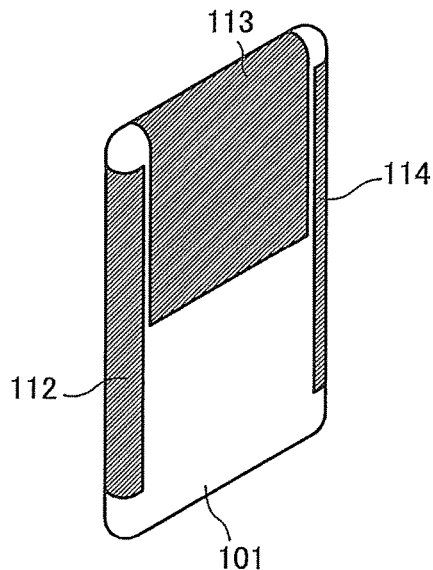

FIG. 9A1
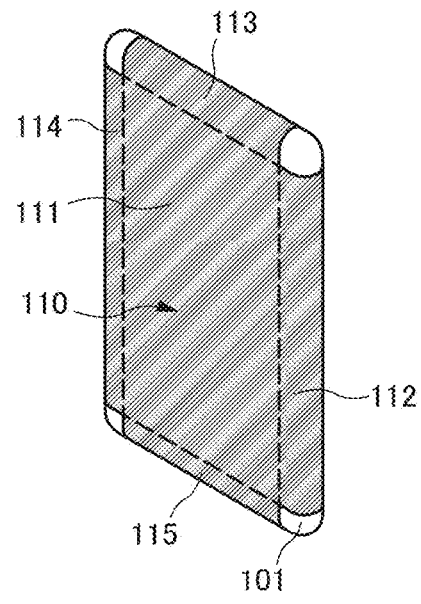
FIG. 9A2
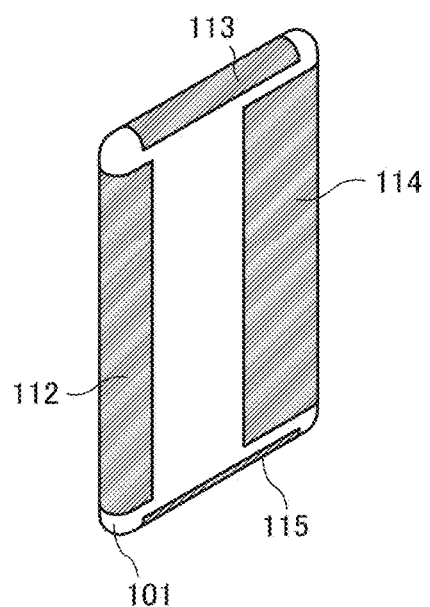
FIG. 9B1
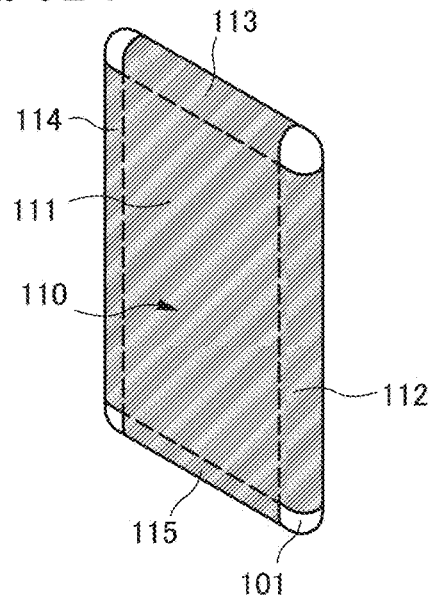
FIG. 9B2
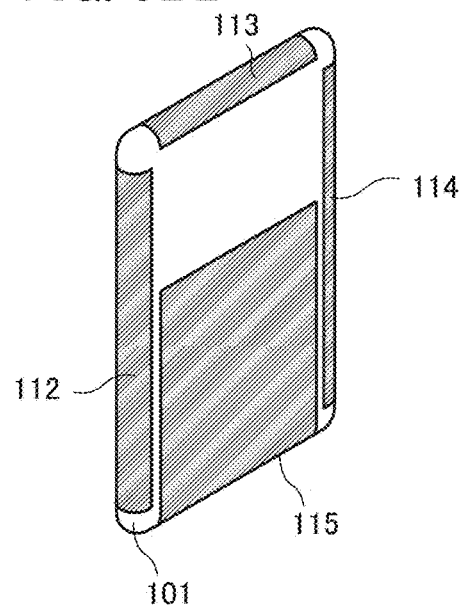

FIG. 10A1
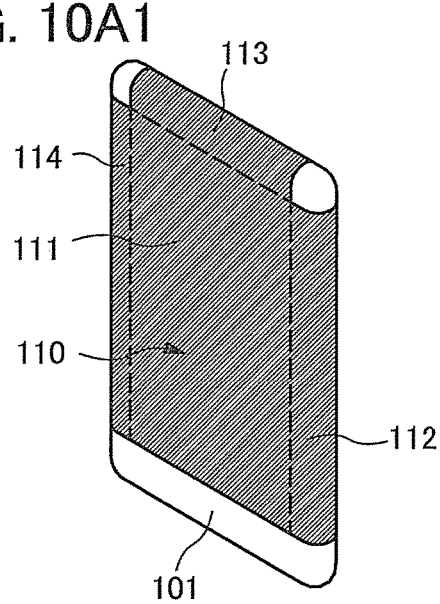
FIG. 10A2
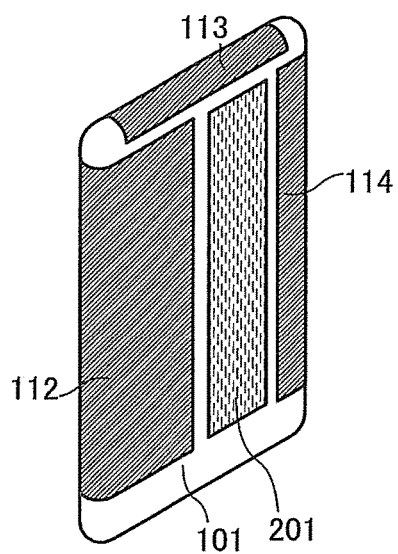
FIG. 10B1
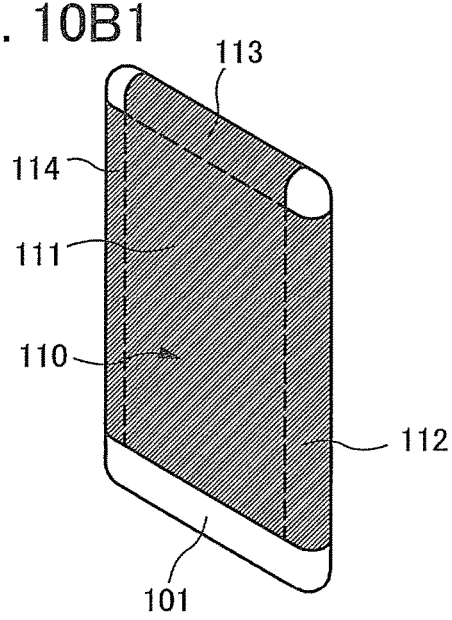
FIG. 10B2
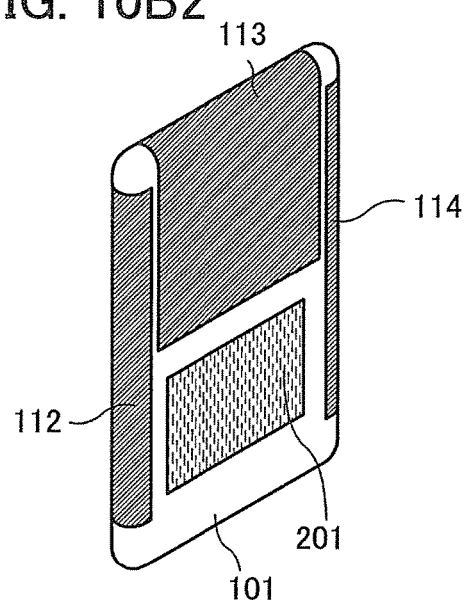

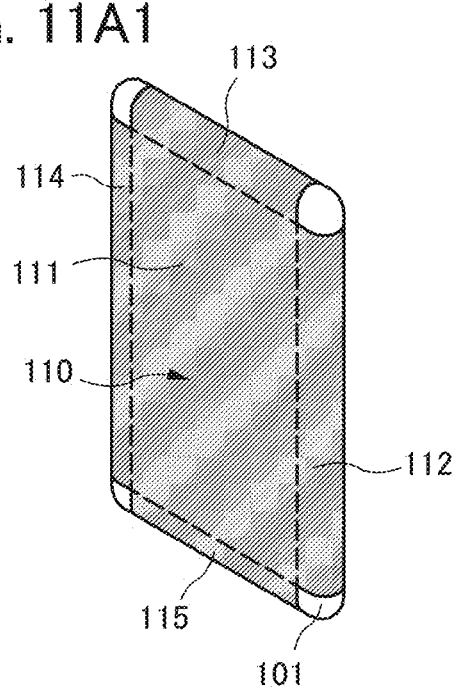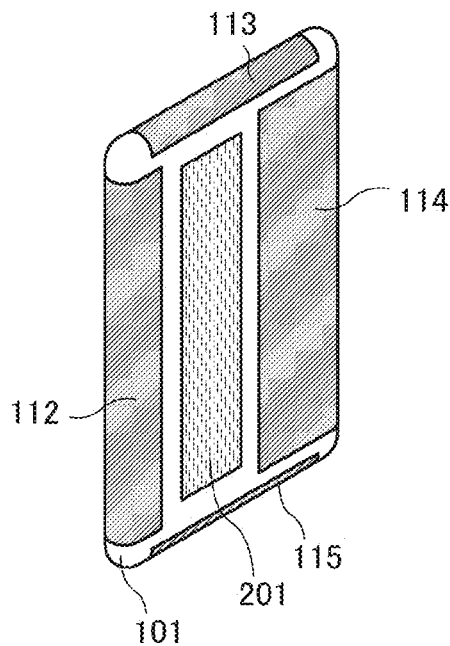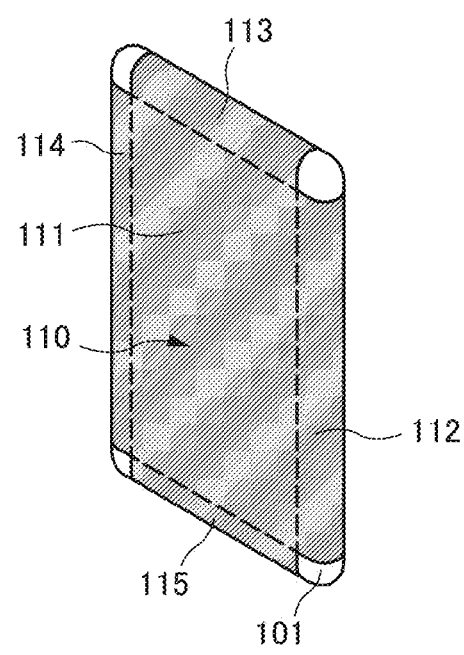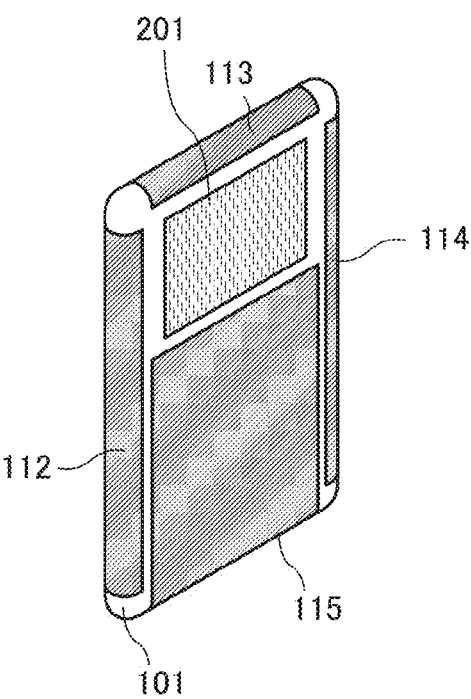

FIG. 12A1
FIG. 12A2
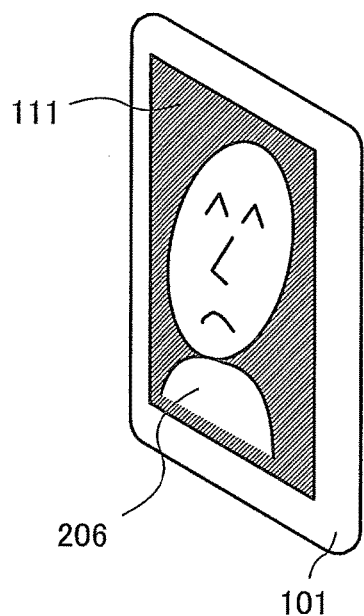
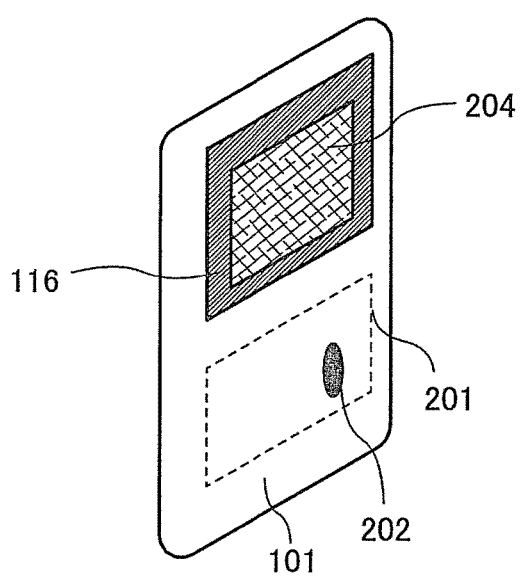

FIG. 13A1
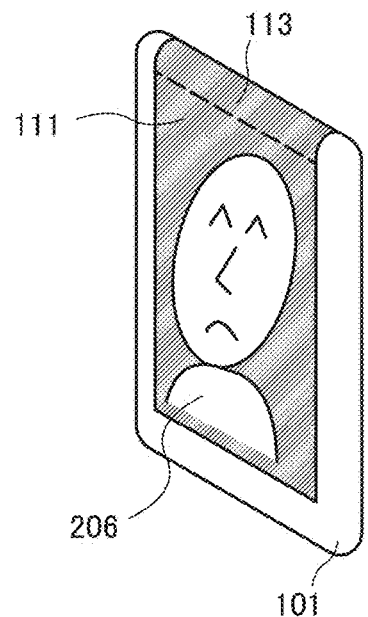
FIG. 13A2
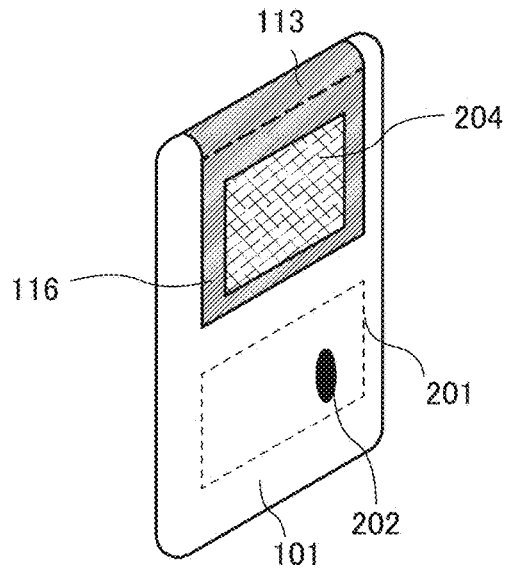
FIG. 13B
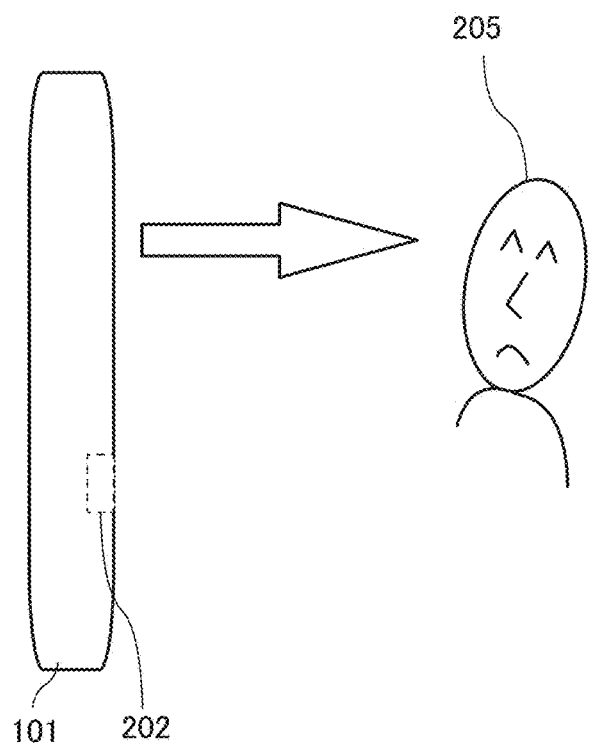

FIG. 14A1
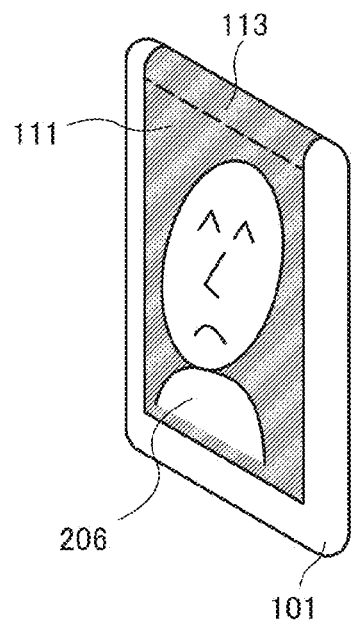
FIG. 14A2
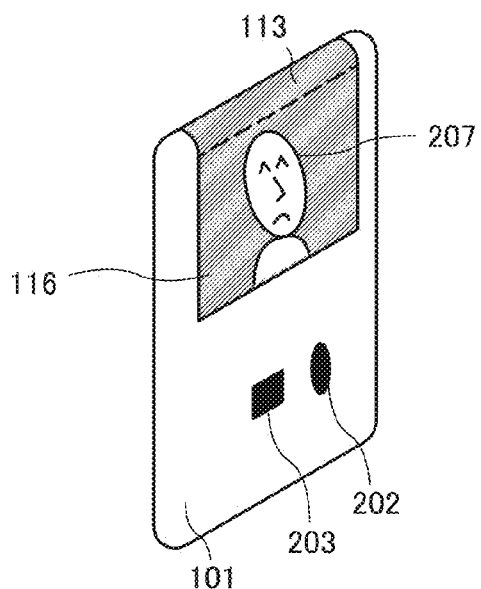
FIG. 14B
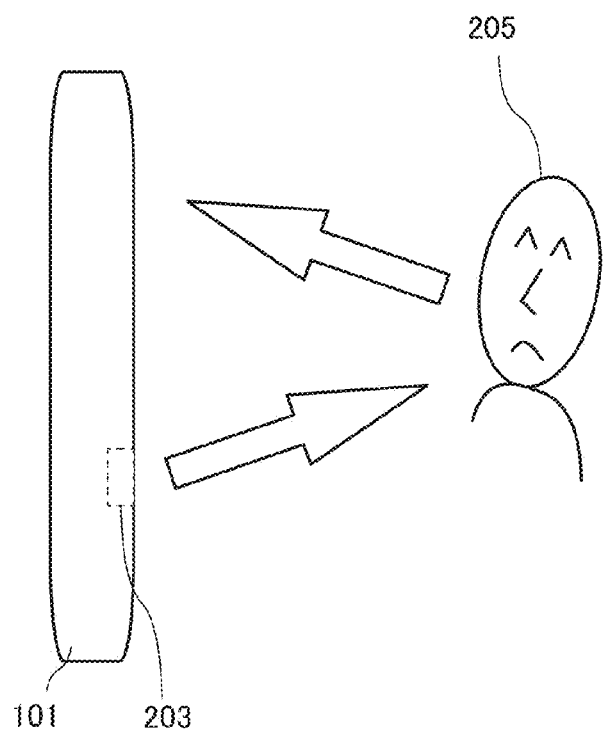

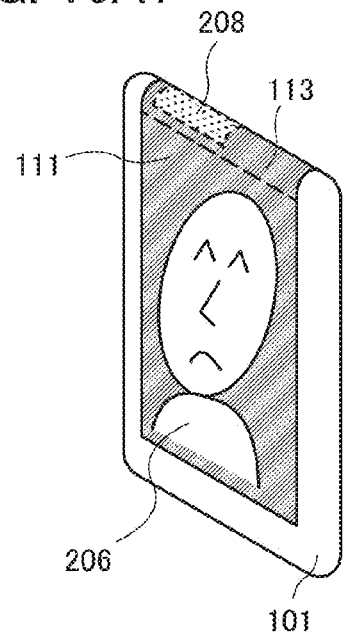
FIG. 16A1
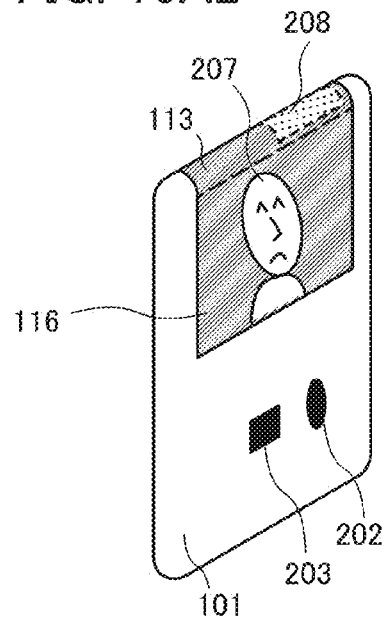
FIG. 16A2
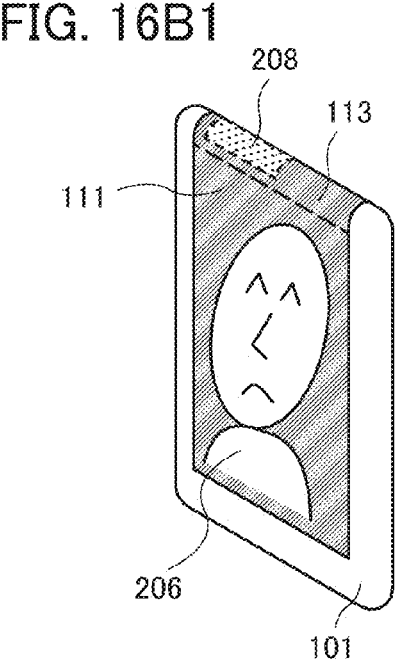
FIG. 16B1
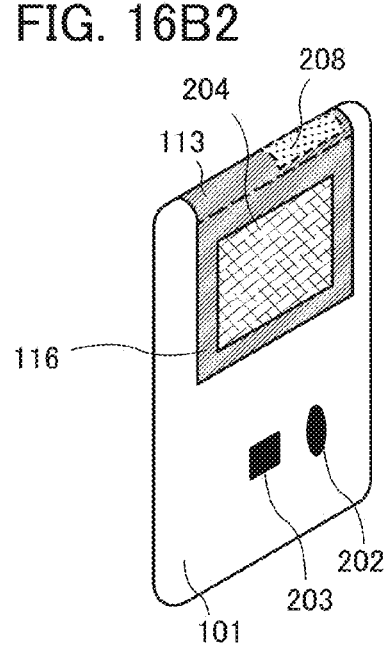
FIG. 16B2

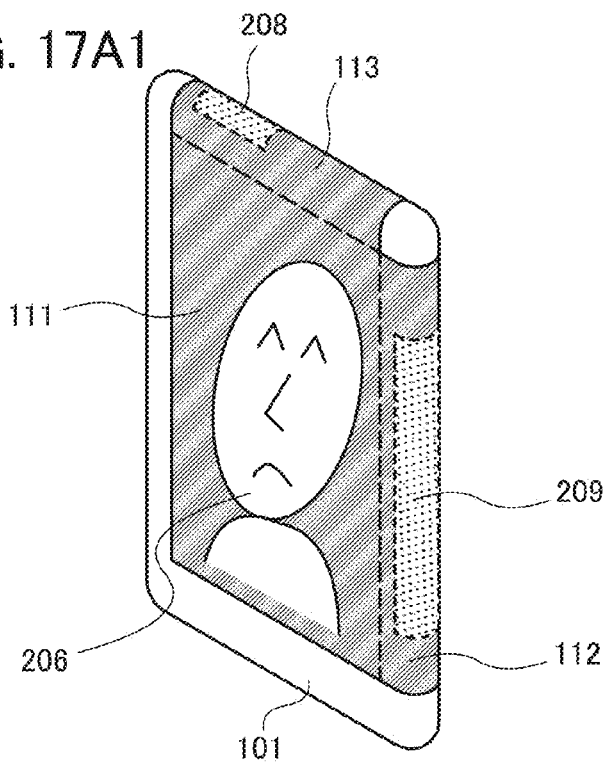
FIG. 17A1
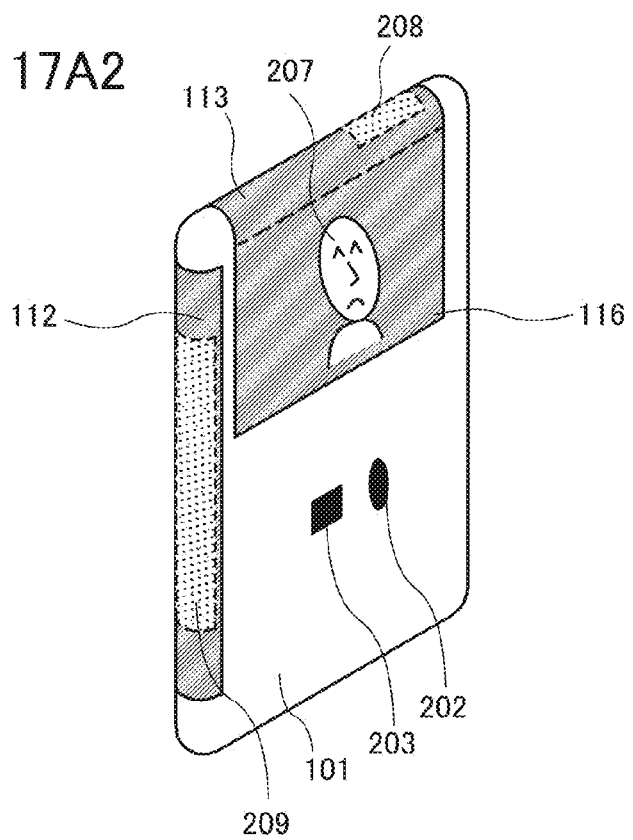
FIG. 17A2

FIG. 18A1
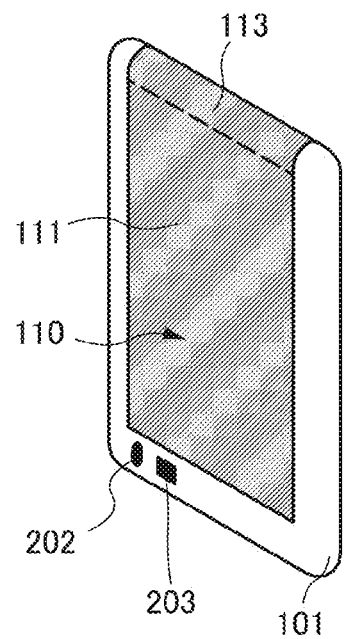
FIG. 18A2
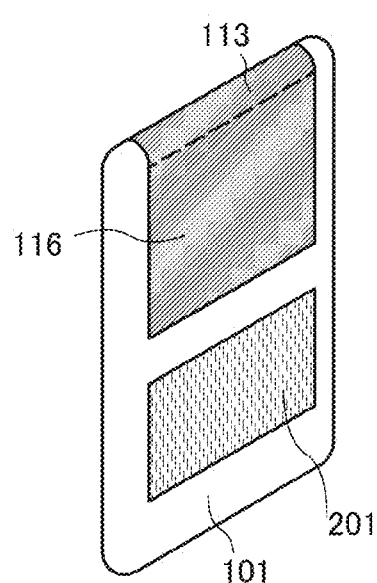
FIG. 18B1
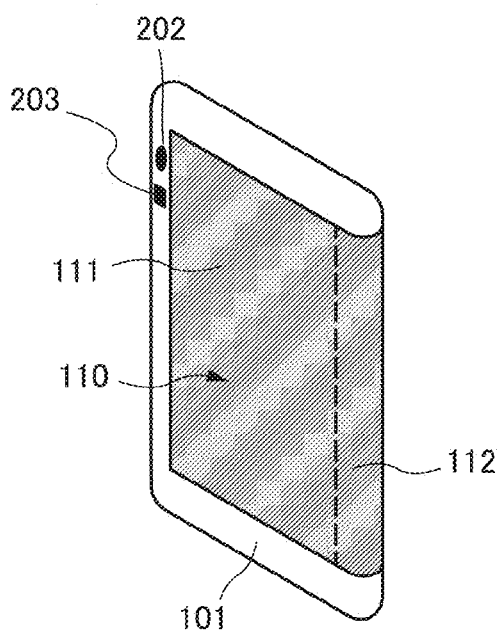
FIG. 18B2
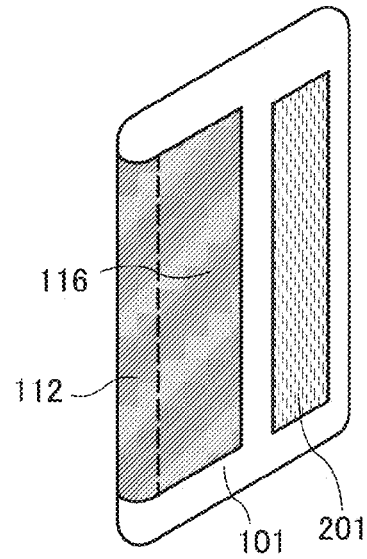

FIG. 19A1
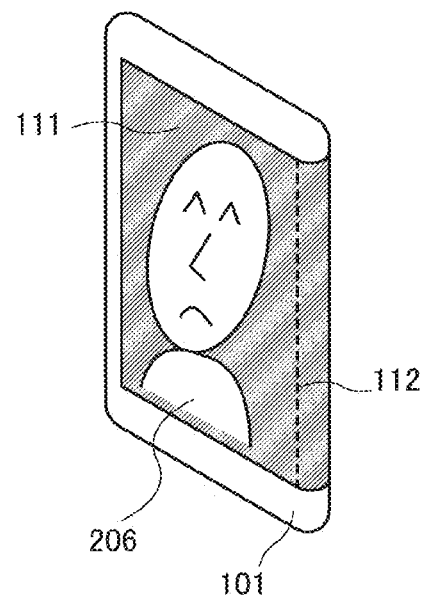
FIG. 19A2
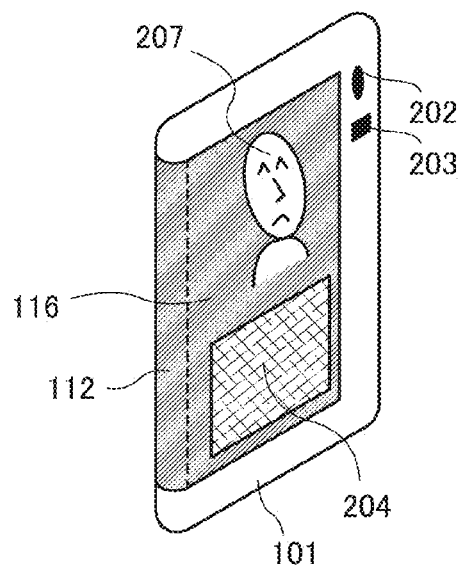
FIG. 19B1
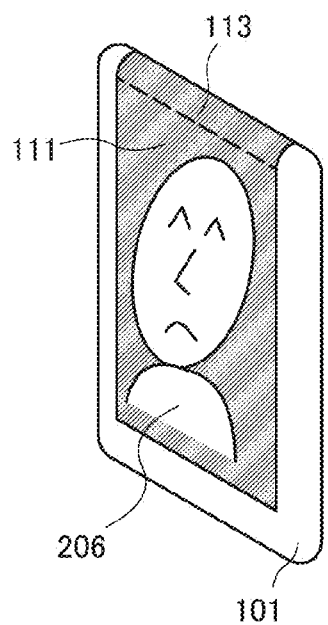
FIG. 19B2
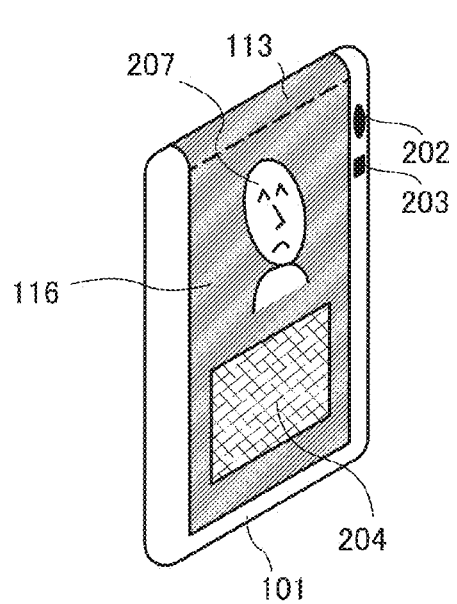

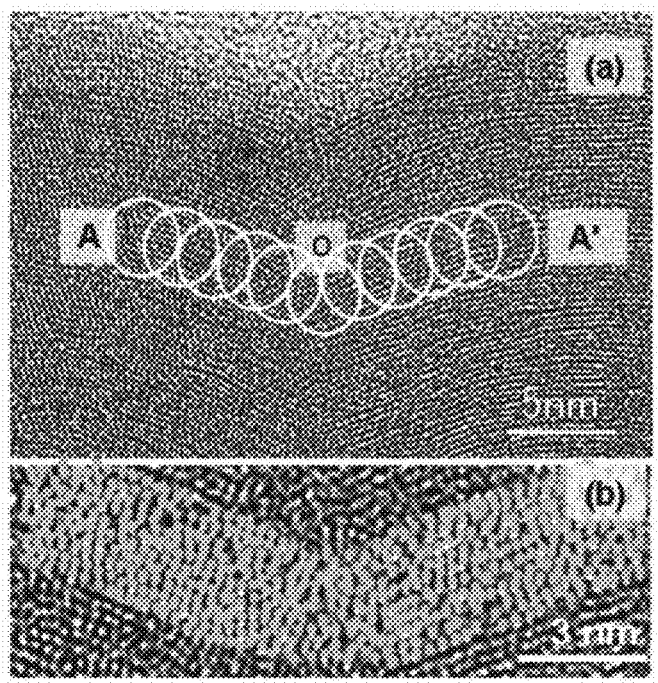
FIG. 31A
FIG. 31B
FIG. 31C
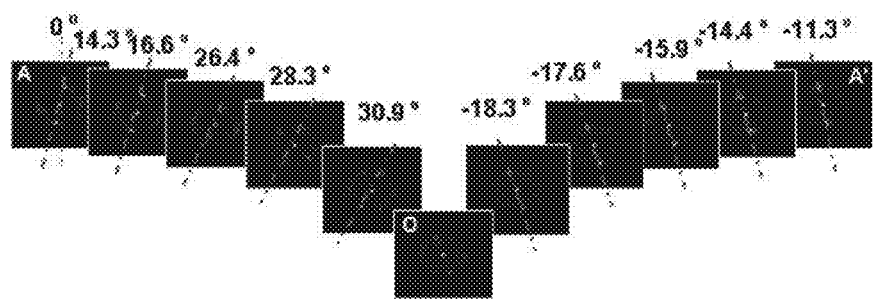

CAAC-OS nc-OS

- □ non-CAAC proportion
- ☱ CAAC proportion as-sputtered after a thermal treatment at 450°C

ELECTRONIC DEVICE AND DRIVING METHOD THEREOF

TECHNICAL FIELD

One embodiment of the present invention relates to a display device capable of display on a curved surface. Another embodiment of the present invention relates to a display device capable of display on different surfaces. Another embodiment of the present invention relates to an electronic device, a light-emitting device, or a lighting device which includes a display device capable of display on a curved surface, or a manufacturing method thereof. Another embodiment of the present invention relates to an electronic device, a light-emitting device, or a lighting device which is capable of display on different surfaces, or a manufacturing method thereof.

Note that one embodiment of the present invention is not limited to the above technical field. The technical field of one embodiment of the invention disclosed in this specification and the like relates to an object, a method, or a manufacturing method. In addition, one embodiment of the present invention relates to a, process, a machine, manufacture, or a composition of matter. Specifically, examples of the technical field of one embodiment of the present invention disclosed in this specification include a semiconductor device, a display device, a light-emitting device, a liquid crystal display device, a power storage device, a memory device, a method for driving any of them, and a method for manufacturing any of them.

BACKGROUND ART

Recent display devices are expected to be applied to a variety of uses and become diversified. For example, a reduction in thickness, improvement in performance, and multi-functionalization of a portable information terminal such as a smartphone or a tablet terminal including a touch panel have progressed.

Patent Document 1 discloses a flexible active matrix light-emitting device in which an organic EL element and a transistor serving as a switching element are provided over a film substrate.

REFERENCE

Patent Document

[Patent Document 1] Japanese Published Patent Application No. 2003-174153

DISCLOSURE OF INVENTION

An object of one embodiment of the present invention is to provide a novel electronic device. Another object of one embodiment of the present invention is to provide an electronic device capable of a variety of display. Another object of one embodiment of the present invention is to provide an electronic device which can be operated in a variety of ways. Another object of one embodiment of the present invention is to provide a display device (display panel) which can be used for such an electronic device. Another object of one embodiment of the present invention is to provide a novel display device or the like.

Another object of one embodiment of the present invention is to provide an electronic device or the like by which an appropriate image can be shot. Another object of one embodiment of the present invention is to provide an electronic device or the like which can emit light to an object. Another object of one embodiment of the present invention is to provide an electronic device or the like in which a battery can be easily replaced. Another object of one embodiment of the present invention is to provide an electronic device or the like which can be easily operated. Another object of one embodiment of the present invention is to provide an electronic device or the like by which a shooting condition can be checked by an object of shooting. Another object of one embodiment of the present invention is to provide an electronic device or the like which can easily perform wireless communication. Another object of one embodiment of the present invention is to provide an electronic device or the like which can produce a good quality sound. Another object of one embodiment of the present invention is to provide an electronic device or the like which can be bent or opened.

Note that the descriptions of these objects do not preclude the existence of other objects. Note that in one embodiment of the present invention, there is no need to achieve all the objects. Objects other than the above objects will be apparent from and can be derived from the description of the specification and the like.

One embodiment of the present invention is an electronic device including a display device and first to third surfaces. The first surface includes a region in contact with the second surface. The second surface includes a region in contact with the third surface. The first surface includes a region opposite to the third surface. The display device includes first to third display regions. The first display region includes a region overlapping with the first surface. The second display region includes a region overlapping with the second surface. The third display region includes a region overlapping with the third surface. The first display region has a larger area than the third display region.

Another embodiment of the present invention is an electronic device including a display device, an input device, and first to third surfaces. The first surface includes a region in contact with the second surface. The second surface includes a region in contact with the third surface. The first surface includes a region opposite to the third surface. The display device includes first to third display regions. The first display region includes a region overlapping with the first surface. The second display region includes a region overlapping with the second surface. The third display region includes a region overlapping with the third surface. The input device includes a region overlapping with the first display region, a region overlapping with the second display region, and a region overlapping with the third display region. The first display region has a larger area than the third display region.

Another embodiment of the present invention is an electronic device including a display device and first to third surfaces. The first surface includes a region in contact with the second surface. The second surface includes a region in contact with the third surface. The first surface includes a region opposite to the third surface. The display device includes first to third display regions. The first display region includes a region overlapping with the first surface. The second display region includes a region overlapping with the second surface. The third display region includes a region overlapping with the third surface. The display device functions as a touch sensor in the first to third display regions. The first display region has a larger area than the third display region.

Another embodiment of the present invention is an electronic device including a display device, an image sensor, and first to third surfaces. The first surface includes a region in contact with the second surface. The second surface includes a region in contact with the third surface. The first surface includes a region opposite to the third surface. The display device includes first to third display regions. The first display region includes a region overlapping with the first surface. The second display region includes a region overlapping with the second surface. The third display region includes a region overlapping with the third surface. The display device has a function of displaying a first image obtained by the image sensor in the first display region. The display device has a function of displaying a second image obtained by the image sensor in the second display region.

Another embodiment of the present invention is the electronic device which has the above structure and in which the second surface is a side surface.

Another embodiment of the present invention is a method for driving an electronic device including a display device, an image sensor, and first to third surfaces. The first surface includes a region in contact with the second surface. The second surface includes a region in contact with the third surface. The first surface includes a region opposite to the third surface. The display device includes first to third display regions. The first display region includes a region overlapping with the first surface. The second display region includes a region overlapping with the second surface. The third display region includes a region overlapping with the third surface. The method for driving the electronic device includes displaying a first image obtained by the image sensor in the first display region and displaying a second image obtained by the image sensor in the second display region.

Another embodiment of the present invention is the method for driving the electronic device having the above structure in which the second surface is a side surface.

Note that in this specification, the display device might include any of the following modules in its category: a module in which a connector such as a flexible printed circuit (FPC) or a tape carrier package (TCP) is attached to a display panel (display device); a module having a TCP provided with a printed wiring board at the end thereof; and a module having an integrated circuit (IC) directly mounted by a chip on glass (COG) method over a substrate over which a display element is formed.

According to one embodiment of the present invention, a novel electronic device can be provided. According to one embodiment of the present invention, an electronic device capable of a variety of display can be provided. According to one embodiment of the present invention, an electronic device which can be operated in a variety of ways can be provided. According to one embodiment of the present invention, a display device (display panel) which can be used for such an electronic device can be provided. According to one embodiment of the present invention, a novel display device or the like can be provided.

According to one embodiment of the present invention, an electronic device or the like by which an appropriate image can be shot can be provided. According to one embodiment of the present invention, an electronic device or the like which can emit light to an object can be provided. According to one embodiment of the present invention, an electronic device or the like in which a battery can be easily replaced can be provided. According to one embodiment of the present invention, an electronic device or the like which can be operated can be provided. According to one embodiment of the present invention, an electronic device or the like by which a shooting condition can be checked by an object of shooting can be provided. According to one embodiment of the present invention, an electronic device or the like which can easily perform wireless communication can be provided. According to one embodiment of the present invention, an electronic device or the like which can produce a good quality sound can be provided. According to one embodiment of the present invention, an electronic device or the like which can be bent or opened can be provided.

Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF DRAWINGS

In the accompanying drawings:

FIGS. 1A1, 1A2, 1B1, and 1B2 illustrate structure examples of an electronic device of an embodiment;

FIGS. 2A1, 2A2, 2B1, and 2B2 illustrate structure examples of an electronic device of an embodiment;

FIGS. 3A1, 3A2, 3B1, and 3B2 illustrate structure examples of an electronic device of an embodiment;

FIGS. 4A1, 4A2, 4B1, and 4B2 illustrate structure examples of an electronic device of an embodiment;

FIGS. 8A1, 8A2, 8B1, and 8B2 illustrate structure examples of an electronic device of an embodiment;

FIGS. 9A1, 9A2, 9B1, and 9B2 illustrate structure examples of an electronic device of an embodiment;

FIGS. 10A1, 10A2, 10B1, and 10B2 illustrate structure examples of an electronic device of an embodiment;

FIGS. 11A1, 11A2, 11B1, and 11B2 illustrate structure examples of an electronic device of an embodiment;

FIGS. 12A1 and 12A2 illustrate a structure example of an electronic device of an embodiment;

FIGS. 13A1, 13A2, and 13B illustrate a structure example of an electronic device of an embodiment;

FIGS. 14A1, 14A2, and 14B illustrate a, structure example of an electronic device of an embodiment;

FIGS. 16A1, 16A2, 16B1, and 16B2 illustrate structure examples of an electronic device of an embodiment:

FIGS. 17A1 and 17A2 illustrate a structure example of an electronic device of an embodiment;

FIGS. 18A1, 18A2, 18B1, and 18B2 illustrate structure examples of an electronic device of an embodiment;

FIGS. 19A1, 19A2, 19B1, and 19B2 illustrate structure examples of an electronic device of an embodiment;

FIGS. 31A to 31C are cross-sectional TEM images and a local Fourier transform image of an oxide semiconductor;

BEST MODE FOR CARRYING OUT THE INVENTION

Figure 5A:
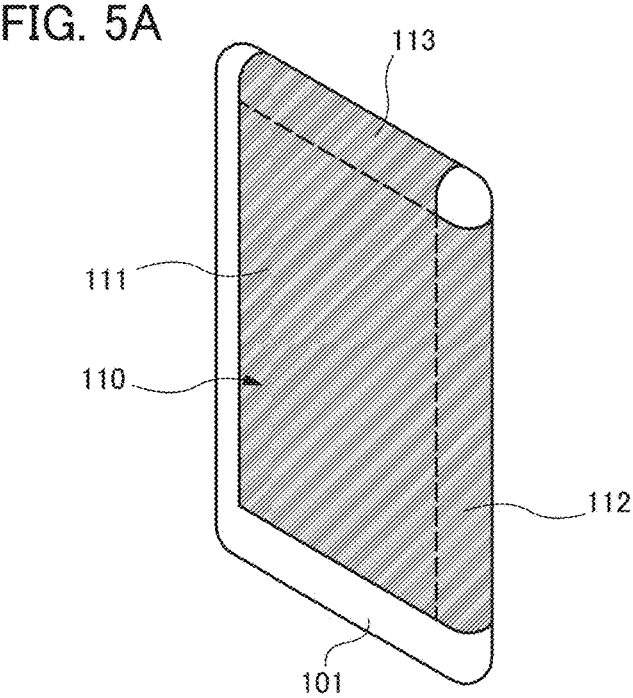
FIGS. 5A to 5C illustrate structure examples of an electronic device of an embodiment.

Embodiments are described below with reference to drawings. However, the embodiments can be implemented with various modes. It will be readily appreciated by those skilled in the art that modes and details can be changed in various ways without departing from the spirit and scope of the present invention. Therefore, the present invention should not be interpreted as being limited to description of the embodiments. Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

Note that a content (or may be part of the content) described in one embodiment may be applied to, combined with, or replaced with a different content (or may be part of the different content) described in the embodiment and/or a content (or may be part of the content) described in another embodiment or other embodiments.

Note that in each embodiment, content is described with reference to a variety of figures or to text described in this specification.

Note that by combining a figure (or maybe part of the figure) illustrated in one embodiment with another part of the figure, a different figure (or may be part of the different figure) illustrated in the embodiment, and/or a figure (or may be part of the figure) illustrated in another embodiment or other embodiments, much more figures can be formed.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Embodiment 1

In this embodiment, an electronic device of one embodiment of the present invention and a display device (also referred to as a display panel) that can be used in the electronic device are described with reference to drawings.

Examples of Electronic Device

FIG. 1A1 is a schematic perspective view illustrating the front surface side of an electronic device described below, and FIG. 1A2 is a schematic perspective view illustrating the rear surface side thereof.

The electronic device illustrated in FIGS. 1A1 and 1A2 includes a housing 101 and a display panel 110 provided on a surface (e.g., a front surface, a rear surface, or a side surface) of the housing 101 to perform display. Note that a cover, a resin, or the like is provided over the display panel 110 to prevent a damage and destruction in some cases.

The housing 101 has a front surface, a rear surface, a first side surface, a second side surface including a region in contact with the first side surface, a third side surface including a region opposite to the first side surface, and a fourth side surface including a region opposite to the second side surface. Alternatively, the housing 101 has a first side surface. The first side surface includes a region in contact with a front surface and/or a rear surface. Alternatively, the housing 101 has a second side surface. The second side surface includes a region in contact with a front surface and/or a rear surface. Alternatively, the housing 101 has a third side surface. The third side surface includes a region in contact with a front surface and/or a rear surface. Alternatively, the housing 101 has a fourth side surface. The fourth side surface includes a region in contact with a front surface and/or a rear surface.

Note that the front surface includes a region opposite to the rear surface.

In other words, the housing 101 has a plurality of surfaces. For example, the housing 101 has a front surface, a rear surface, and at least four side surfaces. Each surface might smoothly change; thus, the boundary between surfaces is not easily determined in some cases. Description is made using "side surface", and the side surface includes a region of part of a front surface or a rear surface in some cases.

For example, the side surface refers to a region which can be observed from the side (for example, the direction in which the rear surface or the front surface cannot be seen). Note that in the case where the front surface, the rear surface, the side surface, or the like has a curved surface, it is difficult to determine the boundary in some cases. In this case, for example, it can be said in some cases that one region is part of the front surface (rear surface) and part of the side surface. Similarly, for example, it can be said in some cases that one region is part of one side surface and part of another side surface.

For example, the side surface includes a region in contact with the front surface. Alternatively, the side surface includes a region in contact with the rear surface. For example, the side surface includes a region in contact with another side surface.

Here, the front surface and/or the rear surface includes a flat region, for example. Alternatively, the front surface and/or the rear surface includes a curved region, for example. The side surface includes a curved region, for example. Alternatively, the side surface includes a flat region, for example. Note that it is difficult to distinguish the front surface and the rear surface in some cases. Therefore, the front surface is referred to as a rear surface, or the rear surface is referred to as a front surface in some cases. Note that the front surface includes a larger display region than the rear surface in some cases. Note that the area of the side surface is smaller than that of the front surface or the rear surface, for example.

Note that another surface may be provided in addition to the above surfaces. In other words, the housing 101 is not a hexagon but has a larger number of surfaces in some cases. Alternatively, the housing 101 has a smaller number of surfaces than the above in some cases.

The display panel 110 includes a display region 111 provided to include a region overlapping with the front surface of the housing 101. The display panel 110 includes a display region 113 provided to include a region overlapping with one of the side surfaces of the housing 101. The display panel 110 includes a display region 116 provided to include a region overlapping with a region of part of the rear surface of the housing 101. Note that here, a side of a side surface on which the display region 113 is provided is shorter than a side of a side surface on which the display region 113 is not provided, for example. The area of a side surface on which the display region 113 is provided is smaller than that of a side surface on which the display region 113 is not provided, for example. In other words, a side surface on which the display region 113 is provided is parallel to the minor-axis direction and perpendicular to the major-axis direction, for example.

The boundaries of the display region 111, the display region 113, and the display region 116 are denoted by dotted lines in drawings in some cases. Note that the boundaries can be different from those denoted by dotted lines in drawings depending on circumstances or conditions.

In the four side surfaces of the housing 101, a region including a region overlapping with at least the display panel 110 preferably has a curved surface. For example, it is preferable that there be no corner portion between the front surface and the side surface and between the side surface and the rear surface and that these surfaces be continuous. A side surface is preferably a curved surface such that the inclination of a tangent line is continuous from the front surface to the rear surface of the housing 101, for example. In particular, the side surface is preferably a developable surface that is obtained by transforming a flat surface without expansion and contraction. With such a shape, the display panel 110 can be smoothly bent. In other words, the curvature radius when the display panel 110 is bent can be increased. Thus, the display panel 110 can be hardly affected by bending, and the lifetime of the display panel 110 can be increased. Furthermore, with such a shape, an image displayed on the display panel 110 can be seen to be smoothly changed. Therefore, the image can be viewed with less unpleasant sensation. Note that one embodiment of the present invention is not limited to the above examples.

Here, for example, the area of the display region 111 is larger than that of the display region 116. For example, the length of a side of the display region 111 is longer than that of a side of the display region 116. Therefore, as illustrated in FIGS. 1B1 and 1B2, a region 201 can be obtained on the rear surface of the housing 101. In other words, the display region 116 and the region 201 are provided on the rear surface of the housing 101. For example, the display region 116 is not provided in the region 201. Thus, components having a variety of functions can be provided in the region 201.

For example, the area of the display region 116 is greater than or equal to 10% and less than or equal to 90% of the area of the display region 111. Preferably, the area of the display region 116 is, for example, greater than or equal to 30% and less than or equal to 70% of the area of the display region 111.

For example, the length of a side of the display region 116 is greater than or equal to 10% and less than or equal to 90% of the length of a side of the display region 111. Preferably, the length of a side of the display region 116 is, for example, greater than or equal to 30% and less than or equal to 70% of the length of a side of the display region 111.

Note that on a surface of the housing 101 (e.g., a front surface, a rear surface, or a side surface), a hardware button, an external connection terminal, an image sensor, an infrared ray sensor, a microphone, a speaker, or the like may be provided in addition to the display panel 110.

Although FIGS. 1A1 and 1A2 show the case where one side surface of the housing 101 is used as the display region, the display region may be overlapped with another side surface.

For example, FIGS. 2A1 and 2A2 show a structure example where a display region 115 is further provided. The display region 115 includes a region overlapping with a side surface opposite to the display region 113. Here, FIG. 2A1 is a schematic perspective view illustrating the front surface side of an electronic device, and FIG. 2A2 is a schematic perspective view illustrating the rear surface side thereof. FIGS. 2B1 and 2B2 show the case where the region 201 is provided.

As another example, FIGS. 3A1 and 3A2 show a structure example where the display panel 110 includes the display region 111, the display region 116, and a display region 112. Here, the display region 112 is provided to include a region overlapping with one of the side surfaces of the housing 101. Here, the length of a side of the side surface on which the display region 112 is provided is longer than that of a side of the side surface on which the display region 112 is not provided (e.g., the side surface on which the display region 113 is provided in FIG. 1A1). For example, the area of the side surface on which the display region 112 is provided is larger than that of the side surface on which the display region 112 is not provided. In other words, the side surface on which the display region 112 is provided is parallel to the major-axis direction and perpendicular to the minor-axis direction, for example. Here, FIG. 3A1 is a schematic perspective view illustrating the front surface side of the electronic device, and FIG. 3A2 is a schematic perspective view illustrating the rear surface side thereof. FIGS. 3B1 and 3B2 show the case where the region 201 is provided.

Furthermore, as another example, FIGS. 4A1 and 4A2 show a structure example of the case where a display region 114 including a region overlapping with the side surface opposite to the display region 112 is further provided. Here, FIG. 4A1 is a schematic perspective view illustrating the front surface side of an electronic device, and FIG. 4A2 is a schematic perspective view illustrating the rear surface side thereof. FIGS. 4B1 and 4B2 show the case where the region 201 is provided.

Figure 5B:
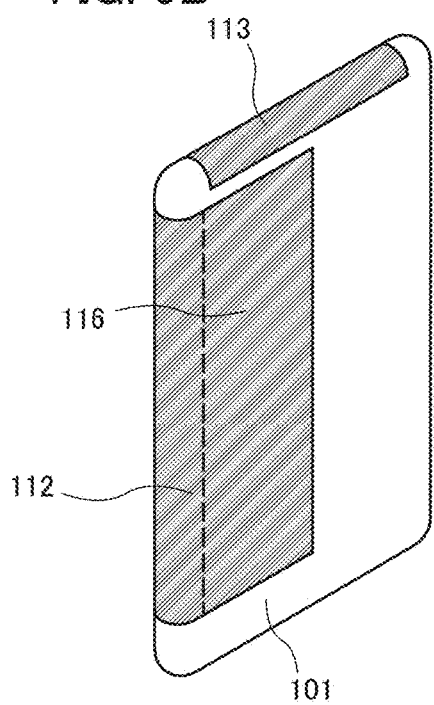
Figure 5C:
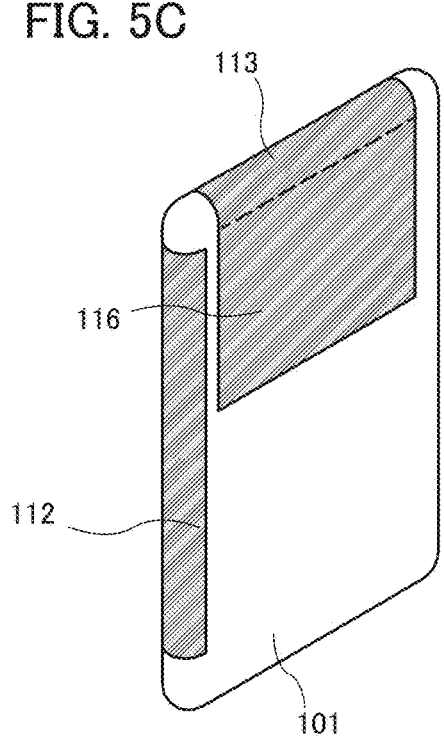
Figure 6A:
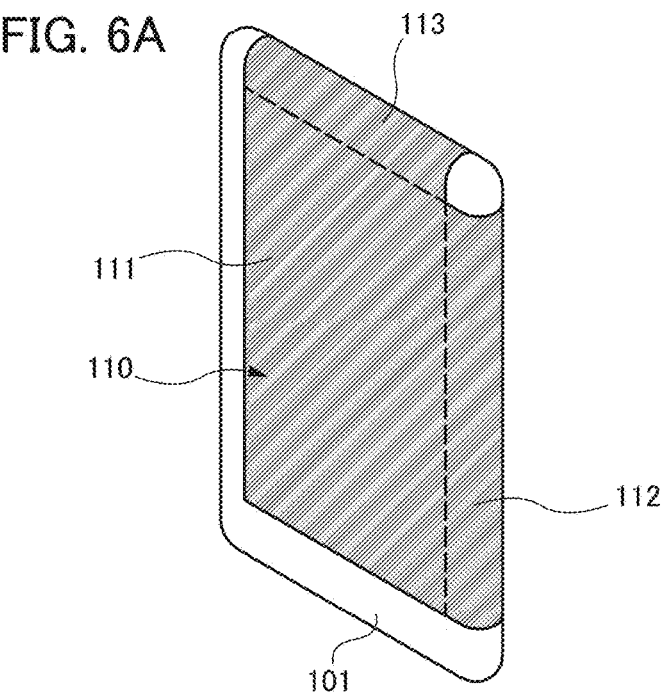
FIGS. 6A to 6C illustrate structure examples of an electronic device of an embodiment.
Figure 6B:
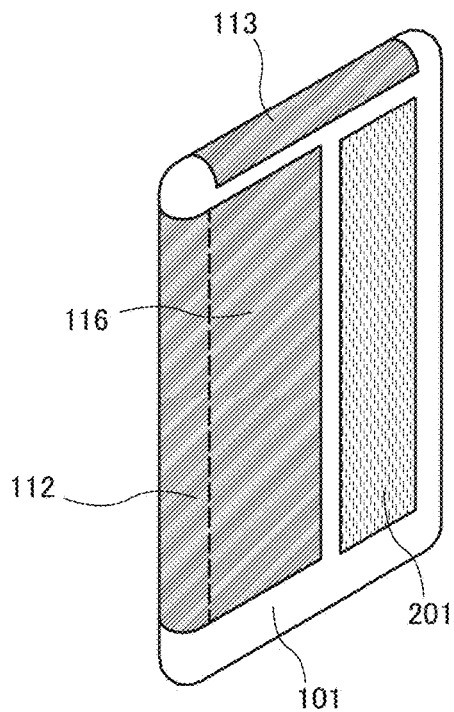
Figure 6C:
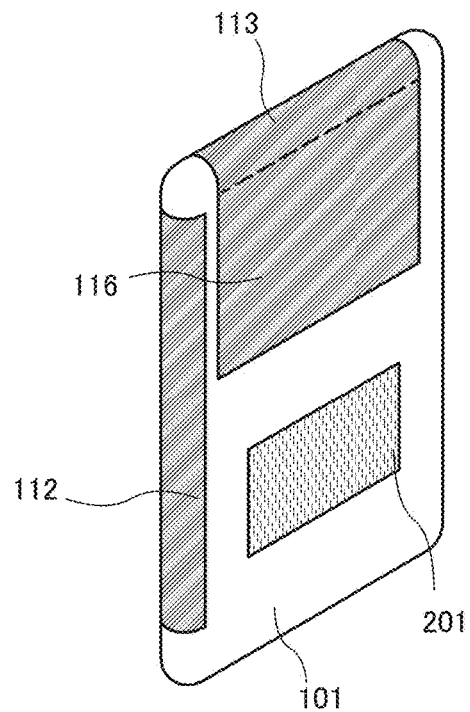

As another example, FIGS. 5A to 5C show structure examples where the display panel 110 includes the display region 111, the display region 116, the display region 112, and the display region 113. Here, the display region 112 is provided to include a region overlapping with one of the side surfaces of the housing 101. The display region 113 is provided to include a region overlapping with another one of the side surfaces of the housing 101. Here, the length of a side of the side surface on which the display region 112 is provided is longer than that of a side of the side surface on which the display region 113 is provided, for example. The area of the side surface on which the display region 112 is provided is larger than that of the side surface on which the display region 113 is provided, for example. Here, FIG. 5A shows an example of a schematic perspective view illustrating the front surface side of an electronic device, and FIG. 5B shows an example of a schematic perspective illustrating the rear surface side thereof: FIG. 5C shows an example different from that in FIG. 5B. FIGS. 6A to 6C show the case where the region 201 is provided.

With such a structure, display can be performed not only on a surface parallel to a front surface of a housing but also on a side surface and a rear surface of the housing. In particular, a display region is preferably provided along two or more side surfaces of the housing because the variations of display are further increased.

The display region 111 provided along the front surface of the housing 101, the display region 116 provided along the rear surface of the housing 101, and the display regions provided along the side surfaces of the housing 101 may be independently used as display regions to display different images and the like, or two or more of the display regions may display one image or the like. For example, a continuous image may be displayed on the display region 111 provided along the front surface of the housing 101, the display region 112 provided along the side surface of the housing 101, the display region 116 provided along the rear surface of the housing 101, and the like.

For example, text data, a plurality of icons associated with an application or the like, and the like may be displayed on the display region 111 provided along the front surface of the housing 101. Icons associated with an application or the like, and the like may be displayed on the display region 112.

Furthermore, display can be performed so that text data or the like rolls (moves) across a plurality of display regions (e.g., the display region 113 and the display region 112) provided along the side surfaces of the housing 101. Alternatively, display can be performed so that text data or the like rolls (moves) across display regions along the front surface, the side surface, and the rear surface. By performing display across two or more surfaces of the housing in this manner, a user can be prevented from missing displayed data regardless of the direction of the electronic device when, for example, a phone call is received.

In addition, transmitter information (e.g., a name, a phone number, an e-mail address, and the like of a transmitter) may be displayed on not only the display region 111 but also the display region 116, a display region provided along the side surface such as the display region 112, and the like when, for example, a phone call or a text message is received. For example, transmitter information may be displayed to flow in the display region 112 and the display region 113 when a text message is received.

Figure 7A:
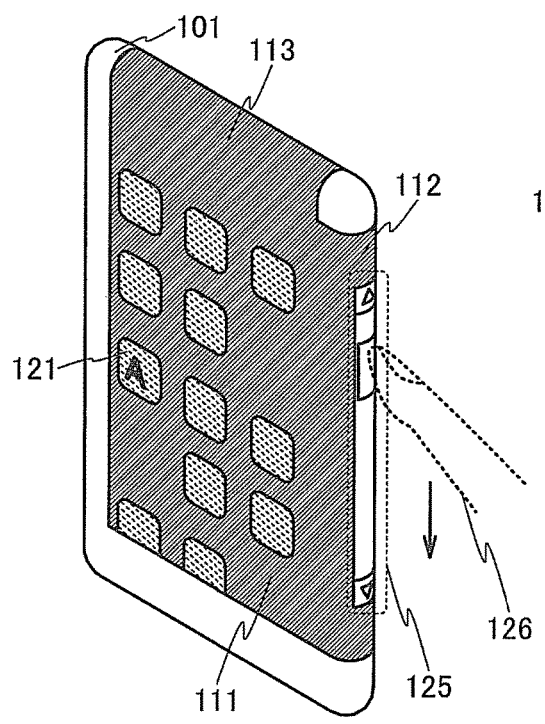
FIGS. 7A and 7B illustrate a structure example of an electronic device of an embodiment.
Figure 7B:
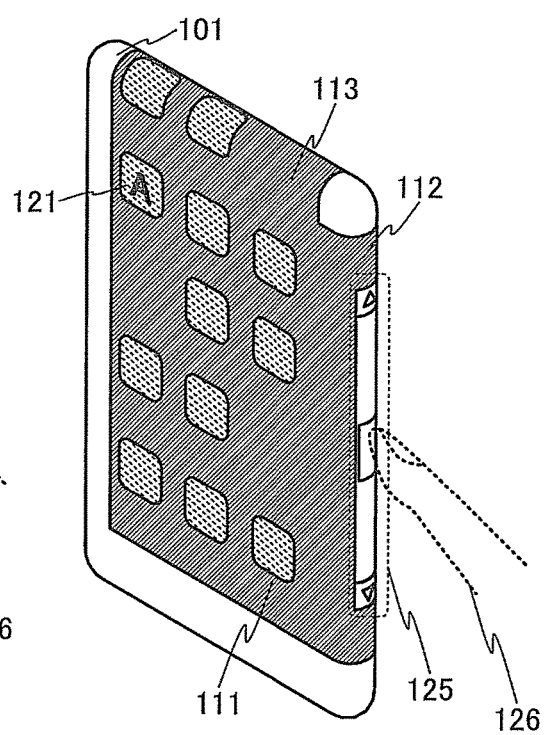

FIGS. 7A and 7B show an example of a use state of an electronic device. In FIG. 7A, a plurality of icons 121 are displayed on the display region 111 and a slide bar 125 is displayed on the display region 112. By touching the slide bar 125 with a finger 126 or the like to move the slide bar up or down, display contents such as the icons 121 displayed on the display region 111 are slid up or down accordingly as illustrated in FIG. 7B. FIGS. 7A and 7B illustrate a state where images of the plurality of icons 121 and the like are slid up from the display region 111 to the display region 113 by sliding the slide bar 125 down with the finger 126.

Although the case where an image displayed on the display region 111 is an icon is shown here, one embodiment of the present invention is not limited thereto; depending on a launched application, a variety of data such as text, still images, and moving images can be displayed by sliding the slide bar 125 with a finger or the like. The position of the slide bar 125 is not limited to the display region 112, and the slide bar 125 may be provided on the display region 111, the display region 113, the display region 114, the display region 116, or the like.

During a standby time during which the electronic device is not used, display on the display region 111 provided along the front surface of the housing 101 and/or display on the display region 116 provided along the rear surface thereof may be turned off (e.g., black display), data may be displayed only on the display region 112 or the like provided along the side surface, and the display state may be switched. Display on the display region 111 or the display region 116 which has an area larger than those of the other display regions is not performed, so that power consumption in a standby time can be reduced. Alternatively, in contrast, only display on the display region 111 is performed and display on at least one of regions such as the display region 116 and a side surface display region is not performed, so that power consumption in use can be reduced.

Alternatively, display of data may be performed in only part of the display region 111 provided along the front surface of the housing 101, the display region 116 provided along the rear surface of the housing 101, the display region 112 provided along the side surface of the housing 101, and the like. For example, display may be performed in the display region 111 and the display region 116, and display of the display region 112 provided along the side surface, or the like may be turned off.

Furthermore, it is preferable that an input device such as a touch sensor be included at a position overlapping with the display panel 110, specifically, in regions overlapping with display regions. As a touch sensor, for example, a sheet-like capacitive touch sensor may be provided to overlap with the display panel 110. Alternatively, a so-called in-cell touch sensor in which the display panel 110 itself has a touch sensor function may be used. In this case, it can be said that the display panel 110 has not only a display function but also a function as a touch sensor. As an in-cell touch panel, a capacitive touch sensor may be used or an optical touch sensor using a photoelectric conversion element may be used. Alternatively, a so-called on-cell touch sensor having a touch sensor function on a counter substrate of the display panel 110 (a substrate over which a transistor or the like is not provided) may be used. Also in this case, it can be said that the display panel 110 has not only a display function but also a touch sensor function. Alternatively, a so-called cover integrated touch panel in which a cover or a cover glass which is provided on an outermost surface of the housing 101 and prevents damage and the like has a touch sensor function may be used. Alternatively, a touch sensor in which an optical film included in the display panel 110 has a touch sensor function may be used.

It is desirable that an input device such as a touch sensor is provided in the entire region where the display panel 110 can perform display, for example. Note that one embodiment of the present invention is not limited thereto. For example, in part or the whole of each of the display region 111, the display region 112, the display region 113, the display region 114, the display region 115, and the display region 116 may include a region where an input device such as a touch sensor is not provided. For example, part or the whole of the display region 116 may include a region where an input device such as a touch sensor is not provided. Alternatively, a region of part or the whole of the display region 112 and a region of part or the whole of the display region 114 may include a region where an input device such as a touch sensor is not provided. By providing such a region where a touch sensor is not provided, a malfunction can be prevented. Furthermore, an electronic device can be easily handled.

For example, combination of touch operations on the display region 111, the display region 112, the display region 113, the display region 114, the display region 115, or the display region 116 is preferably associated with an application operation.

An example of association between combination of touch operations on the display region 112, the display region 113, and the display region 115 and an application operation is shown. For example, a power on/off operation is performed when all the three display regions are touched. When the display region 112 and the display region 114 are touched at the same time, an application associated with text messages is started and contents of a text message are displayed at the same time. When the display region 112 and the display region 113 are touched at the same time, application for making a phone call is started. When the display region 113 and the display region 114 are touched at the same time, a web browser is started.

The above association between the touch operation and the application is an example, and it is preferable that a developer of operating system or application software or a user can determine an association as appropriate.

When, in a state where the display region 111 is touched, any one or more of the other display regions are touched, application operations are performed, in which case an unintended operation can be less likely to be started.

By associating combination of touch operations on a plurality of regions with application operations as described above, an intuitive operation is possible; thus, a user-friendly human interface can be obtained.

An electronic device of one embodiment of the present invention can perform display along not only the front surface but also one or more side surfaces of the housing and display can also be performed on the rear surface of the housing; thus, display can be performed in various ways as compared with a conventional electronic device. Furthermore, a touch sensor is provided in each of the display regions; thus, various operations can be performed as compared with a conventional electronic device and an electronic device capable of a more intuitive operation can be obtained.

Note that an example of the case where a variety of display is performed using the display panel 110 is shown here; however, one embodiment of the present invention is not limited thereto. For example, depending on circumstances or conditions, data is not necessarily displayed in one embodiment of the present invention. As an example, in one embodiment of the present invention, the electronic device may be used as a lighting device, not the display panel 110. In one embodiment of the present invention, by using the device as a lighting device, it can be used as interior lighting having an attractive design. Alternatively, in one embodiment of the present invention, it can be used as lighting with which various directions can be illuminated. Further alternatively, in one embodiment of the present invention, it may be used as a light source, e.g., a backlight or a front light, not the display panel 110. In other words, in one embodiment of the present invention, it may be used as a lighting device for the display panel.

Although an example where the one or two of the side surfaces of the housing 101 are used as the display region is shown, one embodiment of the present invention is not limited thereto. FIGS. 8A1 and 8A2 show an example. Here, FIG. 8A1 shows an example of a schematic perspective view illustrating the front surface side of an electronic device and FIG. 8A2 shows an example of a schematic perspective view illustrating the rear surface side thereof. Similarly, FIGS. 8B1 and 8B2 show an example of schematic perspective views illustrating the front surface side and the rear surface side of an electronic device. FIGS. 9A1 and 9A2 show an example of schematic perspective views illustrating the front surface side and the rear surface side of an electronic device. FIGS. 9B1 and 9B2 show an example of schematic perspective views illustrating the front surface side and the rear surface side of an electronic device.

In these cases, the region 201 may be provided similarly. As an example of this case, FIGS. 10A1 and 10A2 show an example of schematic perspective views illustrating the front surface side and the rear surface side of an electronic device. FIGS. 10B1 and 10B2 show an example of schematic perspective views illustrating the front surface side and the rear surface side of an electronic device. FIGS. 11A1 and 11A2 show an example of schematic perspective views illustrating the front surface side and the rear surface side of an electronic device. FIGS. 11B1 and 11B2 show an example of schematic perspective views illustrating the front surface side and the rear surface side of an electronic device.

Although this embodiment shows an example where one display panel 110 includes a plurality of display regions, one embodiment of the present invention is not limited thereto. Each display region may be formed using a plurality of display panels. For example, the display region 111 and the display region 116 may be formed using different display panels. FIGS. 12A1 and 12A2 show an example of this case. Here, FIG. 12A1 is a schematic perspective view illustrating the front surface side of an electronic device, and FIG. 12A2 is a schematic perspective view illustrating the rear surface side thereof.

This embodiment shows an example of a basic principle. Thus, part or the whole of this embodiment can be freely combined with, applied to, or replaced with part or the whole of another embodiment.

Embodiment 2

In this embodiment, an example where an image sensor is provided in the region 201 is shown. Here, an example where an image sensor is provided in the region 201 in FIGS. 1B1 and 1B2 is shown. Note that one embodiment of the present invention is not limited thereto. In a variety of drawings, e.g., FIGS. 2B1 and 2B2, a variety of elements or the like can be provided in the region 201 similarly.

First, FIG. 13A1 is a schematic perspective view illustrating the front surface side of an electronic device, and FIG. 13A2 is a schematic perspective view illustrating the rear surface side thereof. An image sensor 202 is provided in the region 201. The image sensor 202 has a function of shooting a still image. That is, the image sensor 202 has a function of a camera. Therefore, the image sensor 202 includes a variety of optical components such as a lens in some cases.

As illustrated in FIG. 13B, by setting the image sensor 202 to face an object 205, a still image, a moving image, or the like can be shot. At this time, an image 206 of the object 205 is displayed on the display region 111, for example. On the display region 111, a state of the object 205 can be displayed in real time. While the image 206 is checked, a still image or a moving image of the object 205 is shot. At this time, in the case where the illuminance of the object 205 is low, an image 204 for lighting is displayed on the display region 116, for example. Light is emitted to the object 205 from a region on which the image 204 for lighting is displayed. As a result, the illuminance of the object 205 can be increased. Thus, an appropriate clear image can be shot.

The image 204 for lighting is desirably a white image, for example. Note that one embodiment of the present invention is not limited thereto. By changing the display color of the image 204 for lighting, the color of light emitted to the object 205 can be changed. Accordingly, images of the object 205 in a variety of states can be shot. For example, in the case where ambient environment light is reddish, bluish, or greenish, or the like, the image 204 for lighting is changed to an appropriate color; thus, an appropriate image can be shot.

By changing the display color of the image 204 for lighting, an image of the object 205 may be shot a plurality of times. For example, images are shot with the display of the image 204 for lighting being white, incandescent color, and daylight white. Then, by processing these images, an appropriate image can be obtained.

The image 204 for lighting desirably has the same color or gray scale on the entire surface, for example. Note that one embodiment of the present invention is not limited thereto. A plurality of regions may be provided, and images with respective different colors may be used for the regions.

Next, as another example, FIGS. 14A1 and 14A2 show an example where the image sensor 202 and a lighting element 203 are provided in the region 201.

Here, FIG. 14A1 is a schematic perspective view illustrating the front surface side of an electronic device and FIG. 14A2 is a schematic perspective view illustrating the rear surface side thereof. As illustrated in FIG. 14B, by setting the image sensor 202 and the lighting element 203 to face the object 205, a still image, a moving image, or the like can be shot. At this time, the image 206 of the object 205 is displayed on the display region 111, for example. On the display region 111, a state of the object 205 can be displayed in real time. While the image 206 is checked, a still image or a moving image of the object 205 is shot. At this time, an image 207 of the object 205 is also displayed on the display region 116, for example. As a result, the object 205 can check how an image thereof is shot, while seeing the image 207. Thus, an image can be shot at an appropriate angle.

The image 206 and the image 207 are displayed on different display regions. Therefore, they are different in the size, resolution, or the like in some cases. It can be said that the image 206 and the image 207 are different images. Note that the image 206 and the image 207 may have the same size and the same resolution.

In the case where the illuminance of the object 205 is low, light is emitted to the object 205 from the lighting element 203. As a result, the illuminance of the object 205 can be increased. Thus, an appropriate clear image can be shot.

The lighting element 203 desirably emits white light, for example. Note that one embodiment of the present invention is not limited thereto. By changing the emission color of the lighting element 203, the color of light emitted to the object 205 can be changed. Accordingly, images of the object 205 in a variety of states can be shot. For example, in the case where ambient environment light is reddish, bluish, or greenish, or the like, the emission color of the lighting element 203 is changed to an appropriate color; thus, an appropriate image can be shot.

By changing the emission color of the lighting element 203, an image of the object 205 may be shot a plurality of times. For example, images are shot with the emission color of the lighting element 203 being white, incandescent color, and daylight white. Then, by processing these images, an appropriate image can be obtained.

The lighting element 203 desirably has the same color or gray scale, for example. Note that one embodiment of the present invention is not limited thereto. A plurality of lighting elements 203 emitting light of different colors may be provided.

Figure 15A:
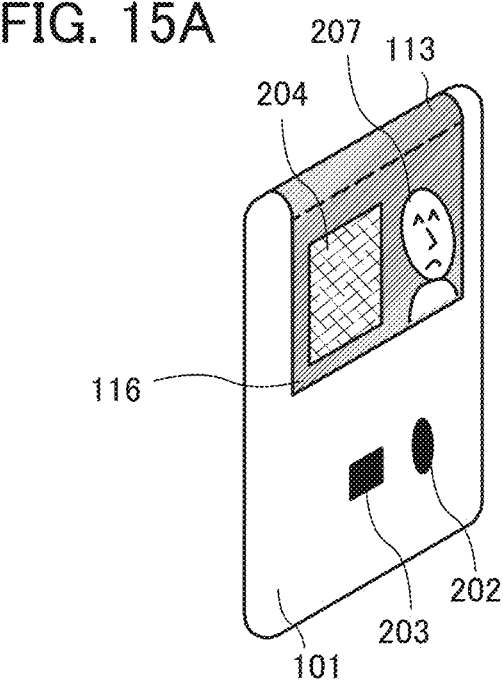
FIGS. 15A and 15B illustrate structure examples of an electronic device of an embodiment.
Figure 15B:
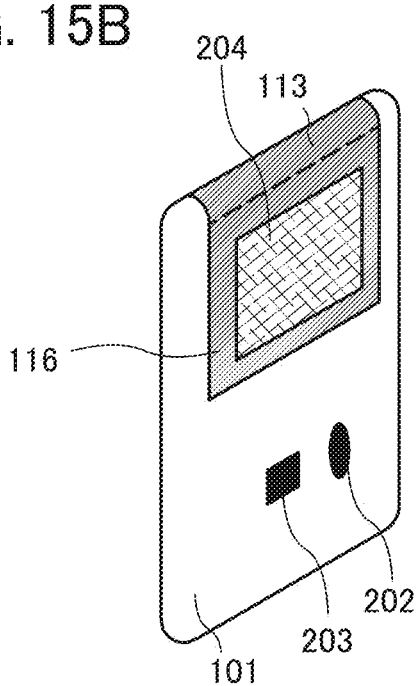

Although the image 207 is displayed in FIG. 14A2, the image 204 for lighting may be displayed as illustrated in FIG. 15A or, depending on circumstances, not the image 207 but the image 204 for lighting may be displayed as illustrated in FIG. 15B. By utilizing light from the image 204 for lighting and light from the lighting element 203, the illuminance can be increased or the color of illumination light can be changed. In other words, the lighting element 203 and the image 204 for lighting can be used as a plurality of lighting elements.

Although an example where the display region 111 and the display region 116 are used is shown here, one embodiment of the present invention is not limited thereto. Another display region may be used.

For example, an icon 208 may be displayed on the display region 113. An example of this case is shown in FIGS. 16A1 and 16A2. FIG. 16A1 is a schematic perspective view illustrating the front surface side of an electronic device and FIG. 16A2 is a schematic perspective view illustrating the rear surface side thereof. A similar example is shown in FIGS. 16B1 and 16B2 FIG. 16B1 is a schematic perspective view illustrating the front surface side of an electronic device and FIG. 16B2 is a schematic perspective view illustrating the rear surface side thereof.

The icon 208 has a function as a shutter button, for example. An image can be shot by touching the icon 208. Alternatively, the focus can be adjusted by touching the icon 208.

Although the icon 208 has a function as a shutter button here, one embodiment of the present invention is not limited thereto. By providing dedicated hardware, e.g., a shutter button, a shutter function may be obtained.

For example, an icon 209 may be displayed on the display region 112. FIGS. 17A1 and 17A2 show an example of this case. FIG. 17A1 is a perspective schematic view illustrating the front surface side of an electronic device and FIG. 17A2 is a perspective schematic view illustrating the rear surface side thereof.

Here, the icon 209 has a function as a slider, for example. By moving a slider, an image can be enlarged or reduced at the time of shooting. In other words, a zoom function can be controlled. In this case, enlarging or reducing an image may be controlled optically by controlling a lens of the image sensor 202 or by controlling a digital image by software. Therefore, before an image is shot, the magnification can be controlled by moving the bar of the icon 209.

Although a zoom function is obtained by using the icon 209 here, one embodiment of the present invention is not limited thereto. By providing dedicated hardware, e.g., an operation button, a zoom function may be obtained.

Note that the icon 208 and the icon 209 may be displayed on the same display region (e.g., the display region 112). Furthermore, a variety of icons, characters, images, or the like can be displayed on display regions.

In the case where the region 201 is provided, the image sensor 202 or the lighting element 203 can be provided in the large region. Therefore, for example, a large lens can be provided in the image sensor 202. Alternatively, the image sensor 202 having a large size can be provided. Thus, a clear and high-resolution image can be shot.

Although an example where the image sensor 202 and the lighting element 203 are provided in the region 201 is shown here, one embodiment of the present invention is not limited thereto. For example, the image sensor 202 or the lighting element 203 may be provided in a region other than the region 201. FIGS. 18A1 and 18A2 show an example of this case. FIG. 18A1 is a schematic perspective view illustrating the front surface side of an electronic device and FIG. 18A2 is a schematic perspective view illustrating the rear surface side thereof. Similarly, FIGS. 18B1 and 18B2 show another example. FIG. 18B1 is a schematic perspective view illustrating the front surface side of an electronic device and FIG. 18B2 is a schematic perspective view illustrating the rear surface side thereof.

A plurality of image sensors 202 may be provided. At least one of the image sensors 202 may be provided in the region 201. Alternatively, all of the image sensors 202 may be provided in a region other than the region 201.

Note that the example in which the region 201 is provided is shown; however, one embodiment of the present invention is not limited to this example. Depending on circumstances or conditions, the region 201 is not necessarily provided. In this case, the area of the display region 11 is substantially equal to that of the display region 116, for example. FIGS. 19A1 and 19A2 show an example of this case. FIG. 19A1 is a schematic perspective view illustrating the front surface side of an electronic device and FIG. 19A2 is a schematic perspective view illustrating the rear surface side thereof. Similarly, FIGS. 19B1 and 19B2 show another example. FIG. 19B1 is a schematic perspective view illustrating the front surface side of an electronic device and FIG. 19B2 is a schematic perspective view illustrating the rear surface side thereof.

Such a shooting operation may be performed when software which achieves a camera function is carried out or as part of software which achieves another function. For example, the shooting operation may be performed when software which achieves a videophone function is carried out.

These functions can be achieved by software or hardware. In the case of software, it may be installed from a computer to the electronic device or it may be installed to the electronic device through a wired or wireless telecommunication line. Alternatively, software may be initially stored in a memory device included in the electronic device.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 3

This embodiment shows an example where a variety of components are provided in the region 201. Although an example where a variety of components are provided in the region 201 in FIGS. 1B1 and 1B2 is shown here, one embodiment of the present invention is not limited thereto. In a variety of different drawings, e.g., FIGS. 2B1 and 2B2, a variety of elements or the like can be provided in the region 201 similarly. The components described in Embodiment 2 may be provided in the region 201 or the like.

Figure 20:
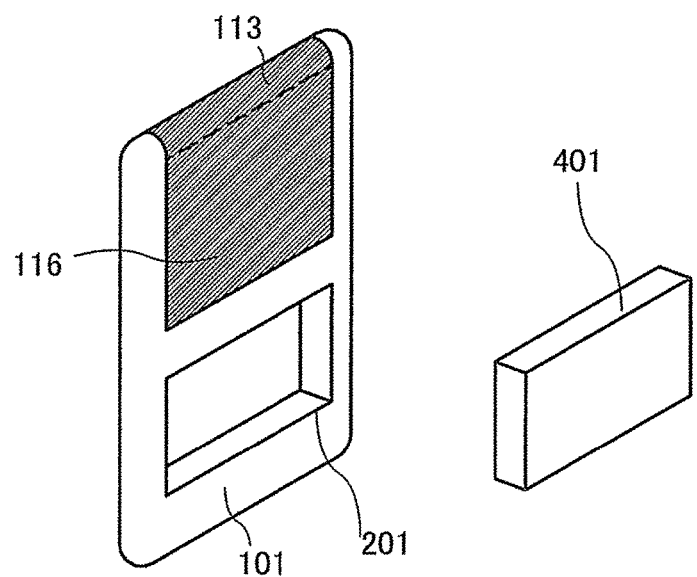
FIG. 20 illustrates a structure example of an electronic device of an embodiment.

First, as an example, FIG. 20 shows an example where a battery 401 is provided in the region 201. FIG. 20 is a schematic perspective view illustrating the rear surface side of the electronic device. FIG. 20 illustrates a state where a lid is opened and the battery 401 is removed from the housing 101. In the case where the battery 401 is put inside the housing 101, the battery 401 can be covered with the lid so that the battery 401 is not dropped. By providing the battery 401 in the region 201 as described above, the battery 401 can be easily replaced.

Although the battery 401 can be removed in FIG. 20, one embodiment of the present invention is not limited thereto. Depending on circumstances or conditions, the lid is not necessarily provided and the battery 401 may be unremovable. In that case, the battery 401 can have a large thickness because the battery 401 is provided in the region 201 where a display region is not provided. Thus, the capacitance of the battery 401 can be increased.

Figure 21:
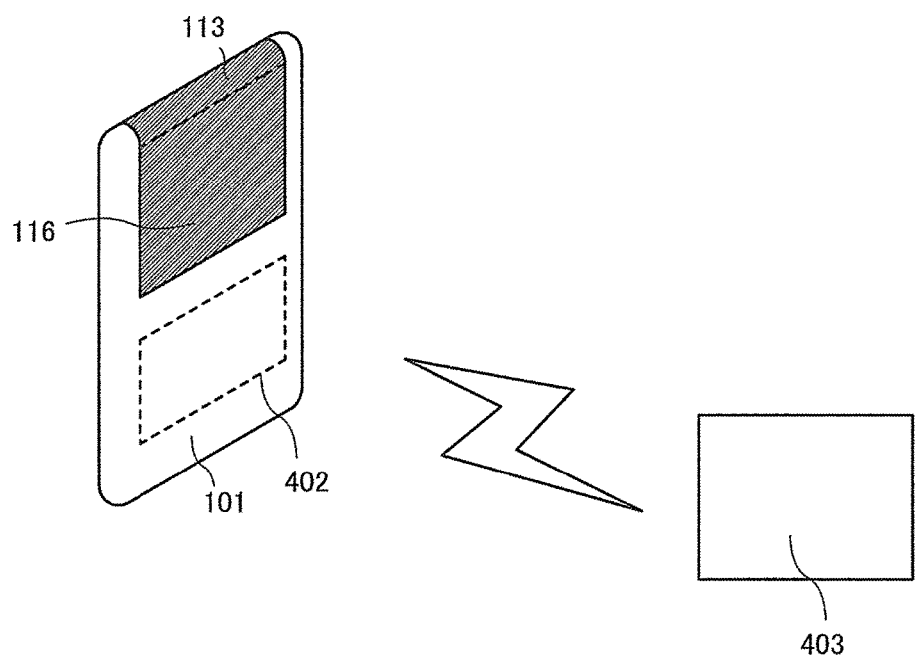
FIG. 21 illustrates a structure example of an electronic device of an embodiment.

Next, as another example, FIG. 21 shows an example where a receiving unit 402 is provided in the region 201. As the receiving unit 402, an antenna, a coil, an electrode, or the like can be used. FIG. 21 is a schematic perspective view illustrating the rear surface side of an electronic device. FIG. 21 illustrates a state where the receiving unit 402 is provided inside the housing 101 and communicates with a communication device 403 wirelessly. For example, the receiving unit 402 can be used as an antenna for near field communication (NFC). With NFC, a function of electronic money, a credit card, or the like can be achieved. In this case, the region 201 is provided not to overlap with the display region 116. For example, a touch sensor also is not provided in the region 201. Thus, a radio wave, magnetism, an electromagnetic wave, and the like are not disturbed by a touch sensor, a display panel, or the like, and the receiving unit 402 can be efficiently used.

The receiving unit 402 may have a transmitting function, not a receiving function. Alternatively, the receiving unit 402 may have both of a transmitting function and a receiving function. For example, the receiving unit 402 is not limited as long as it can communicate data, energy, and the like.

The receiving unit 402 can be used for a variety of purposes, e.g., TV, phone, Bluetooth, short-distance communication, or the like in addition to NFC. Furthermore, the receiving unit 402 can be used as a unit for charging an electronic device. For example, with a coil, an antenna, or the like, an electronic device can be charged wirelessly.

Figure 22:
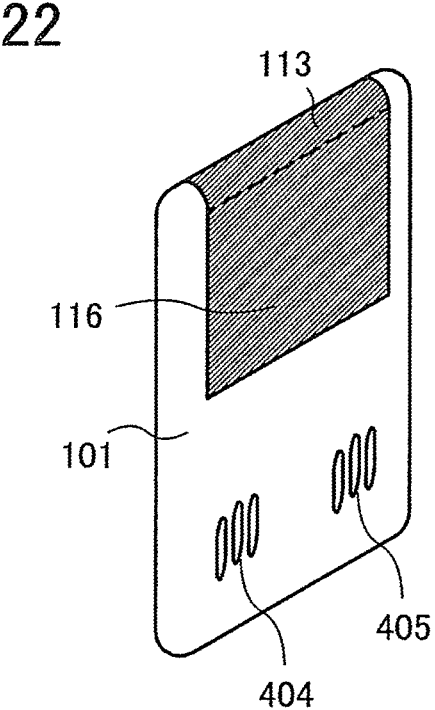
FIG. 22 illustrates a structure example of an electronic device of an embodiment.

Next, as another example, FIG. 22 shows an example where a speaker 404 and a speaker 405 are provided in the region 201. FIG. 22 is a schematic perspective view illustrating the rear surface side of an electronic device. FIG. 22 illustrates a state where the speaker 404 and the speaker 405 are provided in the housing 101. As an example, the speaker 404 can emit sound for the left ear and the speaker 405 can emit sound for the right ear. The speaker 404 and the speaker 405 can be provided to be apart from each other in the region 201. Thus, a stereophonic sound can be produced.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 4

In this embodiment, examples where a display panel (a display device) or an electronic device can be used by being bent or folded in a variety of ways are shown. Description is made with reference to FIGS. 23A to 23C.

Figure 23A:
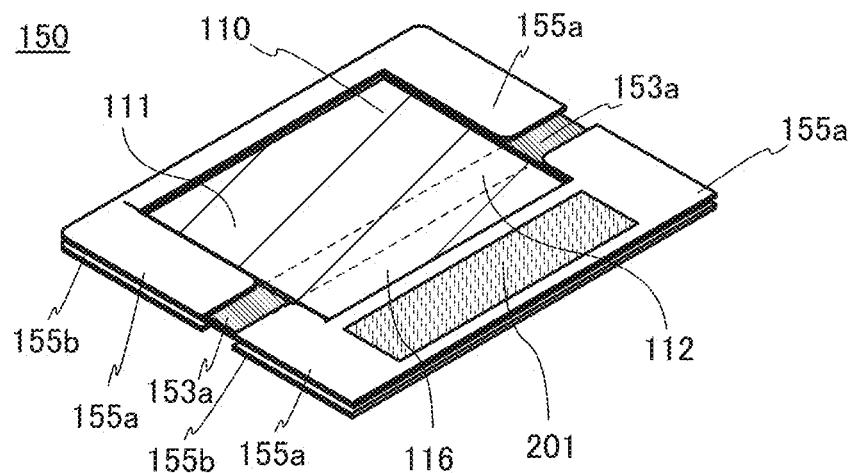
FIGS. 23A to 23C illustrate a structure example of an electronic device of an embodiment.
Figure 23B:
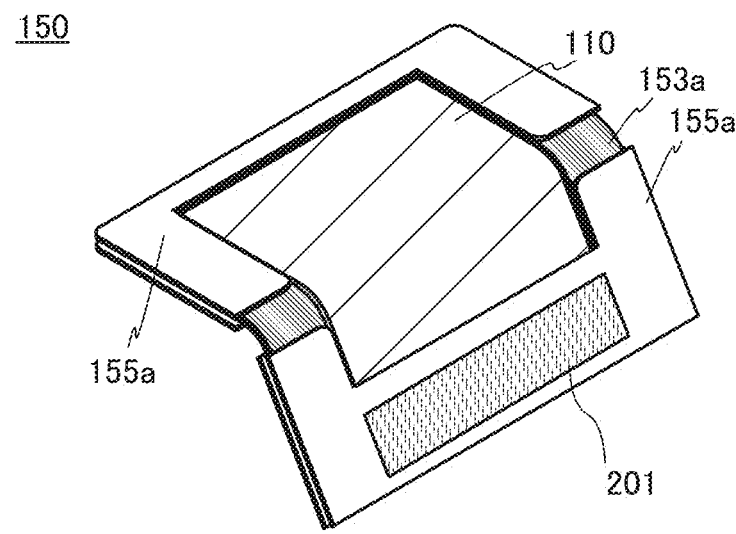
Figure 23C:
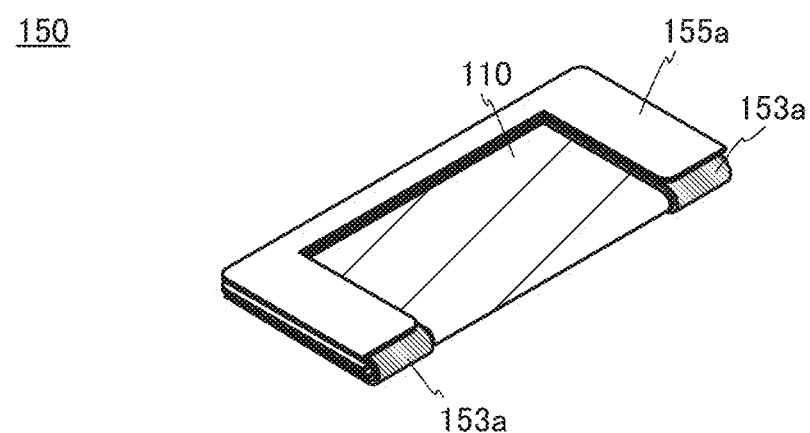

FIG. 23A illustrates an electronic device 150 of a mode in which the display panel 110 is developed (first mode). FIG. 23C illustrates the electronic device 150 of a mode in which the display panel 110 is folded (second mode). FIG. 23B illustrates the electronic device 150 of a mode in which the display panel 110 is bent. In other words, FIG. 23B illustrates the electronic device 150 in the middle of changing from one of the mode in which the display panel 110 is developed (first mode) and the mode in which the display panel 110 is folded (second mode) to the other. In FIGS. 23B and 23C, the display panel 110 is bent so that the outside thereof is seen. Note that one embodiment of the present invention is not limited thereto. The display panel 110 may be bent so that the inside thereof is hidden.

The electronic device 150 illustrated in FIGS. 23A to 23C includes the display panel 110 having flexibility. The electronic device 150 further includes a plurality of support panels 153a, a plurality of support panels 155a, and a plurality of support panels 155b.

The support panel 153a is formed using, for example, a material having lower flexibility than that of the display panel 110 (i.e., a material harder to bend). Furthermore, the support panel 155a and the support panel 155b are formed using, for example, a material having lower flexibility than that of the support panel 153a (i.e., a material harder to bend). As illustrated in FIGS. 23A to 23C, the support panels are preferably arranged in the periphery of the display panel 110 and on a surface opposite to a display portion of the display panel 110 because the display panel 110 has increased mechanical strength and becomes less likely to be broken.

Moreover, when the support panels 153a, 155a, and 155b are preferably formed with a material having a light-blocking property, irradiation of driver circuit portions of the display panel 110 with external light can be suppressed. Accordingly, light deterioration of transistors and the like used in the driver circuit portions can be suppressed.

Although not illustrated in FIGS. 23A to 23C, an arithmetic portion, a memory portion, a sensor portion, and the like of the electronic device 150 can be arranged between the display panel 110 and the support panels 155b.

The support panels 153a, 155a, and 155b can be formed using plastic, a metal, an alloy, rubber, or the like as a material. Plastic, rubber, or the like is preferably used because it can form a support panel that is lightweight and less likely to be broken. For example, silicone rubber, stainless steel, or aluminum may be used as the support panels 153a, 155a, and 155b.

Furthermore, the display panel 110 including the display portion having flexibility in the electronic device 150 can be folded either inward or outward. When the electronic device 150 is not used, the display panel 110 is folded to be inside, whereby scratches and stains on the display panel 10 can be suppressed.

Here, for example, as illustrated in FIG. 23A, the region 201 is provided in the vicinity of the display panel 110. Therefore, for example, as in another embodiment, the display region 111 has a larger area than the display region 116. In the region 201, a variety of components can be provided as in another embodiment.

Figure 24A:
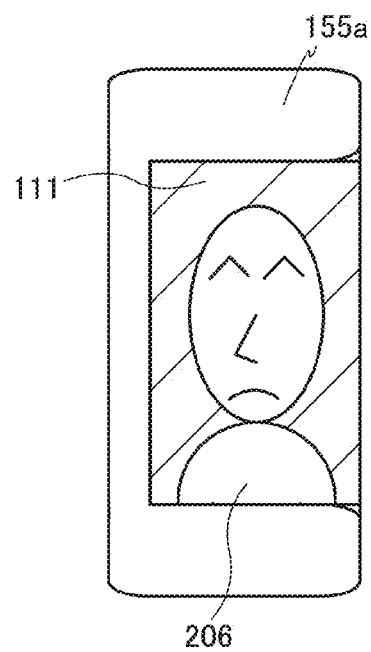
FIGS. 24A to 24E illustrate a structure example of an electronic device of an embodiment.
Figure 24B:
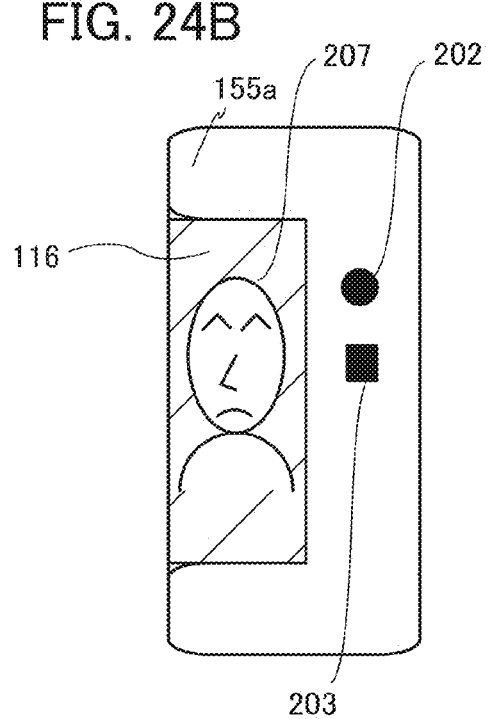
Figure 24C:
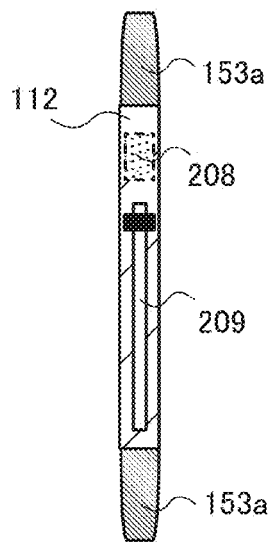
Figure 24D:
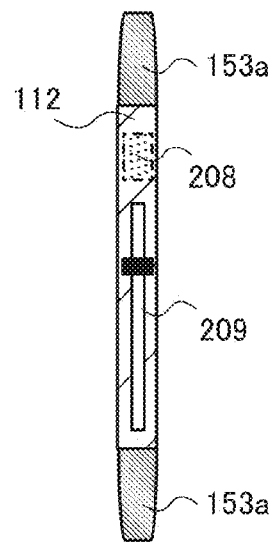
Figure 24E:
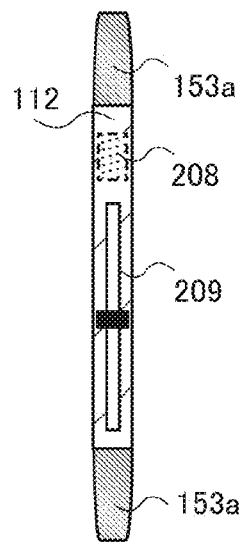

Here, FIGS. 24A and 24B illustrate a state where the display panel is folded as illustrated in FIG. 23C. FIG. 24A shows an example of the front surface and FIG. 24B shows an example of the rear surface. For example, the image sensor 202 or the lighting element 203 may be provided in the region 201. In the display region 111, for example, the image 206 is displayed. In the display region 116, for example, the image 207 is displayed. FIG. 24C shows the case where the icon 208 and the icon 209 are displayed on the display region 112, for example. As illustrated in FIGS. 24C to 24E, by moving a slider, a zoom function such as enlargement and reduction can be controlled.

Figure 25A:
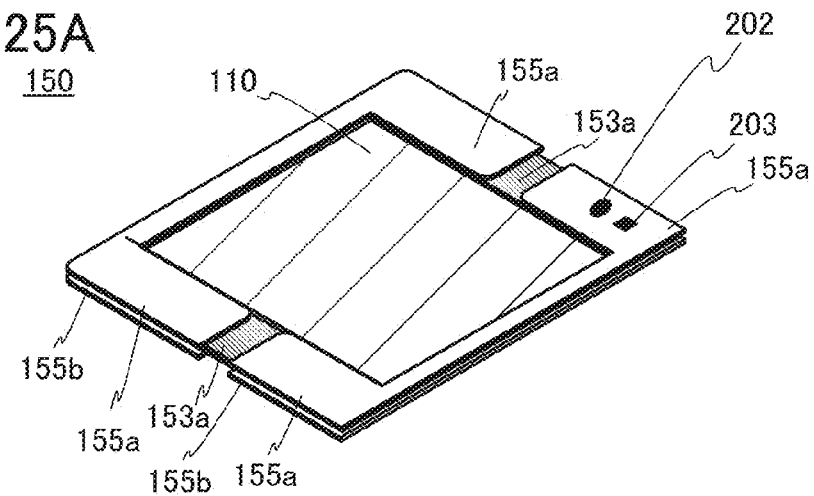
FIGS. 25A to 25C illustrate a structure example of an electronic device of an embodiment.
Figure 25B:
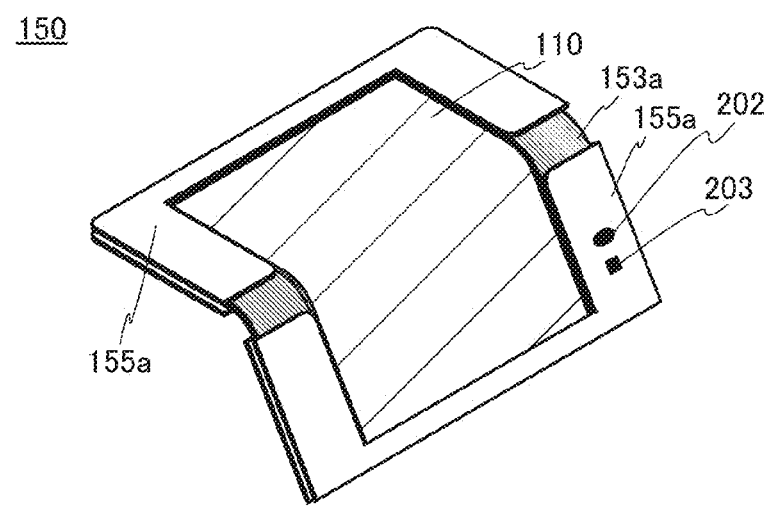
Figure 25C:
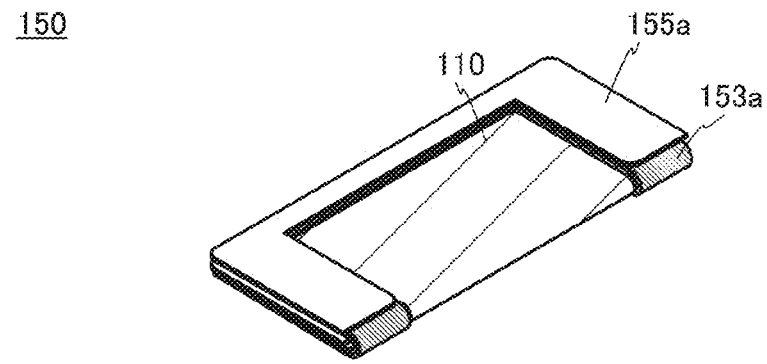
Figure 26A:
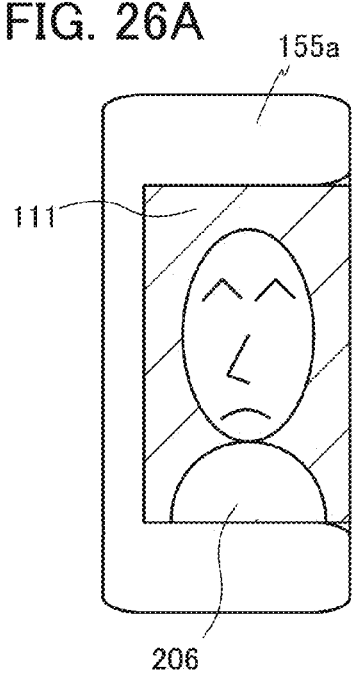
FIGS. 26A to 26D illustrate structure examples of an electronic device of an embodiment.
Figure 26B:
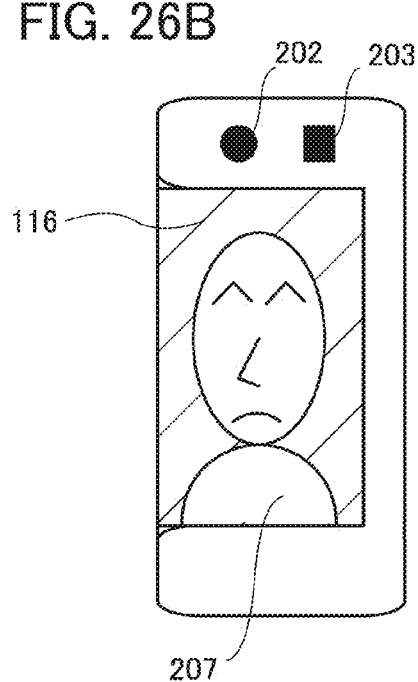
Figure 26C:
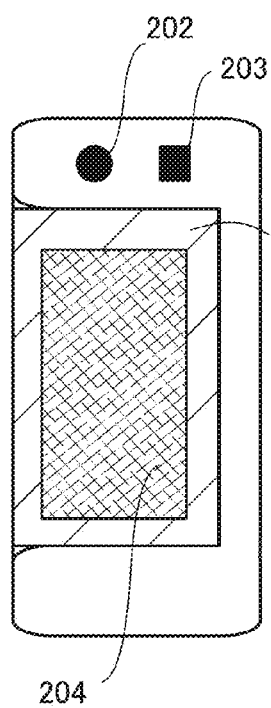
Figure 26D:
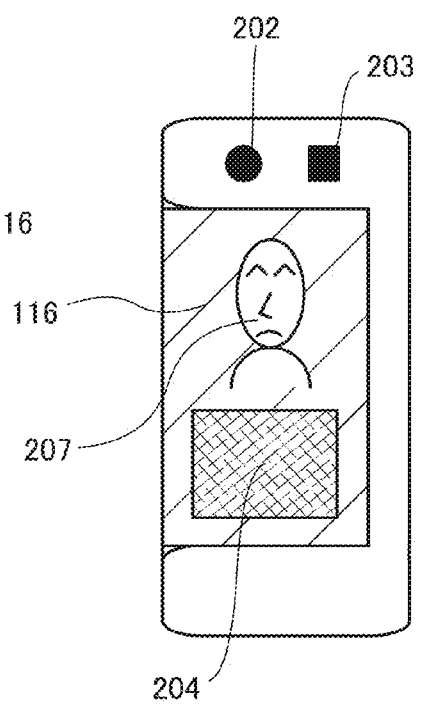

Although FIGS. 23A to 23C illustrate the case where the region 201 is provided, one embodiment of the present invention is not limited thereto. For example, FIGS. 25A to 25C illustrate the case where the region 201 is not provided. Similarly, FIGS. 26A and 26B illustrate a state where the display panel is folded. The state illustrated in FIG. 26B may be replaced with the state illustrated in FIG. 26C or FIG. 26D.

Figure 27A:
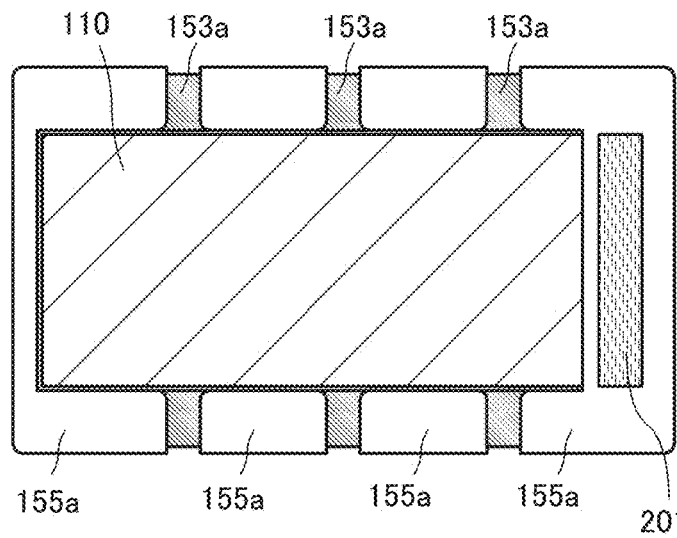
FIGS. 27A to 27C illustrate structure examples of an electronic device of an embodiment.
Figure 27B:
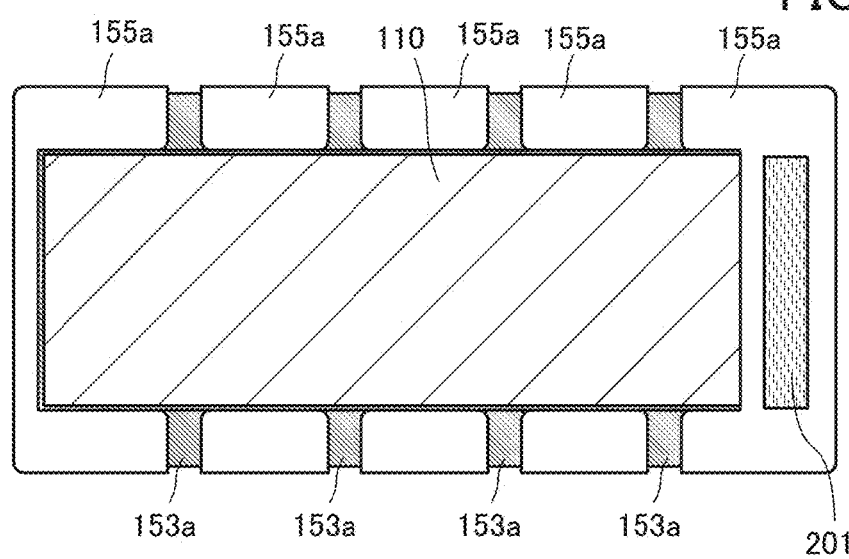
Figure 27C:
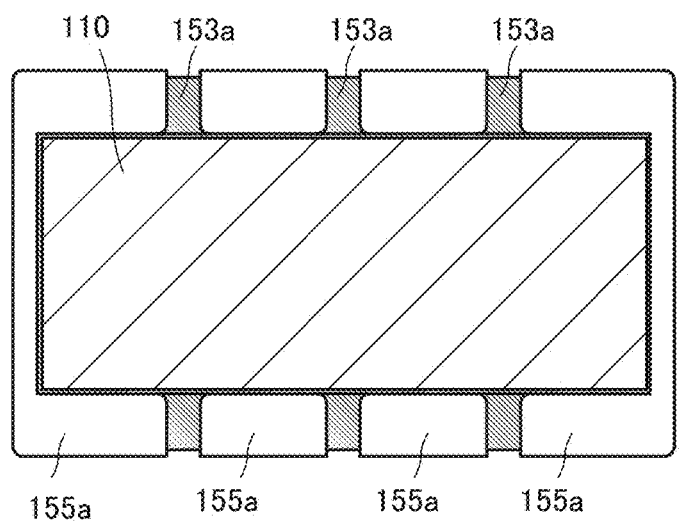

Although FIGS. 23A to 23C illustrate the case where the number of folds is one, one embodiment of the present invention is not limited thereto. A plurality of folds may be provided. For example, FIG. 27A shows an example where three folds are provided. For example, FIG. 27B shows an example where four folds are provided. Also in these cases, the region 201 is not necessarily provided. An example of this case is shown in FIG. 27C.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 5

In this embodiment, a structure of a touch panel that can be used in an electronic device of one embodiment of the present invention will be described with reference to FIGS. 28A to 28C.

Figure 28A:
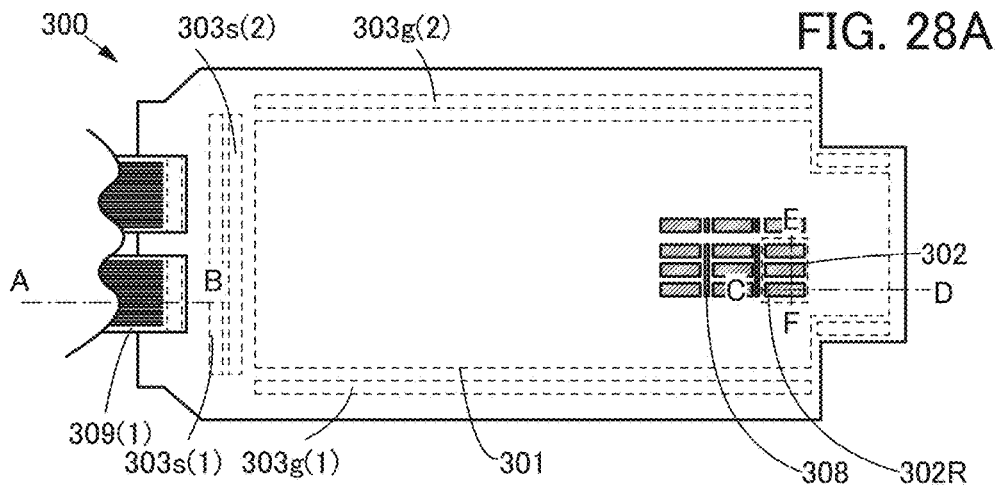
FIGS. 28A to 28C illustrate a structure example of a light-emitting panel of an embodiment.

FIG. 28A is a front view illustrating a structure of a touch panel that can be used in an electronic device of one embodiment of the present invention.

Figure 28B:
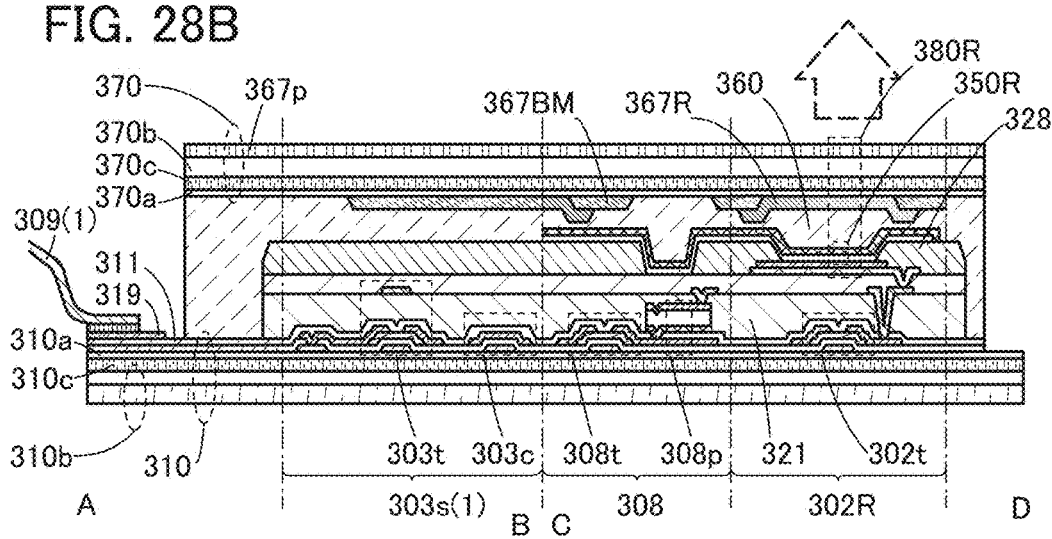

FIG. 28B is a cross-sectional view taken along line A-B and line C-D in FIG. 28A.

Figure 28C:
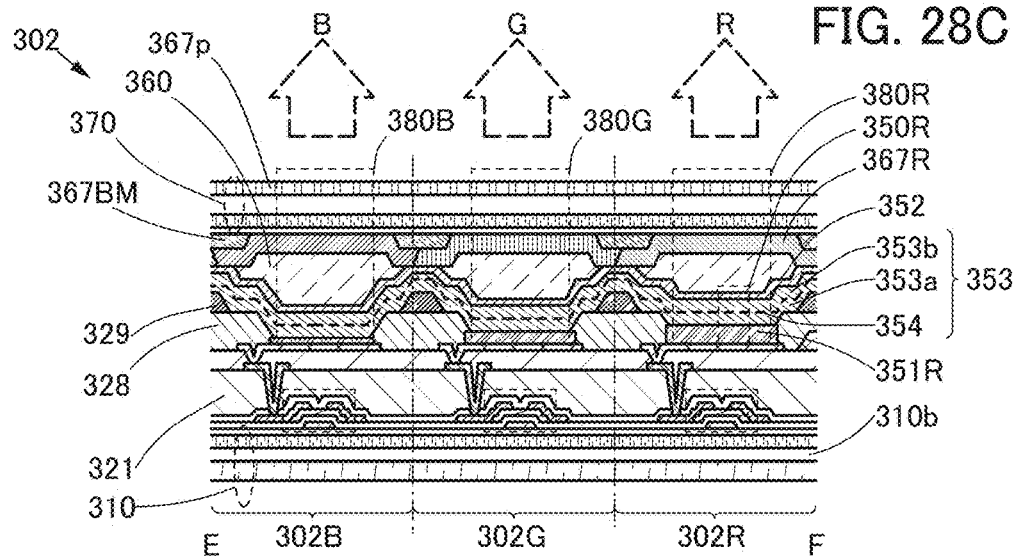

FIG. 28C is a cross-sectional view taken along line E-F in FIG. 28A.

<Front Surface View>

A touch panel 300 described as an example in this embodiment includes a display portion 301 (see FIG. 28A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 300 is provided with an imaging pixel driver circuit 303g(2) that can supply control signals to the imaging pixels 308 and an imaging signal line driver circuit 303s(2) that reads out imaging signals.

<Cross-Sectional View>

The touch panel 300 includes a substrate 310 and a counter substrate 370 that faces the substrate 310 (see FIG. 28B).

The substrate 310 is a stacked body in which a flexible substrate 310b, a barrier film 310a that prevents diffusion of unintentional impurities to the light-emitting elements, and an adhesive layer 310c that attaches the barrier film 310a to the substrate 310b are stacked.

The counter substrate 370 is a stacked body including a flexible substrate 370b, a barrier film 370a that prevents diffusion of unintentional impurities to the light-emitting elements, and an adhesive layer 370c that attaches the barrier film 370a to the substrate 370b (see FIG. 28B).

A sealant 360 attaches the counter substrate 370 to the substrate 310. The sealant 360 also serving as an optical adhesive layer has a refractive index higher than that of air. The pixel circuits and the light-emitting elements (e.g., a light-emitting element 350R) are provided between the substrate 310 and the counter substrate 370.

<<Structure of Pixel>>

Each of the pixels 302 includes the sub-pixel 302R, a sub-pixel 302G, and a sub-pixel 302B (see FIG. 28C). The sub-pixel 302R includes a light-emitting module 380R, the sub-pixel 302G includes a light-emitting module 380G, and the sub-pixel 302B includes a light-emitting module 380B.

For example, the sub-pixel 302R includes the light-emitting element 350R and the pixel circuit that can supply electric power to the light-emitting element 350R and includes a transistor 302t (see FIG. 28B). Furthermore, the light-emitting module 380R includes the light-emitting element 350R and an optical element (e.g., a coloring layer 367R).

The light-emitting element 350R includes a lower electrode 351R, an upper electrode 352, and a layer 353 containing a light-emitting organic compound between the lower electrode 351R and the upper electrode 352 (see FIG. 28C).

The layer 353 containing a light-emitting organic compound includes a light-emitting unit 353a, a light-emitting unit 353b, and an intermediate layer 354 between the light-emitting units 353a and 353b.

The light-emitting module 380R includes the coloring layer 367R on the counter substrate 370. The coloring layer transmits light of a particular wavelength and is, for example, a layer that selectively transmits light of red, green, or blue color. Note that a region that transmits light emitted from the light-emitting element as it is may be provided as well.

The light-emitting module 380R, for example, includes the sealant 360 that is in contact with the light-emitting element 350R and the coloring layer 367R.

The coloring layer 367R is positioned in a region overlapping with the light-emitting element 350R. Accordingly, part of light emitted from the light-emitting element 350R passes through the sealant 360 that also serves as an optical adhesive layer and through the coloring layer 367R and is emitted to the outside of the light-emitting module 380R as indicated by arrows in FIGS. 28B and 28C.

Note that although the case where the light-emitting element is used as a display element is described here, one embodiment of the present invention is not limited thereto.

For example, in this specification and the like, a display element, a display device which is a device including a display element, a light-emitting element, and a light-emitting device which is a device including a light-emitting element can employ a variety of modes or can include a variety of elements. Examples of a display element, a display device, a light-emitting element, or a light-emitting device include an EL (electroluminescent) element (e.g., an EL element including organic and inorganic materials, an organic EL element, or an inorganic EL element), an LED (e.g., a white LED, a red LED, a green LED, or a blue LED), a transistor (a transistor which emits light depending on current), an electron emitter, a liquid crystal element, electronic ink, an electrophoretic element, a grating light valve (GLV), a plasma display panel (PDP), a display element using a micro electro mechanical system (MEMS), a digital micromirror device (DMD), a digital micro shutter (DMS), MIRASOL (registered trademark), an interferometric modulator display (IMOD) element, a MEMS shutter display element, an optical interference type MEMS display element, an electrowetting element, a piezoelectric ceramic display, or a carbon nanotube, which are display media whose contrast, luminance, reflectivity, transmittance, or the like is changed by electromagnetic action. Examples of display devices having EL elements include an EL display. Examples of a display device including an electron emitter include a field emission display (FED), and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Display devices having electronic ink or electrophoretic elements include electronic paper and the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

<<Structure of Touch Panel>>

The touch panel 300 includes a light-blocking layer 367BM on the counter substrate 370. The light-blocking layer 367BM is provided so as to surround the coloring layer (e.g., the coloring layer 367R).

The touch panel 300 includes an anti-reflective layer 367p positioned in a region overlapping with the display portion 301. As the anti-reflective layer 367p, a circular polarizing plate can be used, for example.

The touch panel 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300 includes the light-emitting elements (e.g., the light-emitting element 350R) over the insulating film 321.

The touch panel 300 includes, over the insulating film 321, a partition 328 that overlaps with an end portion of the lower electrode 351R (see FIG. 28C). In addition, a spacer 329 that controls the distance between the substrate 310 and the counter substrate 370 is provided on the partition 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits. As illustrated in FIG. 28B, the transistor 303t may include a second gate over the insulating film 321. The second gate may be electrically connected to a gate of the transistor 303t, or different potentials may be supplied thereto. The second gate may be provided in a transistor 308t described below, the transistor 302t, or the like if necessary.

<<Structure of Imaging Pixel>>

The imaging pixels 308 each include a photoelectric conversion element 308p and an imaging pixel circuit for sensing light received by the photoelectric conversion element 308p. The imaging pixel circuit includes the transistor 308t.

For example, a PIN photodiode can be used as the photoelectric conversion element 308p.

<<Other Structures>>

The touch panel 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

Transistors formed in the same process can be used as the transistor 302t, the transistor 303t, the transistor 308t, and the like.

Transistors of a bottom-gate type, a top-gate type, or the like can be used.

As a gate, source, and drain of a transistor, and a wiring or an electrode included in a touch panel, a single-layer structure or a stacked structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order can be given. Note that a transparent conductive material containing indium oxide, tin oxide, or zinc oxide may be used. Copper containing manganese is preferably used because controllability of a shape by etching is increased.

For example, silicon is preferably used as a semiconductor in which a channel of a transistor such as the transistor 302t, the transistor 303t, or the transistor 308t is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has higher field effect mobility and higher reliability than amorphous silicon. When such a polycrystalline semiconductor is used for a pixel, the aperture ratio of the pixel can be improved. Even in the case where pixels are included at extremely high resolution, a gate driver circuit and a source driver circuit can be formed over a substrate over which the pixels are formed, the number of components included in an electronic device can be reduced.

Here, an oxide semiconductor is preferably used for semiconductor devices such as transistors used for pixels included in display regions or driver circuits in the display panel 110. In particular, an oxide semiconductor having a wider band gap than silicon is preferably used. A semiconductor material having a wider band gap and a lower carrier density than silicon is preferably used because off-state current of the transistor can be reduced.

The oxide semiconductor preferably contains at least indium (In) or zinc (Zn), for example. More preferably, the oxide semiconductor contains an oxide represented by an In—M—Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned perpendicular to a surface on which the semiconductor layer is formed or the top surface of the semiconductor layer and in which the adjacent crystal parts have no grain boundary.

There is no grain boundary in such an oxide semiconductor; therefore, generation of a crack in an oxide semiconductor film which is caused by stress when a display panel is bent is prevented. Therefore, such an oxide semiconductor can be preferably used for a flexible display panel which is used in a bent state, or the like.

The use of such materials for the semiconductor layer makes it possible to provide a highly reliable transistor in which a change in the electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed on each display region is maintained. As a result, an electronic device with an extremely low power consumption can be obtained.

Note that details of a preferable mode and a formation method of an oxide semiconductor that can be used for the semiconductor layer are described in an embodiment below.

Here, a method for forming a flexible light-emitting panel is described.

Here, a structure including a pixel and a driver circuit or a structure including an optical member such as a color filter is referred to as an element layer for convenience. An element layer includes a display element, for example, and may include a wiring electrically connected to a display element or an element such as a transistor used in a pixel or a circuit in addition to the display element.

Here, a support provided with an insulating surface over which an element layer is formed is called a base material.

As a method for forming an element layer over a base material provided with an insulating surface having flexibility, there are a method in which the element layer is formed directly over the base material, and a method in which the element layer is formed over a supporting base material having stiffness unlike the base material, and then the element layer is separated from the supporting base material and transferred to the base material.

In the case where a material of the base material can withstand heating temperature in the process for forming the element layer, it is preferable that the element layer be formed directly over the base material, in which case a manufacturing process can be simplified. At this time, the element layer is preferably formed in a state where the base material is fixed to the supporting base material, in which case transfer of the element layer in a device and between devices can be easy.

In the case of employing the method in which the element layer is formed over the supporting base material and then transferred to the base material, first, a separation layer and an insulating layer are stacked over a supporting base material, and then the element layer is formed over the insulating layer. Then, the element layer is separated from the supporting base material and then transferred to the base material. At this time, a material is selected so that separation at an interface between the supporting base material and the separation layer, at an interface between the separation layer and the insulating layer, or in the separation layer occurs.

For example, it is preferable that a stacked layer of a layer including a high-melting-point metal material, such as tungsten, and a layer including an oxide of the metal material be used as the separation layer, and a stacked layer of a plurality of layers, such as a silicon nitride layer and a silicon oxynitride layer be used over the separation layer. The use of the high-melting-point metal material is preferable because the degree of freedom of the process for forming the element layer can be increased.

The separation may be performed by application of mechanical power, by etching of the separation layer, by dripping of a liquid into part of the separation interface to penetrate the entire separation interface, or the like. Alternatively, separation may be performed by heating the separation interface by utilizing a difference in coefficient of thermal expansion.

The peeling layer is not necessarily provided in the case where peeling can occur at an interface between the supporting base material and the insulating layer. For example, glass may be used as the supporting base material, an organic resin such as polyimide may be used as the insulating layer, a separation trigger may be formed by locally heating part of the organic resin by laser light or the like, and peeling may be performed at an interface between the glass and the insulating layer. Alternatively, a metal layer may be provided between the supporting base material and the insulating layer formed of an organic resin, and separation may be performed at the interface between the metal layer and the insulating layer by heating the metal layer by feeding a current to the metal layer. In that case, the insulating layer formed of an organic resin can be used as a base material.

Examples of such a base material having flexibility include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose thermal expansion coefficient is low, for example, lower than or equal to $30 \times 10^{-6}$/K is preferable, and a polyamide imide resin, a polyimide resin, or PET can be suitably used. A substrate in which a fibrous body is impregnated with a resin (also referred to as prepreg) or a substrate whose thermal expansion coefficient is reduced by mixing an inorganic filler with an organic resin can also be used.

In the case where a fibrous body is included in the above material, a high-strength fiber of an organic compound or an inorganic compound is used as the fibrous body. The high-strength fiber is specifically a fiber with a high tensile modulus of elasticity or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

Note that for a display device of one embodiment of the present invention, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can also be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or the yield can be improved. Alternatively, since an active element (a non-linear element) is not used, the aperture ratio can be improved, so that power consumption can be reduced or higher luminance can be achieved, for example.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 6

In this embodiment, a structure of a foldable touch panel that can be used in the electronic device of one embodiment of the present invention will be described with reference to FIGS. 29A to 29C.

Figure 29A:
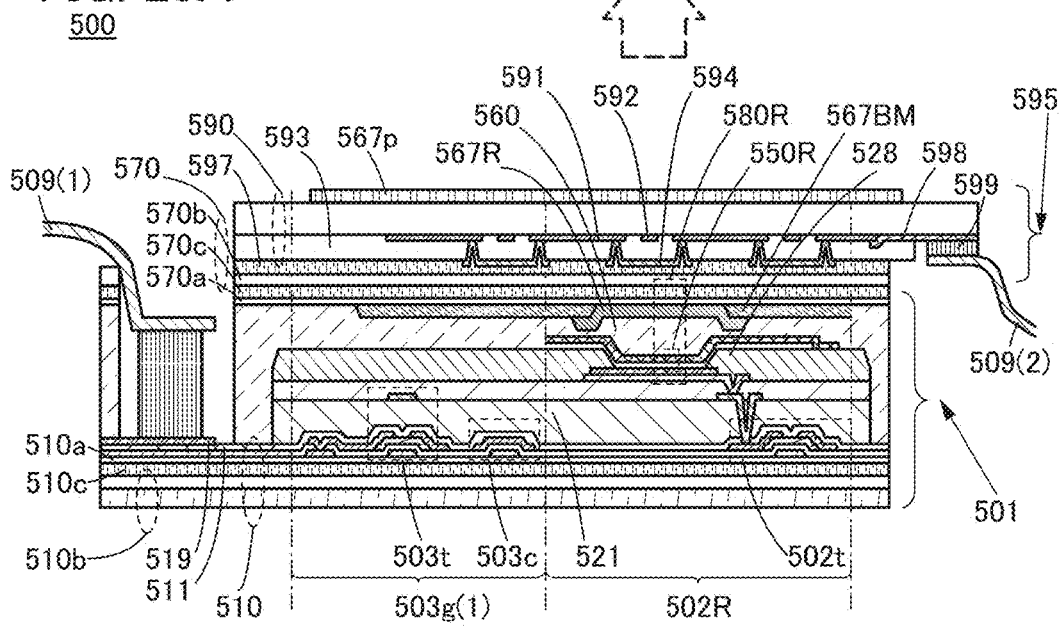
FIGS. 29A to 29C illustrate structure examples of a light-emitting panel of an embodiment.
Figure 29B:
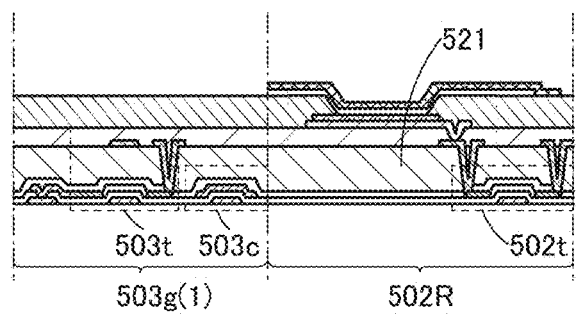
Figure 29C:
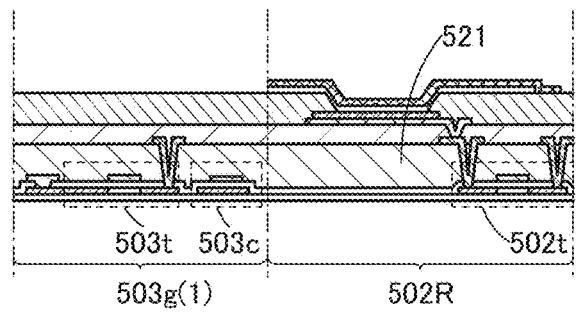

FIGS. 29A to 29C are cross-sectional views of a touch panel 500.

The touch panel 500 includes a display portion 501 and a touch sensor 595. Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2).

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below.

Note that a variety of sensors that can sense the closeness or the contact of a sensing target, such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 can be any of a variety of shapes. For example, the plurality of electrodes 591 may be provided so that a space between the electrodes 591 is reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As the light-transmitting conductive material, a conductive oxide such as indium oxide, indium tin oxide, indium zinc oxide, zinc oxide, or zinc oxide to which gallium is added, or graphene can be used.

The electrodes 591 and the electrodes 592 may be formed by depositing a light-transmitting conductive material on the substrate 590 by a sputtering method and then removing an unnecessary portion by any of various patterning techniques such as photolithography. Graphene may be formed in such a manner that a solution in which graphene oxide is dispersed is applied and reduced, in addition to a CVD method.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used as the wiring 594 because electric resistance can be reduced.

One electrode 592 extends in one direction, and a plurality of electrodes 592 is provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of anisotropic conductive films (ACF), anisotropic conductive pastes (ACP), and the like can be used.

The adhesive layer 597 has a light-transmitting property. For example, a thermosetting resin or an ultraviolet curable resin can be used; specifically, a resin such as an acrylic resin, an urethane resin, an epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element. Organic electroluminescent elements for different colors, for example, an organic electroluminescent element for red, an organic electroluminescent element for blue, and an organic electroluminescent element for green may be used.

Other than organic electroluminescent elements, any of various display elements such as display elements (electronic ink) that perform display by an electrophoretic method, an electronic liquid powder method, or the like; MEMS shutter display elements; and optical interference type MEMS display elements can be used. A structure suitable for employed display elements can be selected from among a variety of structures of pixel circuits.

The substrate 510 is a stacked body in which a flexible substrate 510b, a barrier film 510a that prevents diffusion of unintentional impurities to light-emitting elements, and an adhesive layer 510c that attaches the barrier film 510a to the substrate 510b are stacked.

The substrate 570 is a stacked body in which a flexible substrate 570b, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560 has a refractive index higher than that of air. In the case of extracting light to the sealant 560 side, the sealant 560 serves as an optical adhesive layer. The pixel circuits and the light-emitting elements (e.g., a light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the light-emitting element 550R and the pixel circuit that can supply electric power to the light-emitting element 550R and includes a transistor 502t. Furthermore, the light-emitting module 580R includes the light-emitting element 550R and an optical element (e.g., a coloring layer 567R).

The light-emitting element 550R includes a lower electrode, an upper electrode, and a layer containing a light-emitting organic compound between the lower electrode and the upper electrode.

The light-emitting module 580R includes the coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

In the case where the sealant 560 is provided on the light extraction side, the sealant 560 is in contact with the light-emitting element 550R and the coloring layer 567R.

The coloring layer 567R is positioned in a region overlapping with the light-emitting element 550R. Accordingly, part of light emitted from the light-emitting element 550R passes through the coloring layer 567R and is emitted to the outside of the light-emitting module 580R as indicated by an arrow in FIG. 29A.

<<Structure of Display Portion>>

The display portion 501 includes a light-blocking layer 567BM on the light extraction side. The light-blocking layer 567BM is provided so as to surround the coloring layer (e.g., the coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of unintentional impurities.

The display portion 501 includes the light-emitting elements (e.g., the light-emitting element 550R) over the insulating film 521.

The display portion 501 includes, over the insulating film 521, a partition 528 that overlaps with an end portion of a lower electrode. In addition, a spacer that controls the distance between the substrate 510 and the substrate 570 is provided on the partition 528.

<<Structure of Scan Line Driver Circuit>>

A scan line driver circuit 503g(1) includes a transistor 503t and a capacitor 503c. Note that the driver circuit can be formed in the same process and over the same substrate as those of the pixel circuits.

<<Other Structures>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

Modification Example 1 of Display Portion

Any of various kinds of transistors can be used in the display portion 501.

A structure in the case of using bottom-gate transistors in the display portion 501 is illustrated in FIGS. 29A and 29B.

For example, a semiconductor layer containing an oxide semiconductor, amorphous silicon, or the like can be used in the transistor 502t and the transistor 503t illustrated in FIG. 29A.

For example, a semiconductor layer containing polycrystalline silicon or the like can be used in the transistor 502t and the transistor 503t illustrated in FIG. 29B.

A structure in the case of using top-gate transistors in the display portion 501 is illustrated in FIG. 29C.

For example, a semiconductor layer containing polycrystalline silicon, a transferred single crystal silicon film, or the like can be used in the transistor 502t and the transistor 503t illustrated in FIG. 29C.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 7

In this embodiment, a structure of a foldable touch panel that can be used in the electronic device of one embodiment of the present invention will be described with reference to FIGS. 30A to 30C.

Figure 30A:
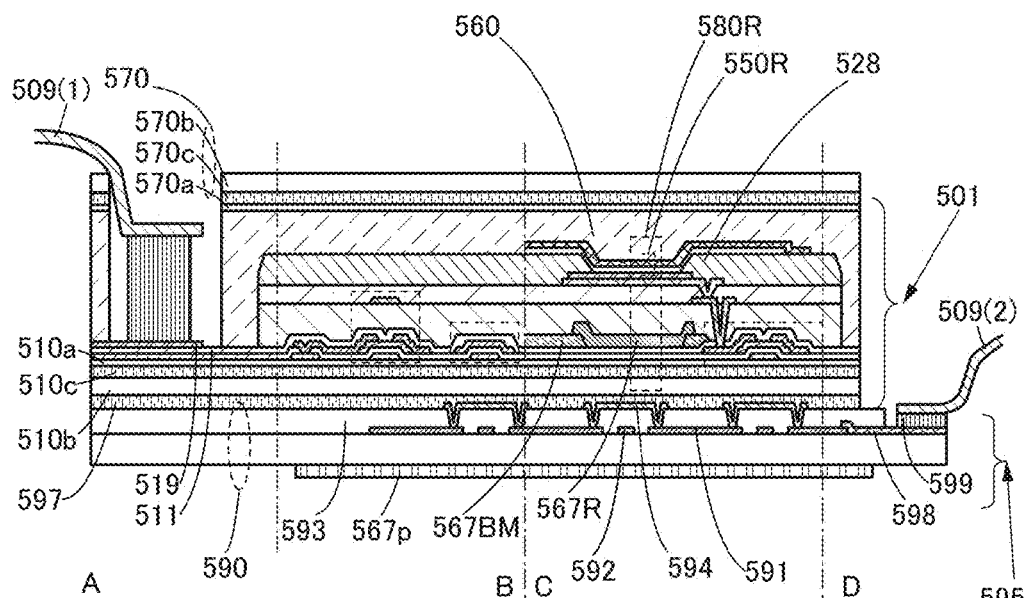
FIGS. 30A to 30C illustrate structure examples of a light-emitting panel of an embodiment.
Figure 30B:
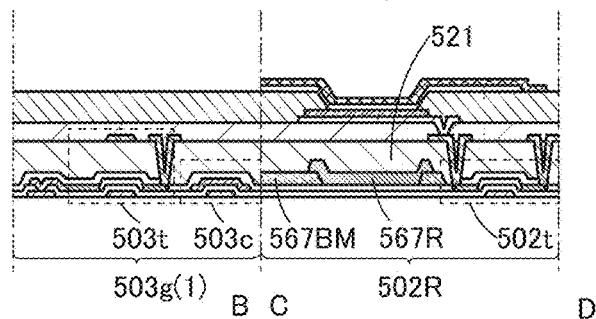
Figure 30C:
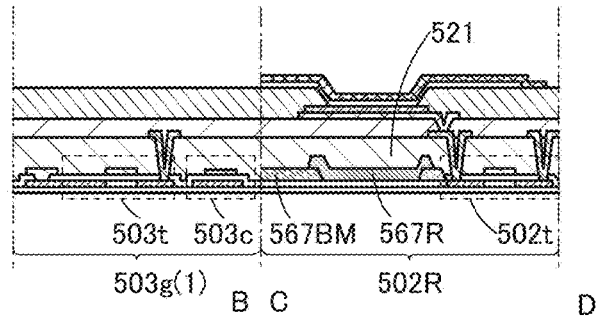

FIGS. 30A to 30C are cross-sectional views of a touch panel 500B.

The touch panel 500B described in this embodiment is different from the touch panel 500 described in Embodiment 6 in that the display portion 501 displays received image data to the side where the transistors are provided and that the touch sensor is provided on the substrate 510 side of the display portion. Different structures will be described in detail below, and the above description is referred to for the other similar structures.

<Display Portion>

The display portion 501 includes a plurality of pixels arranged in a matrix. Each of the pixels includes a display element and a pixel circuit for driving the display element.

<<Structure of Pixel>>

A pixel includes the sub-pixel 502R, and the sub-pixel 502R includes a light-emitting module 580R.

The sub-pixel 502R includes the light-emitting element 550R and the pixel circuit that can supply electric power to the light-emitting element 550R and includes the transistor 502t.

The light-emitting module 580R includes the light-emitting element 550R and an optical element (e.g., the coloring layer 567R).

The light-emitting element 550R includes a lower electrode, an upper electrode, and a layer containing a, light-emitting organic compound between the lower electrode and the upper electrode.

The light-emitting module 580R includes the coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The coloring layer 567R is positioned in a region overlapping with the light-emitting element 550R. The light-emitting element 550R illustrated in FIG. 30A emits light to the side where the transistor 502t is provided. Accordingly, part of light emitted from the light-emitting element 550R passes through the coloring layer 567R and is emitted to the outside of the light-emitting module 580R as indicated by an arrow in FIG. 30A.

<<Structure of Display Portion>>

The display portion 501 includes a light-blocking layer 567BM on the light extraction side. The light-blocking layer 567BM is provided so as to surround the coloring layer (e.g., the coloring layer 567R).

The display portion 501 includes the insulating film 521. The insulating film 521 covers the transistor 502t. Note that the insulating film 521 can be used as a layer for planarizing unevenness caused by the pixel circuits, A stacked film including a layer that can prevent diffusion of impurities can be used as the insulating film 521. This can prevent the reliability of the transistor 502t or the like from being lowered by diffusion of unintentional impurities from the coloring layer 567R.

<Touch Sensor>

The touch sensor 595 is provided on the substrate 510 side of the display portion 501 (see FIG. 30A).

The adhesive layer 597 is provided between the substrate 510 and the substrate 590 and attaches the touch sensor 595 to the display portion 501.

Modification Example 1 of Display Portion

Any of various kinds of transistors can be used in the display portion 501.

A structure in the case of using bottom-gate transistors in the display portion 501 is illustrated in FIGS. 30A and 30B.

For example, a semiconductor layer containing an oxide semiconductor, amorphous silicon, or the like can be used in the transistor 502t and the transistor 503t illustrated in FIG. 30A.

For example, a semiconductor layer containing polycrystalline silicon or the like can be used in the transistor 502t and the transistor 503t illustrated in FIG. 30B.

A structure in the case of using top-gate transistors in the display portion 501 is illustrated in FIG. 30C.

For example, a semiconductor layer containing polycrystalline silicon, a transferred single crystal silicon film, or the like can be used in the transistor 502t and the transistor 503t illustrated in FIG. 30C.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 8

An oxide semiconductor suitable for a semiconductor layer of a semiconductor device that can be used for a display panel of one embodiment of the present invention is described in this embodiment.

An oxide semiconductor has a wide energy gap of 3.0 eV or more. A transistor including an oxide semiconductor film obtained by processing of the oxide semiconductor in an appropriate condition and a sufficient reduction in carrier density of the oxide semiconductor can have much lower leakage current between a source and a drain in an off state (off-state current) than a conventional transistor including silicon.

An applicable oxide semiconductor preferably contains at least indium (In) or zinc (Zn). In particular, In and Zn are preferably contained. In addition, as a stabilizer for reducing variation in electrical characteristics of the transistor using the oxide semiconductor, one or more selected from gallium (Ga), tin (Sn), hafnium (Hf), zirconium (Zr), titanium (Ti), scandium (Sc), yttrium (Y), and an lanthanoid (e.g., cerium (Ce), neodymium (Nd), or gadolinium (Gd)) is preferably contained.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In:Ga:Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co, or the above-described element as a stabilizer. Alternatively, as the oxide semiconductor, a material expressed by a chemical formula, $In_2SnO_5(ZnO)_n$ (n>0, n is an integer) may be used.

For example, In—Ga—Zn-based oxide with an atomic ratio of In:Ga:Zn=1:1:1, 1:3:2, 1:3:4, 1:3:6, 3:1:2, or 2:1:3, or an oxide whose composition is in the neighborhood of the above compositions may be used.

Note that if the oxide semiconductor film contains a large amount of hydrogen, the hydrogen and the oxide semiconductor are bonded to each other, so that part of the hydrogen serves as a donor and causes generation of an electron that is a carrier. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, so that the oxide semiconductor film can be an i-type (intrinsic) oxide semiconductor film or an oxide semiconductor film extremely close to an i-type oxide semiconductor (a substantially i-type oxide semiconductor). Note that "substantially intrinsic" means that the oxide semiconductor film includes extremely few (close to zero) carriers derived from a donor, and the carrier concentration thereof is lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, lower than or equal to $1\times10^{13}/cm^3$, particularly preferably lower than or equal to $8\times10^{11}/cm^3$, still further preferably lower than or equal to $1\times10^{11}/cm^3$, yet further preferably lower than or equal to $1\times10^{10}/cm^3$, and is higher than or equal to $1\times10^{-9}/cm^3$.

In this manner, the transistor including an i-type or substantially i-type oxide semiconductor film can have extremely favorable off-state current characteristics. For example, the drain current at the time when the transistor including an oxide semiconductor film is in an off-state at room temperature (25° C.) can be less than or equal to $1\times10^{-18}$ A, preferably less than or equal to $1\times10^{-21}$ A, further preferably less than or equal to $1\times10^{-24}$ A; or at 85° C., less than or equal to $1\times10^{-15}$ A, preferably less than or equal to $1\times10^{-18}$ A, further preferably less than or equal to $1\times10^{-21}$ A. An off state of a transistor refers to a state where gate voltage is lower than the threshold voltage in an n-channel transistor. Specifically, the transistor is in an off state when the gate voltage is lower than the threshold voltage by 1 V or more, 2 V or more, or 3 V or more. Note that these current values are values when the voltage between a source and a drain is, for example, 1 V, 5 V, or 10 V.

A structure of the oxide semiconductor film is described below.

An oxide semiconductor film is classified roughly into a single-crystal oxide semiconductor film and a non-single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, a CAAC-OS film is described. Note that a CAAC-OS can be referred to as an oxide semiconductor including c-axis aligned nanocrystals (CANC).

The CAAC-OS film is an oxide semiconductor film including a plurality of c-axis aligned crystal parts.

In a transmission electron microscope (TEM) image of the CAAC-OS film, a boundary between crystal parts, that is, a clear grain boundary is not observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer reflects unevenness of a surface over which the CAAC-OS film is formed (hereinafter, such a surface is referred to as a formation surface) or a top surface of the CAAC-OS film, and is arranged parallel to the formation surface or the top surface of the CAAC-OS film.

On the other hand, according to the TEM image of the CAAC-OS film observed in a direction substantially perpendicular to the sample surface (plan-view TEM image), metal atoms are arranged in a triangular or hexagonal configuration in the crystal parts. However, there is no regularity of arrangement of metal atoms between different crystal parts.

FIG. 31A is a cross-sectional TEM image of a CAAC-OS film. FIG. 31B is a cross-sectional TEM image obtained by enlarging the image of FIG. 31A. In FIG. 31B, atomic arrangement is highlighted for easy understanding.

FIG. 31C is Fourier transform images of regions each surrounded by a circle (the diameter is approximately 4 nm) between A and O and between O and A' in FIG. 31A. C-axis alignment can be observed in each region in FIG. 31C. The c-axis direction between A and O is different from that between O and A', which indicates that a grain in the region between A and O is different from that between O and A'. In addition, between A and O, the angle of the c-axis continuously and gradually changes from 14.3°, 16.6°, to 26.4°. Similarly, between O and A', the angle of the c-axis continuously changes from −18.3°, −17.6°, to −15.9°.

Figure 32A:
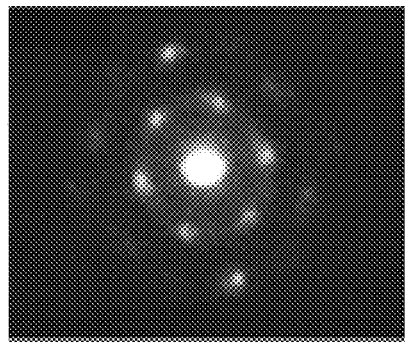
FIGS. 32A and 32B show nanobeam electron diffraction patterns of oxide semiconductor films and FIGS. 32C and 32D illustrate an example of a transmission electron diffraction measurement apparatus.

Note that in an electron diffraction pattern of the CAAC-OS film, spots (luminescent spots) having alignment are shown. For example, spots are observed in an electron diffraction pattern (also referred to as a nanobeam electron diffraction pattern) of the top surface of the CAAC-OS film which is obtained using an electron beam with a diameter of, for example, larger than or equal to 1 nm and smaller than or equal to 30 nm (see FIG. 32A).

From the results of the cross-sectional TEM image and the plan TEM image, alignment is found in the crystal parts in the CAAC-OS film.

Most of the crystal parts included in the CAAC-OS film each fit into a cube whose one side is less than 100 nm. Thus, there is a case where a crystal part included in the CAAC-OS film fits into a cube whose one side is less than 10 nm, less than 5 nm, or less than 3 nm. Note that when a plurality of crystal parts included in the CAAC-OS film are connected to each other, one large crystal region is formed in some cases. For example, a crystal region with an area of larger than or equal to 2500 nm$^2$, larger than or equal to 5 μm$^2$, or larger than or equal to 1000 μm$^2$ is observed in some cases in the planar TEM image.

The CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an In-plane method in which an X-ray enters a sample in a direction substantially perpendicular to the c-axis, a peak appears frequently when 2θ is around 560. This peak is derived from the (110) plane of the InGaZnO$_4$ crystal. Here, analysis (ϕ scan) is performed under conditions where the sample is rotated around a normal vector of a sample surface as an axis (ϕ axis) with 2θ fixed at around 56°. In the case where the sample is a single crystal oxide semiconductor film of InGaZnO$_4$, six peaks appear. The six peaks are derived from crystal planes equivalent to the (110) plane. In contrast, in the case of a CAAC-OS film, a peak is not clearly observed even when ϕ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer which is arranged in a layered manner and observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, in the case where the shape of the CAAC-OS film is changed by etching or the like, the c-axis might not be necessarily parallel to a, normal vector of a formation surface or a normal vector of a top surface of the CAAC-OS film.

Furthermore, distribution of c-axis aligned crystal parts in the CAAC-OS film is not necessarily uniform. For example, in the case where crystal growth leading to the crystal parts of the CAAC-OS film occurs from the vicinity of the top surface of the CAAC-OS film, the proportion of the c-axis aligned crystal parts in the vicinity of the top surface is higher than that in the vicinity of the formation surface in some cases. Furthermore, when an impurity is added to the CAAC-OS film, a region to which the impurity is added is altered, and the proportion of the c-axis aligned crystal parts in the CAAC-OS film varies depending on regions, in some cases.

Note that when the CAAC-OS film with an InGaZnO$_4$ crystal is analyzed by an out-of-plane method, a peak may also be observed at 2θ of around 36°, in addition to the peak at 2θ of around 31°. The peak at 2θ of around 36° indicates that a crystal having no c-axis alignment is included in part of the CAAC-OS film. It is preferable that in the CAAC-OS film, a, peak appear at 2θ of around 31° and a peak do not appear at 2θ of around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic order of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic order of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has a negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

In an OS transistor including the CAAC-OS film, changes in electrical characteristics of the transistor due to irradiation with visible light or ultraviolet light are small.

Next, a microcrystalline oxide semiconductor film is described.

In an image obtained with a TEM, crystal parts cannot be found clearly in the microcrystalline oxide semiconductor film in some cases. In most cases, the size of a crystal part included in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In an image of the nc-OS film obtained with a TEM, for example, a grain boundary cannot be found clearly in some cases. Note that the nc-OS can also be referred to as an oxide semiconductor including random aligned nanocrystals (RANC) or an oxide semiconductor including non-aligned nanocrystals (NANC).

Figure 32B:
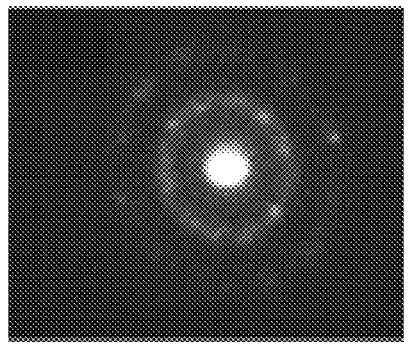

In the nc-OS film, a microscopic region (e.g., a region with a size greater than or equal to 1 nm and less than or equal to 10 nm, in particular, a region with a size greater than or equal to 1 nm and less than or equal to 3 nm) has a periodic atomic order. The nc-OS film does not have regularity of crystal orientation between different crystal parts. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than that of a crystal part, a peak that shows a crystal plane does not appear. Furthermore, a halo pattern is shown in an electron diffraction pattern (also referred to as a selected-area electron diffraction pattern) of the nc-OS film obtained by using an electron beam having a probe diameter (e.g., larger than or equal to 50 nm) larger than the diameter of a crystal part. Meanwhile, spots are shown in a nanobeam electron diffraction pattern of the nc-OS film obtained by using an electron beam having a probe diameter close to, or smaller than the diameter of a crystal part. Furthermore, in a nanobeam electron diffraction pattern of the nc-OS film, regions with high luminance in a circular (ring) pattern are shown in some cases. Also in a nanobeam electron diffraction pattern of the nc-OS film, a plurality of spots are shown in a ring-like region in some cases (see FIG. 32B).

Since the nc-OS film is an oxide semiconductor film having more regularity than the amorphous oxide semiconductor film, the nc-OS film has a lower density of defect states than the amorphous oxide semiconductor film. However, there is no regularity of crystal orientation between different crystal parts in the nc-OS film; hence, the nc-OS film has a higher density of defect states than the CAAC-OS film.

Note that an oxide semiconductor film may be a stacked film including two or more films of an amorphous oxide semiconductor film, a microcrystalline oxide semiconductor film, and a CAAC-OS film, for example.

In the case where the oxide semiconductor film has a plurality of structures, the structures can be analyzed using nanobeam electron diffraction in some cases.

Figure 32C:
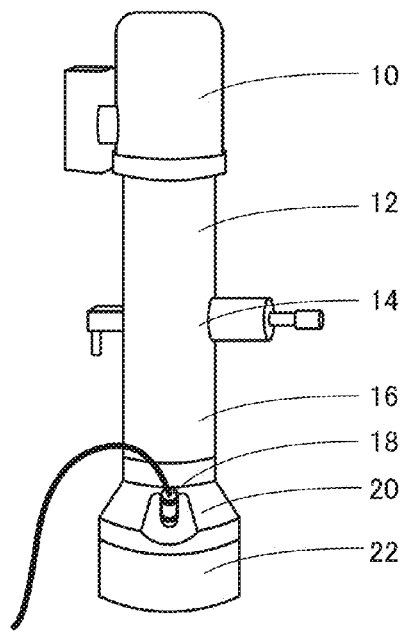

FIG. 32C illustrates a transmission electron diffraction measurement apparatus that includes an electron gun chamber 10, an optical system 12 below the electron gun chamber 10, a sample chamber 14 below the optical system 12, an optical system 16 below the sample chamber 14, an observation chamber 20 below the optical system 16, a camera 18 installed in the observation chamber 20, and a film chamber 22 below the observation chamber 20. The camera 18 is provided to face the inside of the observation chamber 20. Note that the film chamber 22 is not necessarily provided.

Figure 32D:
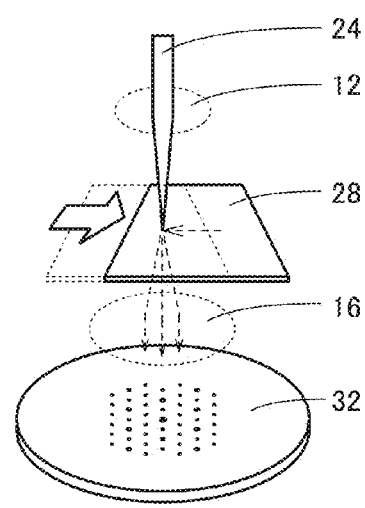

FIG. 32D illustrates an internal structure of the transmission electron diffraction measurement apparatus illustrated in FIG. 32C. In the transmission electron diffraction measurement apparatus, a substance 28 provided in the sample chamber 14 is irradiated with electrons ejected from an electron gun provided in the electron gun chamber 10 through the optical system 12. The electrons that have passed through the substance 28 enter a fluorescent plate 32 provided in the observation chamber 20 through the optical system 16. On the fluorescent plate 32, a pattern corresponding to the intensity of entered electron appears, which allows measurement of a transmission electron diffraction pattern.

The camera 18 is set toward the fluorescent plate 32 so that a pattern on the fluorescent plate 32 can be taken. An angle formed by a straight line that passes through the center of a lens of the camera 18 and the center of the fluorescent plate 32 and an upper surface of the fluorescent plate 32 is, for example, 15° or more and 80° or less, 30° or more and 75° or less, or 45° or more and 70° or less. As the angle is reduced, distortion of the transmission electron diffraction pattern taken by the camera. 18 becomes larger. Note that if the angle is obtained in advance, the distortion of an obtained transmission electron diffraction pattern can be corrected. Note that the film chamber 22 may be provided with the camera 18. For example, the camera 18 may be set in the film chamber 22 so as to be opposite to the incident direction of electrons 24. In this case, a transmission electron diffraction pattern with less distortion can be taken from the rear surface of the fluorescent plate 32.

A holder for fixing the substance 28 that is a sample is provided in the sample chamber 14. The holder transmits electrons passing through the substance 28. The holder may have, for example, a function of moving the substance 28 in the direction of the X, Y, and Z axes. The movement function of the holder may have an accuracy of moving the substance in the range of, for example, 1 nm to 10 nm, 5 nm to 50 nm, 10 nm to 100 nm, 50 nm to 500 nm, and 100 nm to 1 μm. The range is preferably determined to be an optimal range for the structure of the substance 28.

A method for measuring a transmission electron diffraction pattern of a substance by the transmission electron diffraction measurement apparatus described above will be described.

For example, changes in the structure of a substance can be observed by changing (scanning) the irradiation position of the electrons 24 that are a nanobeam in the substance, as illustrated in FIG. 32D. At this time, when the substance 28 is a CAAC-OS film, a diffraction pattern shown in FIG. 32A can be observed. When the substance 28 is an nc-OS film, a diffraction pattern shown in FIG. 32B can be observed.

However, even when the substance 28 is a CAAC-OS film, a diffraction pattern that is partly similar to that of an nc-OS film is observed in some cases. Therefore, whether or not a CAAC-OS film is favorable can be determined by the proportion of a region where a diffraction pattern of a CAAC-OS film is observed in a predetermined area (also referred to as proportion of CAAC). In the case of a high quality CAAC-OS film, for example, the proportion of CAAC is higher than or equal to 50%, preferably higher than or equal to 80%, further preferably higher than or equal to 90%, still further preferably higher than or equal to 95%. Note that a proportion of a region where a diffraction pattern different from that of a CAAC-OS film is referred to as the proportion of non-CAAC.

For example, transmission electron diffraction patterns were obtained by scanning a top surface of a sample including a CAAC-OS film obtained just after deposition (represented as "as-sputtered") and a top surface of a sample including a CAAC-OS subjected to heat treatment at 450° C. in an atmosphere containing oxygen. Here, the proportion of CAAC was obtained in such a manner that diffraction patterns were observed by scanning for 60 seconds at a rate of 5 nm/second and the obtained diffraction patterns were converted into still images every 0.5 seconds. Note that as an electron beam, a nanobeam with a probe diameter of 1 nm was used. The above measurement was performed on six samples. The proportion of CAAC was calculated using the average value of the six samples.

Figure 33A:
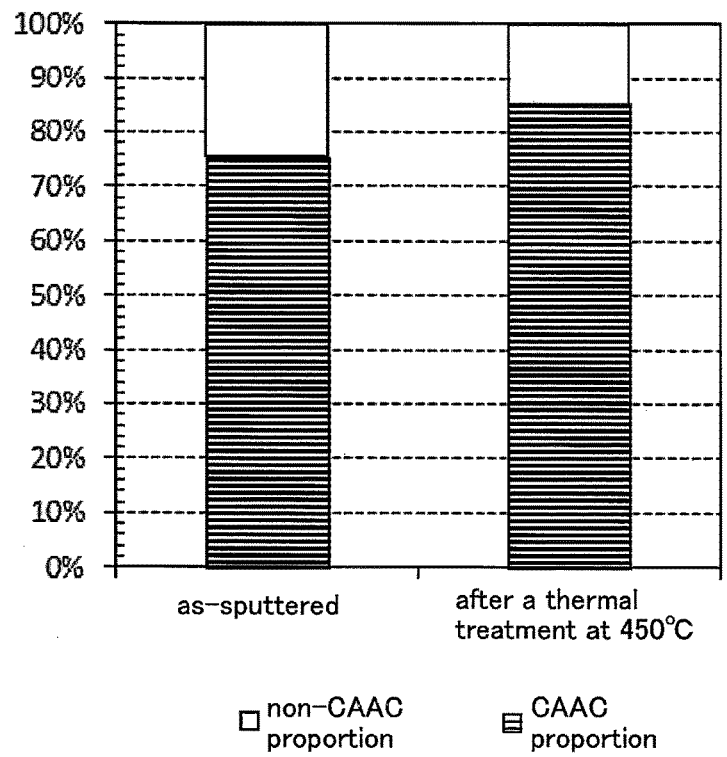
FIG. 33A shows an example of structural analysis by transmission electron diffraction measurement and FIGS. 33B and 33C show plan-view TEM images.

FIG. 33A shows the proportion of CAAC in each sample. The proportion of CAAC of the CAAC-OS film obtained just after the deposition was 75.7% (the proportion of non-CAAC was 24.3%). The proportion of CAAC of the CAAC-OS film subjected to the heat treatment at 450° C. was 85.3% (the proportion of non-CAAC was 14.7%). These results show that the proportion of CAAC obtained after the heat treatment at 450° C. is higher than that obtained just after the deposition. That is, heat treatment at a high temperature (e.g., higher than or equal to 400° C.) reduces the proportion of non-CAAC (increases the proportion of CAAC). Further, the above results also indicate that even when the temperature of the heat treatment is lower than 500° C., the CAAC-OS film can have a high proportion of CAAC.

Here, most of diffraction patterns different from that of a CAAC-OS film are diffraction patterns similar to that of an nc-OS film. Furthermore, an amorphous oxide semiconductor film was not able to be observed in the measurement region. Therefore, the above results suggest that the region having a structure similar to that of an nc-OS film is rearranged by the heat treatment owing to the influence of the structure of the adjacent region, whereby the region becomes CAAC.

Figure 33B:
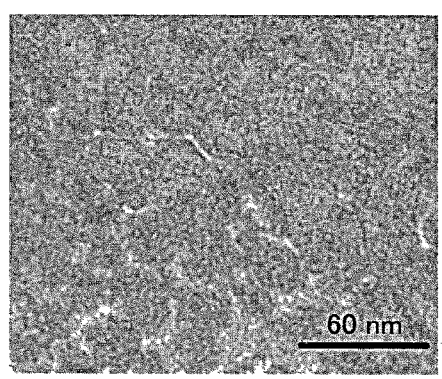
Figure 33C:
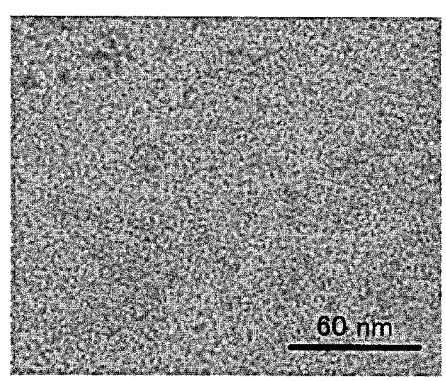

FIGS. 33B and 33C are planar TEM images of the CAAC-OS film obtained just after the deposition and the CAAC-OS film subjected to the heat treatment at 450° C., respectively. Comparison between FIGS. 33B and 33C shows that the CAAC-OS film subjected to the heat treatment at 450° C. has more uniform film quality. That is, the heat treatment at a high temperature improves the film quality of the CAAC-OS film.

With such a measurement method, the structure of an oxide semiconductor film having a plurality of structures can be analyzed in some cases.

The CAAC-OS film is formed, for example, by the following method.

For example, the CAAC-OS film is formed by a sputtering method with a polycrystalline oxide semiconductor sputtering target.

By increasing the substrate temperature during the deposition, migration of sputtered particles is likely to occur after the sputtered particles reach a substrate surface. Specifically, the substrate temperature during the deposition is higher than or equal to 100° C. and lower than or equal to 740° C., preferably higher than or equal to 200° C. and lower than or equal to 500° C. By increasing the substrate temperature during the deposition, when the flat-plate-like or pellet-like sputtered particles reach the substrate, migration occurs on the substrate surface, so that a flat plane of the sputtered particles is attached to the substrate. At this time, the sputtered particle is charged positively, whereby sputtered particles are attached to the substrate while repelling each other; thus, the sputtered particles do not overlap with each other randomly, and a CAAC-OS film with a uniform thickness can be deposited.

By reducing the amount of impurities entering the CAAC-OS film during the deposition, the crystal state can be prevented from being broken by the impurities. For example, the concentration of impurities (e.g., hydrogen, water, carbon dioxide, or nitrogen) that exist in the deposition chamber may be reduced. Furthermore, the concentration of impurities in a deposition gas may be reduced. Specifically, a deposition gas whose dew point is −80° C. or lower, preferably −100° C. or lower is used.

Furthermore, it is preferable that the proportion of oxygen in the deposition gas be increased and the power be optimized in order to reduce plasma damage at the deposition. The proportion of oxygen in the deposition gas is higher than or equal to 30 vol %, preferably 100 vol %.

Alternatively, the CAAC-OS film is formed by the following method.

First, a first oxide semiconductor film is formed to a thickness of greater than or equal to 1 nm and less than 10 nm. The first oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that the first oxide semiconductor film becomes a first CAAC-OS film with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the first oxide semiconductor film for a short time. At the same time, the heat treatment in an inert atmosphere may generate oxygen vacancies in the first oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor film for a shorter time.

The first oxide semiconductor film with a thickness greater than or equal to 1 nm and less than 10 nm can be easily crystallized by heat treatment as compared to the case where the first oxide semiconductor film has a thickness greater than or equal to 10 nm.

Next, a second oxide semiconductor film having the same composition as the first oxide semiconductor film is formed to a thickness of greater than or equal to 10 nm and less than or equal to 50 nm. The second oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that solid phase growth of the second oxide semiconductor film is performed using the first CAAC-OS film, thereby forming a second CAAC-OS film with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the second oxide semiconductor film for a short time. At the same time, the heat treatment in an inert atmosphere may generate oxygen vacancies in the second oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor film for a shorter time.

In the above-described manner, a CAAC-OS film with a total thickness of greater than or equal to 10 nm can be formed.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 9

In the other embodiments, a variety of examples are shown. Note that one embodiment of the present invention is not limited to the above examples.

For example, in this specification and the like, transistors with a variety of structures can be used, without limitation to a certain type. For example, a transistor including single crystal silicon or a transistor including a non-single-crystal semiconductor film typified by amorphous silicon, polycrystalline silicon, microcrystalline (also referred to as microcrystal, nanocrystal, or semi-amorphous) silicon, or the like can be used. Alternatively, a thin film transistor (TFT) obtained by thinning such a semiconductor, or the like can be used. In the case of using the TFT, there are various advantages. For example, since the TFT can be formed at a temperature lower than that of the case of using single crystal silicon, manufacturing cost can be reduced and a larger manufacturing apparatus can be used. Since a larger manufacturing apparatus can be used, TFTs can be formed using a large substrate. Therefore, many display devices can be formed at the same time at low cost. Alternatively, a substrate having low heat resistance can be used because of a low manufacturing temperature. Therefore, the transistor can be formed using a light-transmitting substrate. Alternatively, transmission of light in a display element can be controlled by using the transistor formed using the light-transmitting substrate. Alternatively, part of a film included in the transistor can transmit light because the thickness of the transistor is small. Therefore, the aperture ratio can be increased.

Note that by using a catalyst (e.g., nickel) in forming polycrystalline silicon, crystallinity can be further increased and a transistor having excellent electrical characteristics can be formed. Accordingly, a gate driver circuit (a scan line driver circuit), a source driver circuit (a signal line driver circuit), and a signal processing circuit (a signal generation circuit, a gamma correction circuit, a DA converter circuit, or the like) can be formed using the same substrate.

Note that by using a catalyst (e.g., nickel) in forming microcrystalline silicon, crystallinity can be further increased and a transistor having excellent electrical characteristics can be formed. At this time, crystallinity can be increased by just performing heat treatment without performing laser irradiation. Accordingly, a gate driver circuit (a scan line driver circuit) and part of a source driver circuit (e.g., an analog switch) can be formed over the same substrate. Note that in the case where laser irradiation for crystallization is not performed, unevenness in crystallinity of silicon can be suppressed. Accordingly, an image with improved image quality can be displayed. Note that polycrystalline silicon or microcrystalline silicon can be formed without use of a catalyst (e.g., nickel).

Note that it is preferable that the crystallinity of silicon be improved to polycrystal, microcrystal, or the like in the whole panel; however, the crystallinity of silicon in the present invention is not limited thereto. The crystallinity of silicon may be improved only in part of the panel. A selective increase in crystallinity can be achieved by selective laser irradiation or the like. For example, only a peripheral driver circuit region, which is a region excluding pixels, may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. By such selective laser irradiation, the crystallinity of silicon only in a region in which a circuit needs to operate at high speed can be improved. Because a pixel region is not particularly needed to operate at high speed, even if crystallinity is not improved, the pixel circuit can operate without problems. Thus, a region whose crystallinity is improved is small, so that manufacturing steps can be decreased. As a result, the throughput can be increased and the manufacturing cost can be reduced. Alternatively, the number of manufacturing apparatuses needed is small; thus, the manufacturing cost can be reduced.

Examples of the transistor are a transistor including a compound semiconductor (e.g., SiGe or GaAs) or an oxide semiconductor (e.g., ZnO, InGaZnO, indium zinc oxide (IZO), indium tin oxide (ITO), SnO, TiO, AlZnSnO (AZTO), or In—Sn—Zn—O (ITZO)) and a thin film transistor including a thin film of such a compound semiconductor or oxide semiconductor. Thus, the manufacturing temperature can be low and for example, such a transistor can be formed at room temperature. Accordingly, the transistor can be formed directly on a substrate having low heat resistance, such as a plastic substrate or a film substrate. Note that such a compound semiconductor or oxide semiconductor can be used for not only a channel portion of a transistor but also for other applications. For example, such a compound semiconductor or oxide semiconductor can be used for a wiring, a resistive element, a pixel electrode, a light-transmitting electrode, or the like. Since such an element can be formed at the same time as a transistor, the cost can be reduced.

Note that for example, a transistor formed by an ink-jet method or a printing method can be used. Accordingly, such a transistor can be formed at room temperature, can be formed at a low vacuum, or can be formed using a large substrate. Thus, the transistor can be formed without using a mask (reticle), which enables the layout of the transistor to be easily changed. Alternatively, the transistor can be formed without using a resist, leading to reductions in material cost and the number of steps. Furthermore, a film can be formed only in a portion where the film is needed, a material is not wasted as compared with the case of employing a manufacturing method by which etching is performed after the film is formed over the entire surface, so that the cost can be reduced.

Note that for example, a transistor including an organic semiconductor or a carbon nanotube can be used. Thus, such a transistor can be formed over a flexible substrate. A device including a transistor which includes an organic semiconductor or a carbon nanotube can resist an impact.

Note that transistors with a variety of different structures can be used. For example, a MOS transistor, a junction transistor, a bipolar transistor, or the like can be used. Since a MOS transistor has a small size, a large number of transistors can be mounted. Note that a MOS transistor and a bipolar transistor may be formed over one substrate, in which case reductions in power consumption and size, high-speed operation, and the like can be achieved.

Note that in this specification and the like, for example, a transistor with a multi-gate structure having two or more gate electrodes can be used. With the multi-gate structure, a structure where a plurality of transistors are connected in series is provided because channel regions are connected in series. Thus, with the multi-gate structure, the amount of off-state current can be reduced and the withstand voltage of the transistor can be increased (reliability can be improved). Alternatively, with the multi-gate structure, the drain-source current does not change so much even if the drain-source voltage fluctuates when the transistor operates in a saturation region, so that a flat slope of the voltage-current characteristics can be obtained. By utilizing the flat slope of the voltage-current characteristics, an ideal current source circuit or an active load having extremely high resistance can be obtained. Accordingly, a differential circuit, a current mirror circuit, or the like having excellent properties can be obtained.

Note that, for example, a transistor with a structure where gate electrodes are provided above and below a channel can be used. With the structure where the gate electrodes are provided above and below the channel, a circuit structure where a plurality of transistors are connected in parallel is provided. Thus, a channel region is increased, so that the amount of current can be increased. When the structure where the gate electrodes are provided above and below the channel is employed, a depletion layer is easily formed; thus, the subthreshold swing (S value) can be improved.

Note that for example, a transistor with a structure where a gate electrode is formed above a channel region, a structure where a gate electrode is formed below a channel region, a staggered structure, an inverted staggered structure, a structure where a channel region is divided into a plurality of regions, a structure where channel regions are connected in parallel or in series, or the like can be used. A transistor with any of a variety of structures such as a planar type, a FIN-type, a TRI-GATE type, a top-gate type, a bottom-gate type, a double-gate type (with gates above and below a channel), and the like can be used.

Note that, for example, a transistor with a structure where a source electrode or a drain electrode overlaps with a channel region (or part thereof) can be used. When the structure where the source electrode or the drain electrode overlaps with the channel region (or part thereof) is employed, unstable operation due to electric charge accumulated in part of the channel region can be prevented.

Note that for example, a transistor with a structure where an LDD region is provided can be used. Provision of the LDD region enables a reduction in off-current or an increase in the withstand voltage of the transistor (an improvement in reliability). Alternatively, by providing the LDD region, the drain current does not change so much even when the drain-source voltage fluctuates when the transistor operates in a saturation region, so that a flat slope of the voltage-current characteristics can be obtained.

For example, in this specification and the like, a variety of substrates can be used to form a transistor. The type of a substrate is not limited to a certain type. Examples of the substrate include a semiconductor substrate (e.g., a single crystal substrate or a silicon substrate), an SOT substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, and a base material film. Examples of a glass substrate include a barium borosilicate glass substrate, an aluminoborosilicate glass substrate, and soda lime glass substrate. Examples of a, flexible substrate, an attachment film, a base material film, or the like are as follows: plastic typified by polyethylene terephthalate (PET), polyethylene naphthalate (PEN), and polyether sulfone (PES); a synthetic resin such as acrylic; polypropylene; polyester; polyvinyl fluoride; polyvinyl chloride; polyamide; polyimide; aramid; epoxy; an inorganic vapor deposition film; and paper. Specifically, when a transistor is formed using a semiconductor substrate, a single crystal substrate, an SOI substrate, or the like, it is possible to form a transistor with few variations in characteristics, size, shape, or the like, with high current supply capability, and with a small size. By forming a circuit with the use of such a transistor, power consumption of the circuit can be reduced or the circuit can be highly integrated.

Note that a transistor may be formed using a substrate, and then, the transistor may be transferred to another substrate. Examples of a substrate to which a transistor is transferred include, in addition to the above substrate over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. The use of such a substrate enables formation of a transistor with excellent properties, a transistor with low power consumption, or a device with high durability, high heat resistance, or a reduction in weight or thickness.

Note that all the circuits which are necessary to realize a desired function can be formed using one substrate (e.g., a glass substrate, a plastic substrate, a single crystal substrate, or an SOI substrate). In this manner, the cost can be reduced by a reduction in the number of components or reliability can be improved by a reduction in the number of connection points to circuit components.

Note that not all the circuits which are necessary to realize the predetermined function are needed to be formed using one substrate. That is, part of the circuits which are necessary to realize the predetermined function may be formed using a substrate and another part of the circuits which are necessary to realize the predetermined function may be formed using another substrate. For example, part of the circuits which are necessary to realize the predetermined function can be formed using a glass substrate and another part of the circuits which are necessary to realize the predetermined function can be formed using a single crystal substrate (or an SOT substrate). The single crystal substrate over which the another part of the circuits which are necessary to realize the predetermined function (such a substrate is also referred to as an IC chip) can be connected to the glass substrate by COG (chip on glass), and the IC chip can be provided over the glass substrate. Alternatively, the IC chip can be connected to the glass substrate by TAB (tape automated bonding), COF (chip on film), SMT (surface mount technology), a printed circuit board, or the like. When part of the circuits is formed over the same substrate as a pixel portion in this manner, the cost can be reduced by a reduction in the number of components or reliability can be improved by a reduction in the number of connection points between circuit components. In particular, a circuit in a portion where a driving voltage is high, a circuit in a portion where a driving frequency is high, or the like consumes much power in many cases. In view of the above, such a circuit is formed over a substrate (e.g., a single crystal substrate) different from a substrate over which a pixel portion is formed, whereby an IC chip is formed. The use of this IC chip allows prevention of an increase in power consumption.

The invention excluding content which is not specified in the drawings and texts in this specification can be constituted. Alternatively, when the range of a value (e.g., the maximum and minimum values) is described, the range may be freely narrowed or a value in the range may be excluded, so that the invention can be specified by a range part of which is excluded. In this manner, it is possible to specify the scope of the present invention so that a conventional technology is excluded, for example.

As a specific example, a diagram of a circuit including a first transistor to a fifth transistor is illustrated. In that case, it can be specified that the circuit does not include a sixth transistor in the invention. It can be specified that the circuit does not include a capacitor in the invention. It can also be specified that the circuit does not include a sixth transistor with a particular connection structure in the invention. Furthermore, it can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, a description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from the invention. For example, it can be specified that the case where the voltage is higher than or equal to 13 V is excluded from the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention.

As another specific example, a description "a voltage is preferred to be 10 V" is given. In that case, for example, it can be specified that the case where the voltage is higher than or equal to −2 V and lower than or equal to 1 V is excluded from the invention. For example, it can be specified that the case where the voltage is higher than or equal to 13 V is excluded from the invention.

As another specific example, a description "a film is an insulating film" is given to describe properties of a material. In that case, for example, it can be specified that the case where the insulating film is an organic insulating film is excluded from the invention. For example, it can be specified that the case where the insulating film is an inorganic insulating film is excluded from the invention.

As another specific example, a description of a stacked-layer structure, "a film is provided between A and B" is given. In that case, for example, it can be specified that the case where the film is a stacked film of four or more layers is excluded from the invention. For example, it can be specified that the case where a conductive film is provided between A and the film is excluded from the invention.

Note that various people can implement the invention described in this specification and the like. However, different people may be involved in the implementation of the invention. For example, in the case of a transmission/reception system, the following case is possible: Company A manufactures and sells transmitting devices, and Company B manufactures and sells receiving devices. As another example, in the case of a light-emitting device including a TFT and a light-emitting element, the following case is possible: Company A manufactures and sells semiconductor devices including TFTs, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. That is, one embodiment of the invention with which a patent infringement suit can be filed against Company A or Company B is clear and can be regarded as being disclosed in this specification or the like. For example, in the case of a transmission/reception system, one embodiment of the invention can be constituted by only a transmitting device and one embodiment of the invention can be constituted by only a receiving device. Those embodiments of the invention are clear and can be regarded as being disclosed in this specification or the like. As another example, in the case of a light-emitting device including a TFT and a light-emitting element, one embodiment of the invention can be constituted by only a semiconductor device including a TFT, and one embodiment of the invention can be constituted by only a light-emitting device including a TFT and a light-emitting element. Those embodiments of the invention are clear and can be regarded as being disclosed in this specification or the like.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Furthermore, in the case where a connection portion is disclosed in this specification and the like, it can be determined that one embodiment of the invention in which a connection portion is not specified is disclosed in this specification and the like, in some cases. In particular, in the case where there are several possible portions to which a terminal can be connected, it is not necessary to specify all the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one embodiment of the present invention can be clear. Furthermore, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, in a diagram or a text described in one embodiment, it is possible to take out part of the diagram or the text and constitute an embodiment of the invention. Thus, in the case where a diagram or a text related to a certain portion is described, the context taken out from part of the diagram or the text is also disclosed as one embodiment of the invention, and one embodiment of the invention can be constituted. Thus, for example, in a diagram or a text including one or more of active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like, it is possible to take out part of the diagram or the text and constitute one embodiment of the invention. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where N<N) from a cross-sectional view in which N layers (N is an integer) are provided. As another example, it is possible to constitute one embodiment of the invention by taking out M elements (M is an integer, where M<N) from a flow chart in which N elements (N is an integer) are provided.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted.

Note that size, the thickness of layers, or regions in the drawings are exaggerated for simplicity in some cases. Therefore, embodiments of the present invention are not limited to such a scale.

In this specification, for example, when the shape of an object is described with use of a term such as "diameter", "grain size (diameter)", "dimension", "size", or "width", the term can be regarded as the length of one side of a minimal cube where the object fits, or an equivalent circle diameter of a cross section of the object. The term "equivalent circle diameter of a cross section of the object" refers to the diameter of a perfect circle having the same area as that of the cross section of the object.

Note that a "semiconductor" includes characteristics of an "insulator" in some cases when the conductivity is sufficiently low, for example. Further, a "semiconductor" and an "insulator" cannot be strictly distinguished from each other in some cases because a border between the "semiconductor" and the "insulator" is not clear. Accordingly, a "semiconductor" in this specification can be called an "insulator" in some cases. Similarly, an "insulator" in this specification can be called a "semiconductor" in some cases.

Furthermore, a "semiconductor" includes characteristics of a "conductor" in some cases when the conductivity is sufficiently high, for example. Furthermore, a "semiconductor" and a "conductor" cannot be strictly distinguished from each other in some cases because a border between the "semiconductor" and the "conductor" is not clear. Accordingly, a "semiconductor" in this specification can be called a "conductor" in some cases. Similarly, a "conductor" in this specification can be called a "semiconductor" in some cases.

Note that an impurity in a semiconductor film refers to, for example, elements other than the main components of a semiconductor film. For example, an element with a concentration of lower than 0.1 atomic % is an impurity. When an impurity is contained, carrier traps may be formed in the semiconductor film, the carrier mobility may be decreased, or the crystallinity may be decreased, for example. In the case where the semiconductor film is an oxide semiconductor film, examples of an impurity which changes characteristics of the semiconductor film include Group 1 elements, Group 2 elements, Group 14 elements, Group 15 elements, and transition metals other than the main components; specifically, there are hydrogen (included in water), lithium, sodium, silicon, boron, phosphorus, carbon, and nitrogen, for example. In the case where the semiconductor is an oxide semiconductor, oxygen vacancies may be formed by entry of impurities. Furthermore, when the semiconductor film is a silicon film, examples of an impurity which changes the characteristics of the semiconductor film include oxygen, Group 1 elements except hydrogen, Group 2 elements, Group 13 elements, and Group 15 elements.

In this specification, excess oxygen refers to oxygen in excess of the stoichiometric composition, for example. Alternatively, excess oxygen refers to oxygen released by heating, for example. Excess oxygen can move inside a film or a layer. Excess oxygen moves between atoms in a film or a layer or excess oxygen replaces oxygen that is a constituent of a film or a layer and moves like a billiard ball. An insulating film having excess oxygen means an insulating film from which oxygen is released by heat treatment, for example.

In this specification, a term "parallel" indicates that the angle formed between two straight lines is greater than or equal to $-10°$ and less than or equal to $10°$, and accordingly also includes the case where the angle is greater than or equal to $-5°$ and less than or equal to $5°$. In addition, a term "perpendicular" indicates that the angle formed between two straight lines is greater than or equal to $80°$ and less than or equal to $100°$, and accordingly includes the case where the angle is greater than or equal to $85°$ and less than or equal to $95°$.

In the embodiment, a conductive film may be formed using, for example, a single layer or a stack of a conductive film containing aluminum, titanium, chromium, cobalt, nickel, copper, yttrium, zirconium, molybdenum, ruthenium, silver, tantalum, or tungsten. As a light-transmitting conductive film, for example, an oxide film such as an In—Zn—W oxide film, an In—Sn oxide film, an In—Zn oxide film, an indium oxide film, a zinc oxide film, or a tin oxide film may be used. Furthermore, a slight amount of Al, Ga, Sb, F, or the like may be added to the above-described oxide film. Furthermore, a metal thin film having a thickness which enables light to be transmitted (preferably, approximately greater than or equal to 5 nm and less than or equal to 30 nm) can also be used. For example, an Ag film, a Mg film, or an Ag—Mg alloy film with a thickness of 5 nm may be used. For example, as a film that reflects visible light efficiently, a film containing lithium, aluminum, titanium, magnesium, lanthanum, silver, silicon, or nickel can be used.

As an insulating film, for example, a single layer or a stack of an insulating film containing aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, or tantalum oxide may be used. Furthermore, a resin film made of a polyimide resin, an acrylic resin, an epoxy resin, a silicone resin, or the like may be used.

In this specification, the trigonal and rhombohedral crystal systems are included in the hexagonal crystal system.

In addition, terms such as "first", "second", and "third" in this specification are used in order to avoid confusion among components, and the terms do not limit the components numerically. Therefore, for example, the term "first" can be replaced with the term "second", "third", or the like as appropriate.

In this specification, in the case where an etching step is performed after a photolithography process, a mask formed in the photolithography process is removed.

In some cases, a transistor is additionally provided with a second gate for applying a potential to a back channel. In such a case, to distinguish the two gates, the terminal that is generally called a gate is called a "front gate" and the other is called a "back gate" in this specification.

Note that a voltage refers to a difference between potentials of two points, and a potential refers to electrostatic energy (electric potential energy) of a unit charge at a given point in an electrostatic field. Note that in general, a difference between a potential of one point and a reference potential (the ground potential for example) is merely called a potential or a voltage, and a potential and a voltage are used as synonymous words in many cases. Thus, in this specification, a potential may be rephrased as a voltage and a voltage may be rephrased as a potential unless otherwise specified.

In this specification and the like, a voltage refers to a difference between a given potential and a reference potential (e.g., a ground potential) in many cases. Thus, a voltage, a potential, and a potential difference can also be referred to as a potential, a voltage, and a voltage difference, respectively. Note that a voltage refers to a difference between potentials of two points, and a potential refers to electrostatic energy (electric potential energy) of a unit charge at a given point in an electrostatic field.

Note that in general, a potential and a voltage are relative values. Thus, a ground potential is not always 0 V.

A transistor is a kind of semiconductor elements and can achieve amplification of current or voltage, switching operation for controlling conduction or non-conduction, or the like. A transistor in this specification includes art insulated-gate field effect transistor (IGFET) and a thin film transistor (TFT).

In this specification and the like, a transistor is an element having at least three terminals: a gate, a drain, and a source. The transistor has a channel region between the drain (a drain terminal, a drain region, or a drain electrode) and the source (a source terminal, a source region, or a source electrode), and current can flow through the drain, the channel region, and the source. Here, since the source and the drain of the transistor change depending on the structure, the operating condition, and the like of the transistor, it is difficult to define which is a source or a drain. Therefore, a portion functioning as a source or a drain is not called a source or a drain in some cases. In that case, for example, one of the source and the drain is referred to as a first terminal, a first electrode, or a first region and the other of the source and the drain is referred to as a second terminal, a second electrode, or a second region in some cases.

In this specification and the like, when it is explicitly described that X and Y are connected, the case where X and Y are electrically connected, the case where X and Y are functionally connected, and the case where X and Y are directly connected are included therein. Here, X and Y each denote an object (e.g., a device, an element, a circuit, a line, an electrode, a terminal, a conductive film, a layer, or the like). Accordingly, another element may be provided between elements having a connection relation illustrated in drawings and texts, without limitation on a predetermined connection relation, for example, the connection relation illustrated in the drawings and the texts.

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and A, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". It is also possible to use the expression "a source (or a first terminal or the like) of a transistor is electrically connected to X through Z1 on at least a first connection path, the first connection path does not include a second connection path, the second connection path includes a connection path through the transistor, a drain (or a second terminal or the like) of the transistor is electrically connected to Y through Z2 on at least a third connection path, and the third connection path does not include the second connection path". Still another example of the expression is "a source (or a first terminal or the like) of a transistor is electrically connected to X through Z1 on at least a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through Z2 on at least a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

For example, in this specification and the like, when it is explicitly described that Y is formed on or over X, it does not necessarily mean that Y is formed on and in direct contact with X. The description includes the case where X and Y are not in direct contact with each other, that is, the case where another object is placed between X and Y. Here, each of X and Y corresponds to an object (e.g., a device, an element, a circuit, a wiring, an electrode, a terminal, a conductive film, or a layer).

Accordingly, for example, when it is explicitly described that a layer Y is formed on (or over) a layer X, it includes both the case where the layer Y is formed on and in direct contact with the layer X, and the case where another layer (e.g., a layer Z) is formed on and in direct contact with the layer X and the layer Y is formed on and in direct contact with the layer Z. Note that another layer (e.g., the layer Z) may be a single layer or a plurality of layers (a stack).

Similarly, when it is explicitly described that Y is formed above X, it does not necessarily mean that Y is formed on and in direct contact with X, and another object may be placed between X and Y. Therefore, for example, when it is described that a layer Y is formed above a layer X, it includes both the case where the layer Y is formed on and in direct contact with the layer X, and the case where another layer (e.g., a layer Z) is formed on and in direct contact with the layer X and the layer Y is formed on and in direct contact with the layer Z. Note that another layer (e.g., the layer Z) may be a single layer or a plurality of layers (a stack).

Note that when it is explicitly described that Y is formed over, on, or above X, it includes the case where Y is formed obliquely over/above X.

Note that the same can be said when it is explicitly described that Y is formed below or under X.

For example, in this specification and the like, terms for describing spatial arrangement, such as "over", "above", "under", "below", "laterally", "right", "left", "obliquely", "behind", "front", "inside", "outside", and "in" are often used for briefly showing a relation between an element and another element or between a feature and another feature with reference to a diagram. Note that embodiments of the present invention are not limited thereto, and such terms for describing spatial arrangement can indicate not only the direction illustrated in a diagram but also another direction. For example, when it is explicitly described that "Y is over X", it does not necessarily mean that Y is placed over X. Since a device in a diagram can be inverted or rotated by 180°, the case where Y is placed under X can be included. Accordingly, "over" can refer to the direction described by "under" in addition to the direction described by "over". Note that the embodiments of the present invention are not limited to this, and "over" can refer to any of the other directions described by "laterally", "right", "left", "obliquely", "behind", "front", "inside", "outside", and "in" in addition to the directions described by "over" and "under" because the device in the diagram can be rotated in a variety of directions. That is, such terms can be construed as appropriate depending on circumstances.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

EXPLANATION OF REFERENCE

10: electron gun chamber, 12: optical system, 14: sample chamber, 16: optical system, 18: camera, 20: observation chamber, 22: film chamber, 32: fluorescent plate, 101: housing, 110: display panel, 111: display region, 112: display region, 113: display region, 114: display region, 115: display region, 116: display region, 121: icon, 125: slide bar, 126: finger, 150: electronic device, 153a: support panel, 155a: support panel, 155b: support panel, 201: region, 202: image sensor, 203: lighting element, 204: image for lighting, 205: object, 206: image, 207 image, 208: icon, 209: icon. 300: touch panel, 301: display portion, 302: pixel, 302B: sub-pixel, 302G1: sub-pixel, 302R: sub-pixel, 302t: transistor, 303c: capacitor, 303g(1): scan line driver circuit, 303g(2): imaging pixel driver circuit, 303s(1): image signal line driver circuit, 303s(2): imaging signal line driver circuit, 303t: transistor, 308: imaging pixel, 308p: photoelectric conversion element, 308t: transistor, 309: FPC, 310: substrate, 310a: barrier film, 310b: substrate, 310c: adhesive layer, 311: wiring, 319: terminal, 321: insulating film, 328: partition, 329: spacer, 350R: light-emitting element, 351R: lower electrode, 352: upper electrode, 353: layer, 353a: light-emitting unit, 353b: light-emitting unit, 354: intermediate layer, 360: sealant, 367BM: light-blocking layer, 367p: anti-reflective layer, 367R: coloring layer, 370: counter substrate, 370a: barrier film, 370b: substrate, 370c: adhesive layer, 380B: light-emitting module, 380G: light-emitting module, 380R: light-emitting module, 401: battery, 402: receiving unit, 403: communication device, 404: speaker, 405: speaker, 500: touch panel, 500B: touch panel, 501: display portion, 502R: sub-pixel, 502t: transistor, 503c: capacitor, 503g(1): scan line driver circuit, 503t: transistor, 509: FPC, 510: substrate, 510a: barrier film, 510b: substrate, 510c: adhesive layer, 511: wiring, 519: terminal, 521: insulating film, 528: partition, 550R: light-emitting element, 560: sealant, 567BM: light-blocking layer, 567p: anti-reflective layer, 567R: coloring layer, 570: substrate, 570a: barrier film, 570b: substrate, 570c: adhesive layer, 580R: light-emitting module, 590: substrate, 591: electrode, 592: electrode, 593: insulating layer, 594: wiring, 595: touch sensor, 597: adhesive layer, 598: wiring, and 599: connection layer.

This application is based on Japanese Patent Application serial no. 2013-245670 filed with Japan Patent Office on Nov. 28, 2013, the entire contents of which are hereby incorporated by reference.

The invention claimed is:

1. An electronic device comprising:
    a first main surface and a second main surface;
    a first short side surface and a second short side surface; and
    a first long side surface and a second long side surface,
    wherein each of the first short side surface, the second short side surface, the first long side surface and the second long side surface are in contact with the first main surface,
    wherein each of the first short side surface, the second short side surface, the first long side surface and the second long side surface are in contact with the second main surface,
    wherein the first main surface overlaps with the second main surface,
    wherein each of an area of the first main surface and an area of the second main surface is greater than each of an area of the first short side surface, an area of the second short side surface, an area of the first long side surface and an area of the second long side surface,
    wherein a first display region defines a first area of the first main surface covered by a display panel,
    wherein a second display region defines a second area of the first short side surface covered by the display panel,
    wherein a third display region defines a third area of the second main surface covered by the display panel,
    wherein a fourth display region defines a fourth area of the first long side surface covered by the display panel,
    wherein the first display region has a larger area than the third display region,
    wherein a first region is provided on the second main surface, and
    wherein a display region is not provided in the first region.

2. The electronic device according to claim 1,
    wherein an area of the third display region is greater than or equal to 10% and less than or equal to 90% of an area of the first display region.

3. The electronic device according to claim 1,
    wherein an area of the third display region is greater than or equal to 30% and less than or equal to 70% of an area of the first display region.

4. The electronic device according to claim 1,
    wherein the electronic device has a touch sensor in at least one of the first display region to fourth display region.

5. The electronic device according to claim 1, further comprising an input device,
    wherein the electronic device has an input function in at least one of the first to fourth display regions.

6. The electronic device according to claim 1,
    wherein the first display region, the second display region, the third display region, and the fourth display region are on one face of a substrate.

7. The electronic device according to claim 1, wherein the first display region, the second display region, and the third display region are fixed to a housing.

8. The electronic device according to claim 1, wherein a speaker is provided in the first region.

9. An electronic device comprising:
a first main surface and a second main surface;
a first short side surface and a second short side surface;
a first long side surface and a second long side surface; and
an image sensor in the second main surface,
wherein each of the first short side surface, the second short side surface, the first long side surface and the second long side surface are in contact with the first main surface,
wherein each of the first short side surface, the second short side surface, the first long side surface and the second long side surface are in contact with the second main surface,
wherein the first main surface overlaps with the second main surface,
wherein each of an area of the first main surface and an area of the second main surface is greater than each of an area of the first short side surface, an area of the second short side surface, an area of the first long side surface and an area of the second long side surface,
wherein a first display region defines a first area of the first main surface covered by a display panel,
wherein a second display region defines a second area of the first short side surface covered by the display panel,
wherein a third display region defines a third area of the second main surface covered by the display panel,
wherein a fourth display region defines a fourth area of the first long side surface covered by the display panel,
wherein the display device is configured to display a first image obtained by the image sensor in the first display region, and
wherein the display device is configured to display a second image obtained by the image sensor in the third display region.

10. The electronic device according to claim 9,
wherein an area of the third display region is greater than or equal to 10% and less than or equal to 90% of an area of the first display region.

11. The electronic device according to claim 9,
wherein an area of the third display region is greater than or equal to 30% and less than or equal to 70% of an area of the first display region.

12. The electronic device according to claim 9,
wherein the electronic device has a touch sensor function in at least one of the first to fourth display regions.

13. The electronic device according to claim 9, further comprising an input device,
wherein the electronic device has an input function in at least one of the first to fourth display regions.

14. The electronic device according to claim 9,
wherein the first display region has a larger area than the third display region.

15. A method for driving an electronic device comprising a first main surface, a second main surface, a first short side surface, a second short side surface, a first long side surface, a second long side surface, and an image sensor in the second main surface,
wherein each of the first short side surface, the second short side surface, the first long side surface and the second long side surface are in contact with the first main surface,
wherein each of the first short side surface, the second short side surface, the first long side surface and the second long side surface are in contact with the second main surface,
wherein the first main surface overlaps with the second main surface,
wherein each of an area of the first main surface and an area of the second main surface is greater than each of an area of the first short side surface, an area of the second short side surface, an area of the first long side surface and an area of the second long side surface,
wherein a first display region defines a first area of the first main surface covered by a display panel,
wherein a second display region defines a second area of the first short side surface covered by the display panel,
wherein a third display region defines a third area of the second main surface covered by the display panel, and
wherein a fourth display region defines a fourth area of the first long side surface covered by the display panel,
the method comprising:
displaying a first image obtained by the image sensor in the first display region; and
displaying a second image obtained by the image sensor in the third display region.

16. The method for driving an electronic device according to claim 15,
wherein an area of the third display region is greater than or equal to 10% and less than or equal to 90% of an area of the first display region.

17. The method for driving an electronic device according to claim 15,
wherein an area of the third display region is greater than or equal to 30% and less than or equal to 70% of an area of the first display region.

18. The electronic device according to claim 15,
wherein the electronic device has a touch sensor on any one of the first display region to fourth display region.

19. The electronic device according to claim 15, further comprising an input device,
wherein the first display region has a larger area than the third display region.

* * * * *